US005513376A

United States Patent [19]
Lohmeyer

[11] Patent Number: 5,513,376
[45] Date of Patent: Apr. 30, 1996

[54] METHOD OF OPERATING AN EXTENSION FIFO IN ANOTHER DEVICE WHEN IT IS FULL BY PERIODICALLY RE-INITIATING A WRITE OPERATION UNTIL DATA CAN BE TRANSFERRED

[75] Inventor: Michael G. Lohmeyer, San Jose, Calif.

[73] Assignee: National Semiconductor Corporation, Santa Clara, Calif.

[21] Appl. No.: 238,260

[22] Filed: May 4, 1994

Related U.S. Application Data

[62] Division of Ser. No. 147,348, Nov. 2, 1993, abandoned.

[51] Int. Cl.$^6$ .................................................. G06F 13/14
[52] U.S. Cl. .................. 395/873; 395/822; 395/854; 395/872; 365/220; 365/221; 364/238.7; 364/239.1; 364/239.6; 364/DIG. 1
[58] Field of Search .................................... 395/425, 550; 364/900, 550; 365/189.07, 221, 189.05; 370/85.1

[56] References Cited

U.S. PATENT DOCUMENTS

| | | | |
|---|---|---|---|
| 4,374,428 | 2/1983 | Barnes | 395/250 |
| 4,833,651 | 5/1989 | Seltzer et al. | 365/189.07 |
| 4,942,553 | 7/1990 | Dalrymple et al. | 364/900 |
| 5,206,817 | 4/1993 | McClure | 364/550 |
| 5,313,620 | 5/1994 | Cohen et al. | 395/550 |
| 5,381,538 | 1/1995 | Amini et al. | 395/425 |

FOREIGN PATENT DOCUMENTS

| | | |
|---|---|---|
| 00290129 | 11/1988 | European Pat. Off. . |
| 61-176228 | 8/1986 | Japan . |

OTHER PUBLICATIONS

Wesley Lee and Mike Lui, "Software Driver Programmer's Guide for the DP83932 SONIC™", National Semiconductor Appln. No. 746, pp. 1–396 thru 1–433.
Wesley Lee, "DP83932 SONIC™ Bus Operations Guide", National Semiconductor Appln. No. 745, pp. 1–384 thru 1–395.
"DP83932B Systems–Oriented Network Interface Controller" pp. 1–288 through 1–383.
V. Coleman, et al., "The Implementation of Ethernet/IEEE 802.3 in VLSI," *Mini Micro Conference Record*, (Nov. 1983), pp. 1–17.
M. Stark, et al., "A High Functionality VLSI LAN Controller for CSMA/CD Network," *Proceedings COMPCON '83*, (Mar. 1983), pp. 510–517.
"Dynamic Arbitration Level Assignment for a Direct Memory Access Subsystem," *IBM Technical Disclosure Bulletin*, (Aug. 1988), pp. 32–36.

Primary Examiner—Thomas C. Lee
Assistant Examiner—Le Hein Luu
Attorney, Agent, or Firm—Limbach & Limbach

[57] ABSTRACT

A configurable network interface controller provides a multi-chip FIFO extension protocol. Utilizing this protocol, FIFOs that are physically separated (e.g., in separate chips) can be made to operate as though they are a single FIFO.

3 Claims, 75 Drawing Sheets

BUS INTERFACE PINS

| Symbol | Pin No | Direction | Description |
|---|---|---|---|
| D<15:0> | | I, O, Z | NCDI Data Bus: These bidirectional lines are used to transfer data, with D15 being the most significant bit. |
| P0, P1 | | I, O, Z | Data Parity 0, 1: P0 indicates odd parity for D<15:8>. P1 indicates odd parity for D<7:0>. The parity bits are driven by the bus master during a write operation and the bus slave during a read operation. |
| A<7:0> | | I, O, Z | NCDI Address Bus: These Bidirectional lines are used to drive the address on the NCDI bus. The most significant bit is A7. |
| D/$\overline{C}$ | | I, O, Z | Data/Command: This active low signal defines the type of the data on the NCDI Bus during the current bus transfer. D/$\overline{C}$=0 indicates that the bus contains command information. It is driven by the current Bus Master during any write operation, and by the current Bus Slave during any read operation. |
| BYTE | | O, Z | Byte Wide Transfer: This bidirectional signal defines the width of the data on the NCDI Bus during the current bus transfer. It is driven by the current bus master during any read or write operation. When driven high, the data width is byte wide. When driven low, the data width is two bytes, or word wide. |
| R/$\overline{W}$ | | I, O, Z | Read/Write: This bidirectional signal defines the direction of the data on the NCDI Bus during the current bus transfer. It is driven by the Bus Master, and the direction is defined from the current Bus Master's perspective. The NCDI Bus data is driven by the current Bus Master during any write operation, and by the current Bus Slave during any read operation. |
| $\overline{BVALID}$ | | I, O, Z | Bus Valid: This active low, bidirectional signal indicates that the current bus transfer cycle is valid. This signal is driven by the current bus master and should be pulled high by an external pullup resistor for when there is no current bus master. |
| $\overline{BREQ0}$ | | I, O, Z | Bus Request 0: $\overline{BREQ0}$ is used to request the NCDI Bus when the SCENIC's bus controller is not selected as the active Bus Arbiter. When the bus controller is the active Bus Arbiter, $\overline{BREQ0}$ is an input and works just like $\overline{BREQ<3:1>}$. |

FIG. 3A

| Symbol | Pin No | Direction | Description |
|---|---|---|---|
| BREQ<3:1> | | I | Bus Request 3, 2 and 1: These signals, along with BREQ0, are used to connect up to four NCDI bus masters on the NCDI bus. When the SCENIC is set up to be the active Bus Arbiter, BREQ<3:1> and BREQ0 all become inputs, listening for requests from devices on the bus. When the SCENIC is not the Master Bus Arbiter, BREQ<3:1> are TRI-STATE, and BREQ0 becomes an output. |
| BGRANT0 | | I, O, Z | Bus Grant 0: When the SCENIC is not the active Bus Arbiter, BGRANT0 becomes an input. When BGRANT0 is asserted, it tells the SCENIC that is has been grated ownership of the bus. When the SCENIC is the active Bus Arbiter, BGRANT0 becomes an output and works similar to BGRANT<3:1>. BGRANT0 also works to preempt the SCENIC off the bus when BGRANT0 is deasserted before the SCENIC is done with the bus.<br><br>Note: After RESET is deasserted, BGRANT<3:0> will remain TRI-STATE until the arbiter select bit is set to 1 in the EEPROM Configuration Register, which enables the SCENIC to be the bus arbiter. During this time, the BGRANT signals will be floating. If they are not pulled high by a resistor on the NCDI bus, it is possible that the bus interface (or some other device) may be granted the bus prematurely by a BGRANT that floated low. Once the bus arbiter is assigned, BGRANT<3:0> will be actively driven by the arbiter. |
| BGRANT<3:1> | | O, Z | Bus Grant 3, 2, and 1: These signals, along with BGRANT0, are used to connect up to four NCDI bus masters on the NCDI bus. When the SCENIC is the active Bus Arbiter, BGRANT<3:1> and BGRANT0 all become outputs. The SCENIC will assert different BGRANT signals to the 4 different bus masters to tell them that they own the bus. |
| CS | | O, Z | Chip Select: This active low signal is used as a chip select for the supporting bus interface chip. The SCENIC will drive CS along with ID<3:0> to select the bus interface and identify which SCENIC is accessing the BI. |

FIG. 3B

| Symbol | Pin No | Direction | Description |
|---|---|---|---|
| ID<3:0> | | I, O, Z | NCDI Device Identifier: These 4 signals make up an identification code for all devices on the NCDI bus except the bus interface chip. When the SCENIC performs a bus transfer, it will always drive ID3-ID0 at the same time as A<7:0> to signify who is driving the bus. When the SCENIC is being accessed as a slave, it will decode ID<3:0> along with A<7:0> to determine if the current bus transfer is meant for it or another device on the bus. ID<3:0> along with $\overline{CS}$ make up a 5 signal coded chip select for selecting and identifying NCDI devices. The identification code is assigned by the Bootstrap process from the configuration EEPROM. |
| $\overline{BUSY}$ | | I | Busy: This active low signal is driven by a bus slave to insert additional bus cycles into the current operation. The SCENIC does not actively drive this signal when accessed as a slave since it does not need to add wait states. $\overline{BUSY}$ should be pulled high by an external pullup resistor because of this. |
| $\overline{BS8}$ | | I | Bus Size 8: This active low signal is driven by a bus slave during a memory transfer to indicate that it only supports 8 bit data transfers. Slaves which support 16 bit transfers would also use $\overline{BS8}$ to indicate a byte wide transfer. The SCENIC does not actively drive this signal when accessed as a slave since it does not use 16 bit transfers as a slave. $\overline{BS8}$ should be pulled high by an external pullup resistor because of this. |
| $\overline{PARITY}$ | | I, O, Z | Parity Valid: This active low signal indicates valid parity on the NCDI Bus during the current bus transfer. It is driven by the current bus master during any write operation, and the current Bus Slave during any read operation. If $\overline{PARITY}$ is not asserted, then the device driving the data does not support parity for this transfer. All devices on the NCDI bus, when latching data should use $\overline{PARITY}$ to determine if or when P0 and P1 are valid. If $\overline{PARITY}$ is not asserted, then P0 and P1 should be ignored since this indicates lack of parity support by the device driving the data. |

FIG. 3C

| Symbol | Pin No | Direction | Description |
|---|---|---|---|
| BRT | | I | Bus Retry: This active low signal is used to force the SCENIC to retry the current transfer. When sampled, the SCENIC will stop the current transfer and get completely the bus, BRT takes precedence over both BUSY and a bus preemption (the bus preemption will still occur, but the cycle will be retried). The SCENIC does not actively drive this signal when accessed as a slave since it does require cycles to be retried. BRT should be pulled high by an external pullup resistor because of this. |
| RESET | | I | NCDI System Reset: This active low input is intended to be driven by the supporting bus interface chip. RESET = 0 will cause a hardware reset of SCENIC. The input must be low for a minimum of 10 NCDI Bus clock cycles for a full reset to occur. |
| BSCK | | I | NCDI Bus Clock: BSCK is the NCDI bus clock generated by an off chip oscillator. |
| X1 | | I | Crystal or External Oscillator Input: This pin is used to provide clocking signals to the internal ENDEC and transceiver. A 20 MHz clock oscillator module must be connected to this pin as shown in section 6.1.1. A 20 MHz crystal may be used instead of a clock oscillator if it is connected to this pin along with X2. |
| X2 | | O | Crystal Feedback Output: This pin is used to provide the clocking signal to the ENDEC. Nothing should be connected to this pin if a clock oscillator is used. A crystal would be connected to this output along with X1. |

Boot EEPROM Interface Pins

| Symbol | Pin No | Direction | Description |
|---|---|---|---|
| PROMCS | | O | EEPROM Chip Select: This signal is the chip select for enabling the NM93C06 boot EEPROM for reading or writing. |
| PROMSK | | O | EEPROM Serial Clock: This output provides the clock needed to drive the NM93C06 serial EEPROM. |
| PROMDI | | O | EEPROM Data In: This output pin connects to the EEPROM data input. The SCENIC drives data to the EEPROM through this pin. |

FIG. 3D

| Symbol | Pin No | Direction | Description |
|---|---|---|---|
| PROMDO | | I | EEPROM Data Out: This input pin connects to the EEPROM data output. The NM93C06 EEPROM drives its data to the SCENIC through this pin. |

ADDRESS RECOGNITION LOGIC INTERFACE PINS

| Symbol | Pin No | Direction | Description |
|---|---|---|---|
| PREJ | | I | Packet Reject: This active low input is used to force the rejection of any packet currently being received, regardless of the destination address. This signal overrides the CAM. |
| BSTR<br>ADFG | | O<br>O | Byte Strobe/Address Flag: This signal is used to obtain the destination and source addresses of a packet that is being received. There are two ways this signal can be used for this purpose. The method used is programmed by the Received Address Strobe Mode (RAS) bit in the Receive Configuration Register (RXCR). When the RAS bit is not set, this signal becomes the BSTR or Byte Strobe signal. In this mode, BSTR will strobe the end of each byte as it is serially driven from the RXD signal. When the RAS bit is set, this signal will become the ADFG or Address Flag signal. In this mode, while the destination or source address of a received packet is being transferred across the NCDI bus, ADFG will be asserted low.<br><br>BSTR can be used when grabbing the source and destination address serially from the External ENDEC interface. ADFG can be used when it is desired to grab the source and destination address from a parallel data source (the NCDI bus). |

NETWORK INTERFACE PINS

| Symbol | Pin No | Direction | Description |
|---|---|---|---|
| TX+<br>TX- | | O | Transmit Output pair: Differential driver which sends the encoded data to the transceiver. These signals are used in AUI mode only. |
| RX+<br>RX- | | I | Receive Input pair: Differential input pair from the transceiver. These signals are used in AUI mode only. |
| CD+<br>CD- | | I | AUI Collision Input: Differential collision input pair from the transceiver. These signals are used in AUI mode only. |

FIG. 3E

| Symbol | Pin No | Direction | Description |
|---|---|---|---|
| RXI+<br>RXI− | | I | Twisted Pair Receive Inputs: These inputs feed a differential amplifier which passes TTL/MOS level Manchester data to the ENDEC module. The common mode voltage of these inputs is set internally and should not be altered. |
| TXU+<br>TXU− | | O | Twisted Pair Transmit Drivers for UTP: This pair of drivers provide pre-emphasized and filtered differential output for UTP (100 ohm). These drivers maintain the same common mode voltage during data transmission and idle mode. |
| TXS+<br>TXS− | | O | Twisted Pair Transmit Drivers for STP: This pair of drivers provide pre-emphasized and filtered differential output for STP (150 ohm). These drivers maintain the same common mode voltage during data transmission and idle mode. |
| Req | | I | Equalization Resistor: A resistor, Req, is connected from this pin to GND or VCC to change the equalization of the twisted pair output. The value of Req has yet to be determined, although for normal network cable lengths, Req can be left disconnected. |
| Rtx | | I | Transmit Level Resistor: A resistor, Rtx, is connected from this pin to GND or VCC to change the signal level of the twisted pair output. The value of Rtx has yet to be determined, although, for normal network cable lengths, Rtx can be left disconnected. |

NETWORK LED OUTPUTS

| Symbol | Pin No | Direction | Description |
|---|---|---|---|
| $\overline{COLLED}$ | | O | Collision LED: An open drain active low output. It is asserted for approximately 50 ms whenever the transceiver detects a collision either in TPI or AUI mode. |
| $\overline{RXLED}$ | | O | Receive LED: An open drain active low output. It is asserted low for approximately 50 ms whenever the transceiver receives data either in TPI or AUI mode. |
| $\overline{TXLED}$ | | O | Transmit LED: An open drain active low output. It is asserted for approximately 50 ms whenever the transceiver transmits data either in TPI or AUI mode. |

FIG. 3F

| Symbol | Pin No | Direction | Description |
|---|---|---|---|
| LNKLED | | O | Good Link LED: An open active low output. This signal is deasserted if the AUI network connection is used. In twisted pair transceiver mode, the output will be low if the link integrity function is enabled and link integrity is good (i.e. the twisted pair link has not been broken). This output will stay low if the link integrity function is disabled in the Network Interface Configuration Register (NICR). |
| POLLED | | O | Polarity LED: An open drain active low output. This signal is asserted in twisted pair transceiver mode when the transceiver detects either seven consecutive link pulses or three consecutive packets where the polarity of the RXI+/− signals is reversed. Note that the SCENIC will automatically reverse the polarity internally in such cases. POLLED is an indicated that this polarity reversal is occurring. |

EXTERNAL ENDEC PINS

| Symbol | Pin No | Direction | Description |
|---|---|---|---|
| TXE | | I, O | Transmit Enable: This active high signal is asserted when the first bit of a packet is valid on TXD, and remains high until the last bit is transmitted by the SCENIC. This is an output pin when in external ENDEC mode and an input pin when the SCENIC is configured in stand alone ENDED/TPI mode. |
| TXD | | I, O | Transmit Data: This active high signal is the serial NRZ transmit data. The data is valid at the rising edge of TXC. This is an output pin when in external ENDEC mode and an input pin when the SCENIC is configured in stand alone ENDEC/TPI mode. |
| TXC | | I, O | Transmit Clock: This is the 10 MHz signal used by the MAC. This is an input pin during external ENDEC mode and output during internal ENDEC or stand alone ENDEC/TPI mode. |
| COL | | I, O | Collision: This line comes from the ENDEC and becomes active whenever a collision has been detected by the transceiver. COL is monitored during transmissions from the beginning of SFD through to the end of the packet. At the end of the transmission, COL is monitored for the CD heartbeat. This signal is active high. This is an input pin during external ENDEC mode and an output during internal ENDEC or stand alone ENDEC/TPI mode. |

FIG. 3G

| Symbol | Pin No | Direction | Description |
|---|---|---|---|
| CRS | | I, O | Carrier Sense: This is an active high signal which is asserted when valid data from the transceiver is present at the receive input. It is deasserted one and a half bit times after the last bit at the receive input. This is an input pin during external ENDEC mode and an output during internal ENDEC or stand alone ENDEC/TPI mode. |
| RXD | | I, O | Receive Data: This active high signal is the NRZ data output from the digital phase-lock loop. This signal is valid on the rising edge of RXC. This is an input pin during external ENDEC mode and an output during internal ENDEC or stand alone ENDEC/TPI mode. |
| RXC | | I, O | Receive Clock: This line comes from the ENDEC and carries the 10 MHz receive clock generated by the phase locked loop. This is an input pin during external ENDEC mode and an output during internal ENDEC or stand alone ENDEC/TPI mode. |
| LBK | | O | ENDEC Loopback: This active high signal forces the internal ENDEC to loopback the transmit data to the receiver in the ENDEC. If an external ENDEC is used, this signal would be used to tell the external ENDEC to loop the packet back. |

PHYSICAL LAYER POWER SUPPLY PINS (for ENDEC and TPI)

| Symbol | Pin No | Direction | Description |
|---|---|---|---|
| OSCGND | | | LED/Oscillator Ground: Ground pin for the LEDs and oscillator circuitry. |
| OSCVCC | | | Oscillator 5 volt Supply: Power pin supplies 5V to the oscillator circuitry. |
| PLLVCC | | | PLL 5V Supply: Care should be taken to reduce noise on this pin as it supplies power to the analog Voltage Controlled Oscillator (VCO) of the phase locked loop. |
| PLLGND | | | PLL Ground Supply: Care should be taken to reduce noise on this pin as it supplies ground to the analog VCO of the phase locked loop. |
| TXGND | | | AUI Transmit Ground: Ground pin for AUI transmitter. |
| TXVCC | | | AUI Transmit 5V Supply: Power pin supplies 5V to the AUI transmitter circuit. |
| RXGND | | | TPI and AUI Receive Ground: Ground pin for twisted pair receiver and AUI receiver. |

FIG. 3H

| Symbol | Pin No | Direction | Description |
|---|---|---|---|
| RXVCC | | | TPI and AUI Receive 5V Supply: Power pin supplies 5V to the twisted pair receiver and AUI receiver. |
| TDVCC | | | TPI Transmit 5V Supply: Power pin supplies 5V to the transmitter of the twisted pair interface. |
| TDGND | | | TPI Transmit Ground: Ground pin for the transmitter of the twisted pair interface. |

POWER AND NO CONNECT PINS (DIGITAL)

| Symbol | Pin No | Direction | Description |
|---|---|---|---|
| VCCL | | | Core Voltage Supply: A + 5 volt source for the SCENIC core logic. |
| VCC | | | Signal Voltage Supply: A +5 volt source for the SCENIC signal drivers. |
| GNDL | | | Core Ground: Ground for the SCENIC core logic. |
| GND | | | Signal Ground: Ground for the SCENIC signal drivers. |
| NC | | | No Connect: These signals should be left disconnected. |

TEST PINS

| Symbol | Pin No | Direction | Description |
|---|---|---|---|
| TDI | | I | Test Data In: This pin is used by the tester to scan in vectors produced by the ATPG tool. During normal SCENIC operation, this signal can be left disconnected. |
| TDO | | O | Test Data Out: This pin is used by the tester to scan out vectors needed for checking fault coverage. During normal SCENIC operation, this signal can be left disconnected. |
| TE | | I | Test Enable: This pin is used by the test software as the muxing signal between the normal data and the scan data for each flip-flop. During normal SCENIC operation, this signal should be tied low. |
| CLKBYP | | I | Clock Bypass: This pin is used during test mode as the muxing signal between normal clocks and scan clocks. During normal SCENIC operation, this signal should be tied low. |
| TCLK | | I | Test Clock: This is the clock used for scan testing. During normal SCENIC operation, this signal can be left disconnected. |

FIG. 31

| $\overline{BS8}$ | BYTE | A0 | Data Generator | Data Receiver |
|---|---|---|---|---|
| 0 | 0 | 0 | Master: D<15:0> contains two separate bytes. Slave: Single byte generated on D<15:8>. | Master: Samples D<15:8> only. Slave: Samples D<15:8> only. |
| 0 | 0 | 1 | Not Allowed | Not Allowed |
| 0 | 1 | 0 | Master: Single byte duplicated on MSB and LSB. Slave: Single byte generated on D<15:8>. | Master: Samples D<15:8> only. Slave: Samples D<15:8> only. |
| 0 | 1 | 1 | Master: Single byte duplicated on MSB and LSB. Slave: Single byte generated on D<15:8>. | Master: Samples D<15:8> only. Slave: Samples D<15:8> only. |
| 1 | 0 | 0 | Master: D<15:0> contains two separate bytes. Slave: D<15:0> contains two separate bytes. | Master: Samples D<15:0>. Slave: Samples D<15:0>. |
| 1 | 0 | 1 | Not Allowed | Not Allowed |
| 1 | 1 | 0 | Master: Single byte duplicated on MSB and LSB. Slave: Single byte generated on D<15:8>. | Master: Samples D<15:8> only. Slave: Samples D<15:8> only. |
| 1 | 1 | 1 | Master: Single byte duplicated on MSB and LSB. Slave: Single byte generated on D<7:0>. | Master: Samples D<7:0> only. Slave: Samples D<7:0> only. |

(PROPOSED)

| Instruction | SB | Op Code | Address | Data | Comments |
|---|---|---|---|---|---|
| READ | 1 | 10 | A5–A0 | | Reads data stored in memory. |
| EWEN | 1 | 00 | 11XXXX | | Write enable (must precede all programming modes.) |
| ERASE | 1 | 11 | A5–A0 | | Erase register A5A4A3A2A1A0. |
| WRITE | 1 | 01 | A5–A0 | D15–D0 | Writes register. |
| ERAL | 1 | 00 | 10XXXX | | Erase all registers. |
| WRAL | 1 | 00 | 01XXXX | D15–D0 | Writes all registers. |
| EWDS | 1 | 00 | 00XXXX | | Disables all programming instructions. |

FIG. 18

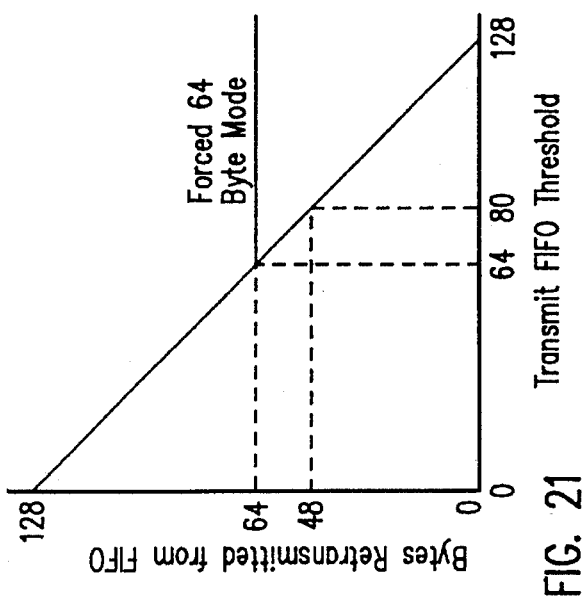

FIG. 21

Given the address:

12 34 56 78 9A BC

The bit pattern seen on the network would be:

0100 1000 0010 1100 0110 1010 0001 1110 0101 1001 0011 1101

└── This is the fourth bit transmitted on the network

└── This is the first bit transmitted on the network

FIG. 19

| Command | Opcode[1] | Source | Description |
|---|---|---|---|
| SOF | 000 | BI | Start of Frame: SOF designates the start of a transmit packet. This command is given to the SCENIC by the bus interface in order to initiate a transmit. Bits 11 to 6 of the command data field provide configuration information on how the packet should be transmitted. The following is a list of these configuration bits.<br><br>Bit Function<br>11 CRC Inhibit (CRCI): This bit controls automatic appending of CRC on the end of a packet.<br>   0: packet transmitted with automatically generated CRC<br>   1: packet transmitted without the automatically generated CRC<br>10 Automatic Transmit Padding (ATP): This bit controls the automatic addition of padding bytes to packets that are less than 64 bytes in length.<br>   0: automatic padding disabled<br>   1: automatic padding enabled<br>9 Program "Out of Window Collision" Timer (POWC): This bit programs when the out of window collision timer begins counting its 51.2 μs slot time.<br>   0: timer begins after the Start of Frame Delimiter (SFD)<br>   1: timer begins after the first bit of preamble<br>8 Excessive Deferral Timer Disable (EXDIS)<br>   0: excessive deferral timer enabled<br>   1: excessive deferral timer disabled<br>7,6 Loopback Control (LB1,LB0): These encoded bits control loopback operation on the SCENIC.<br>   00 no loopback, normal operation<br>   01 MAC loopback<br>   10 ENDEC loopback<br>   11 Tranceiver loopback |

FIG. 20A

| Command | Opcode[1] | Source | Description |
|---|---|---|---|
| EOF | 001 | BI | End of Frame: Designates the end of a transmit packet |
| ABORT | 011 | BI SCENIC | Transmit Abort from Bus Interface: ABORT, when received from the bus interface chip (BI). causes the SCENIC to abort the packet that it is currently transmitting. The SCENIC will reset its FIFO upon receiving this command and tell the MAC to stop transmitting. Transmit status will be returned to acknowledge the abort. ABORT should only be issued to the SCENIC between issuing the SOF, and the EOF being read from the BI. ABORT will be ignored when issued outside of this period.<br><br>Transmit Abort from SCENIC: This command is an indication by the SCENIC that it will no longer read data from the Transmit Network BI Port on the bus interface chip. Hence, the bus interface must flush it transmit FIFO or drop the current transmit packet in some other way.<br><br>Note: This command can be disabled by the TX ABORT Disable bit in the Transmit Configuration Register. |

1. Opcode is made up of bits 14 to 12. Bit 15 is a reserved bit and must always be 0. Also, any bit that is not defined above should be written as 0.

FIG. 20B

| Command | Opcode[1] | Source | Description |
|---|---|---|---|
| SOF | 000 | SCENIC | Start of Frame: SOF designates the start of a receive packet. This command is given to the bus interface by the SCENIC in order to signify the start of a new packet. |
| EOF | 001 | SCENIC | End of Frame: Designates the end of a received packet. |
| SOFCS | 010 | SCENIC | Start of Frame Check Sequence: This command indicates that start of the Frame Check Sequence in the packet as the packet is written to the Bus Interface. This command will be inserted just before the 4 byte CRC value at the end of the packet. |
| ABORT | 011 | BI | Receive Abort from the Bus Interface: This command is an indication by the bus interface that it does not want any more data from the SCENIC on the current packet being received. Receive ABORT will cause the SCENIC to dump the packet instead of writing data to the bus interface. EOF or receive status will be given to the bus interface by the SCENIC after receiving a Receive ABORT command. If the ABORT command is issued between an EOF and an SOF, it will be ignored since the ABORT cannot be connected with any one particular packet. |
| STATS | 100 | BI | Network Statistics Counter Control: This command is used to freeze, unfreeze and clear the network statistics counters. When the statistics counters are frozen, they cease to count network events. After the counters are unfrozen, they will be cleared and allowed to count network events again. The attribute field (bit 11) controls whether to freeze or unfreeze the Statistics. Note that if an unfreeze command is given without having frozen the counters in the first place, the counters will be cleared anyway.<br>Bit  Function<br>11   Freeze Statistics (FS): Used to freeze or unfreeze the statistics. The value of this bit is loaded into the FS bit of the Data Configuration Register (DCR).<br>     0: unfreeze and clear the statistics counters (load FS bit in DCR with 0)<br>     1: freeze the statistics counters (load FS bit in DCR with 1) |

1. Opcode is made up of bits 14 to 12. Bit 15 is a reserved bit and must always be 0. Also, any bit that is not defined above should be written as 0.

FIG. 22

| TE | EIOS TCR Bit 0 | EBYPASS TCR Bit 1 | Clock Used | Data Action | Operation Mode |
|---|---|---|---|---|---|
| 0 | 0 | 0 | BSCK | Parallel Data in/out | Normal Operation |
| 1 | 0 | 0 | BSCK | Data shift within internal chain(s) | Internal Scan |
| 1 | 1 | 0 | TCLK | Data shift within IO chain | IO Scan |
| 1 | 0 | 1 | TCLK | TDI −>> TDO | Bypass |
| 0 | 1 | 0 | TCLK | Data capture on all inputs/outputs | IO Data Capture |

FIG. 30

| Address | Read/Write | Short Name | Register Name |
|---|---|---|---|
| 04 | r/w | DCR | Data Configuration Register |
| 06 | r/w | IMR | Interrupt Mask Register |
| 08 | r | ISR | Interrupt Status Register |
| 0A | r/w | EPCR | EEPROM Configuration Register |
| 0C | r/w | NICR | Network Interface Configuration Register |
| 0E | r | SR | Silicon Revision |
| 32 | r/w | BPC | Bus Preempt Counter |
| 36 | r/w | BMPC | Bus Master Priority Configuration Register |
| 44 | r/w | CAP0 | CAM Address Port 0 |
| 46 | r/w | CAP1 | CAM Address Port 1 |
| 48 | r/w | CAP2 | CAM Address Port 2 |
| 50 | r/w | TCR | Test Control Register |
| 54 |  | ETCR | ENDEC Test Configuration Register |
| 56 |  | ETEMPL | ETEMPL Test Configuration Register |
| 58 |  | TPT | TPI Test Register |
| 60 | r/w | BECR | Boot EEPROM Command Register |
| 62 | r/w | BEDR | Boot EEPROM Data Register |
| 64 | r/w | BIIRO | Bus Interface Interrupt Register Offset |

FIG. 31

| Address | Read/Write | Short Name | Register Name |
|---|---|---|---|
| 10 | r/w | TXNP | SCENIC Transmit Network Port |
| 12 | r/w | TXNPO | Bus Interface Transmit Network Port Offset |
| 14 | r | TXSR | Transmit Status Register |
| 16 | r/w | TXCR | Transmit Configuration Register |

FIG. 32

| Address | Read/Write | Short Name | Register Name |
|---|---|---|---|
| 20 | r/w | RXNP | SCENIC Receive Network Port |
| 22 | r/w | RXNPO | Bus Interface Receive Network Port Offset |
| 24 | r | RXSR | Receive Status Register |
| 26 | r/w | RXCR | Receive Configuration Register |

FIG. 33

| Address (High/Low Word) | Read/Write | Short Name | Register Name |
|---|---|---|---|
| 82/80 | r | RXMissedPkts | Received Missed Packets |
| 86/84 | r | RXRuntOK | Received Runt Packets Without Errors |
| 8A/88 | r | RXRuntErrored | Received Runt Packets With Errors |
| 8E/8C | r | RXJabberOK | Received Jabber Packets Without Errors |
| 92/90 | r | RXJabberErrored | Received Jabber Packet With Errors |
| 96/94 | r | RXFAError | Received Frame Alignment Error |
| 9A/98 | r | RXFCSError | Received Frame Check Sequence Error |
| 9E/9C | r | RXBytesErrored | Received Errored Bytes |
| A2/A0 | r | RXCollisions | Received Packets with Collisions |
| A6/A4 | r | RXPkts 64Bytes | Received Packets with Length 64 Bytes |
| AA/A8 | r | RXPkts 65to127Bytes | Received Packets with Length 65 to 127 Bytes |
| AE/AC | r | RXPkts 128to255Bytes | Received Packets with Length 128 to 255 Bytes |
| B2/B0 | r | RXPkts 256to511Bytes | Received Packets with Length 256 to 511 Bytes |
| B6/B4 | r | RXPkts 512to1023Bytes | Received Packets with Length 512 to 1023 Bytes |
| BA/B8 | r | RXPkts 1024to1518Bytes | Received Packets with Length 1024 to 1518 Bytes |
| C2/C0 | r | TXPkts 64Bytes | Transmitted Packets with Length 64 Bytes |
| C6/C4 | r | TXPkts 65to127Bytes | Transmitted Packets with Length 65 to 127 Bytes |
| CA/C8 | r | TXPkts 128to255Bytes | Transmitted Packets with Length 128 to 255 Bytes |
| CE/CC | r | TXPkts 256to511Bytes | Transmitted Packets with Length 256 to 511 Bytes |
| D2/D0 | r | TXPkts 512to1023Bytes | Transmitted Packets with Length 512 to 1023 Bytes |
| D6/D4 | r | TXPkts 1024to1518Bytes | Transmitted Packets with Length 1024 to 1518 Bytes |
| DA/D8 | r | TXOWC | Transmitted Packets with Out of Window Collisions |
| DE/DC | r | TXRuntErrored | Transmitted Runt Packets |
| E2/E0 | r | TXPktsErrored | Transmitted Packets with Errors |
| BE/BC | r | TXBytesErrored | Transmitted Bytes with Errors |

FIG. 34

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| TXEN | RXEN | RST | BMS | FS | 0 | 0 | 0 | 0 | 0 | FT3 | FT2 | FT1 | FT0 | 0 | 0 |

| Bit | Symbol | Description |
|---|---|---|
| 15 | TXEN | Transmit Enable: When set to a "1", the transmit DMA channel becomes enabled. When this bit is reset, the transmit channel will become disabled so long as there is no current transmission in progress. If a transmission on the network is in progress when this bit is reset, the transmit logic will wait until the current transmission has completed before disabling the transmitter.<br><br>If the transmitter is disabled while it is attempting to transmit, but before it has actually been able to start the transmission on the network, resetting this bit will cause the current transmission to be cancelled. The Cancel Accept Completion Code in the Transmit status will be returned indicating the cancellation.<br><br>If an attempt is made to transmit a packet after the transmitter has been disabled, the packet will be handled like normal initially. SCENIC will read the packet data from the BI and seem to transmit the packet, but instead of transmitting the packet, as soon as the MAC sees the start of frame, the MAC will issue a transmit cancel and give a Cancel Accept Completion Code in the Transmit status to indicate the transmitter is disabled.<br><br>Default: Hardware reset => 0, Software reset => 0<br><br>Note: When TXEN is cleared, the bit will be reset immediately, regardless of whether the transmitter has actually been disabled. Hence, it is possible for the bit to be 0 at the same time the transmitter is completing the transmission of the current packet. |

FIG. 35A

| Bit | Symbol | Description |
|---|---|---|
| 14 | RXEN | Receive Enable: When set to a "1", the receive DMA channel will be enabled. When this bit is reset, the receive channel will be disabled so long as there is no current reception in progress. If a reception is in progress when this bit is reset, the receive logic will wait until the current reception has completed before disabling the receiver. This bit will change immediately upon being written to, but it is possible that if the receiver is in the middle of a reception, this bit will show the receiver to be disabled, while the reception is being completed.<br><br>Default: Hardware reset => 0, Software reset => 0<br><br>If the receiver is enabled at the same time the RST bit is set to 0, it is possible that the receiver will be enabled in the middle of a packet transmission on the network. If this happens, some statistics counters will increment since the SCENIC will most likely detect a false error. To avoid this, the RXEN bit should not be enabled for a period of time after RST is cleared that is equal to a maximum ethernet packet size. |
| 13 | RST | Software reset: After a hardware reset, this bit is set to "1". Software or the BI must initialize the SCENIC and clear this bit in order to make the SCENIC operational. This bit will reset the MAC core and all DMA state machines, hence, suspending all SCENIC operation except register accesses. RST will not clear any statistics counters.<br><br>Default: Hardware reset =>1 |
| 12 | BMS | Block Mode Select: Determines how data is emptied or filled into the Receive or Transmit FIFO.<br><br>0: Empty/Fill mode. All DMA transfers continue until either the Receive FIFO has emptied or the Transmit FIFO has filled completely.<br><br>1: Block mode. All DMA transfers continue until the programmed number of bytes (FT3,2,1,0) have been transferred (see the FIFO Threshold bits FT3,2,1,0).<br><br>Default: Hardware reset => 0, Software reset => unchanged |
| 11 | FS | Freeze Statistics Counters: When this bit is set, the hardware will freeze network statistics counters on the SCENIC for reading by the system software. When this bit is reset, the hardware will automatically clear the counters. There are two ways to set and reset this bit: 1) direct slave cycles to set this bit to a "1" or "0" or "2") by using the Receive PTP STATS command to freeze or unfreeze the counters. A PTP STATS Freeze command will set this bit to 1 and a PTP STATS Unfreeze command will clear this bit.<br><br>Note that if this bit is already set to 0, and a PTP STATS Unfreeze command is issued, the counters will be cleared without having been frozen. This allows the system software to clear the counters and start from 0.<br><br>Default: Hardware reset => 0, Software reset => unchanged |

FIG. 35B

| Bit | Symbol | Description |
|---|---|---|
| 10-6 | | Reserved, must be 0. |
| 5,4,3,2 | FT 3,2,1,0 | FIFO Threshold bits: These encoded bits determine the number of bytes that are written into the receive FIFO before a receive DMA request occurs. The receive FIFO thresholds would be chosen depending on the latency of the bus. There is an inverse relationship between the receive FIFO thresholds and the transmit FIFO thresholds. If the latency of a bus requires a very low receive threshold, then it follows that a very high transmit threshold would be chosen. The following table shows the encoding of the three bits and how each relates to RX and TX FIFO thresholds.<br><br>FT<3:0>    Receive FIFO    Transmit FIFO<br>0000    2    126<br>0001    4    124<br>0010    8    120<br>0011    16    112<br>0100    24    104<br>0101    32    96<br>0110    48    80<br>0111    64    64<br>1000    80    48<br>1001    96    32<br>1010    104    24<br>1011    112    16<br>1100    120    8<br>1101    124    4<br>1110    126    2<br>1111    64    64 |

FIG. 35C

| Bit | Symbol | Description |
|---|---|---|
| | | Each FIFO can store a maximum of 128 bytes. The number underneath each column specifies the threshold, in number of bytes, that must be reached before a bus request occurs. For more information on the FIFOs and FIFO thresholds, refer to Section 4.5, The Transmit and Receive FIFOs.<br>Default: Hardware reset => 0111, Software reset => unchanged<br>Note: FT<3:0> equal to 1101, 1110 and 1111 are not meant to be used under normal operation of the SCENIC. FT<3:0> equal to 1111 is equivalent to setting FT<3:0> equal to 0111, hence this is a redundancy. When FT<3:0> is set to 1101 or 1110, the receive threshold is so high that FIFO overflows will occur before the SCENIC gets a chance to even request the bus. Hence, these two settings are useless. |
| 1-0 | | Reserved, must be 0. |

FIG. 35D

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | HBEN | PEEN | 0 | 0 | 0 | 0 | SOEN | SWEN |

| Bit | Symbol | Description |
|---|---|---|
| 15-8 | | Reserved, must be 0. |
| 7 | HBEN | Heart Beat Lost Interrupt Enable:<br>0: disable interrupt<br>1: enables interrupts when a heartbeat lost condition occurs.<br>Default: Hardware reset => 0, Software reset => unchanged |
| 6 | PEEN | Parity Error Interrupt Enable:<br>0: disable interrupt<br>1: enables interrupts for transmit Parity Errors.<br>Default: Hardware reset => 0, Software reset => unchanged |
| 5-2 | | Reserved, Must be 0. |
| 1 | SCEN | Statistics Counter Overrun Occurred Enable:<br>0: disable interrupt<br>1: enables interrupts for LME Statistics Overruns.<br>Default: Hardware reset => 0, Software reset => unchanged |
| 0 | LWEN | Statistics Counter Overrun Warning Enable:<br>0: disable interrupt<br>1: enables interrupts for LME Statistics Overrun Warnings.<br>Default: Hardware reset => 0, Software reset => unchanged |

FIG. 36

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | HBL | PE | 0 | 0 | 0 | 0 | SCOO | SCOW |

| Bit | Symbol | Description |
|---|---|---|
| 15–8 | | Reserved, must be 0. |
| 7 | HBL | CD Heart Beat Lost: If the transceiver fails to provide a collision pulse (heart beat) during the first 6.4us of the Interframe Gap after transmission, this bit is set.<br>Default: Hardware reset => 0, Software reset => 0 |
| 6 | PE | Parity Error: The bit is set when a parity error has been detected for any data that enters the SCENIC that is not related to the transmit operation. This means that this interrupt is set only for parity errors detected during non-Transmit PTP command and transmit data transfers. Any parity error detected for Transmit PTP command and data transfers will instead be reported in the Transmit Network Status field returned to the bus interface chip after a transmission has completed. See the Transmit Parity Error bit in the Transmit Network Status Register for more information.<br>Default: Hardware reset => 0, Software reset => 0 |
| 5–2 | | Reserved, must be 0. |
| 1 | SCOO | Statistics Counter Overrun Occurred: If any of the statistics counter registers overflow without being read, this interrupt will be set. This interrupt signifies that network statistics have been lost due to a counter roll over.<br>Default: Hardware reset => 0, Software reset => 0 |
| 0 | SCOW | Statistics Counter Overrun Warning: This interrupt is a warning so that precautionary steps can be taken to avoid loosing network statistics due to a statistics counter overrun. The statistics counters have a threshold. Once this threshold has been crossed, the SCENIC will interrupt the supporting Bus Interface chip in order to notify it that the statistics counters should be read as soon as possible. If the counters are not read in time, a counter roll over will occur.<br>Each statistic counter is large enough to allow that counter to count its particular condition at the maximum rate that condition can occur for about 8 minutes. The overrun warning interrupt will be set when any counter has reached its halfway point which is when all but the most significant bit are set to 1 (i.e. 01111....). Once an interrupt has been issued for one counter, it will not be issued again until all counters have been cleared. Note that even if a counter is not read, it is necessary to clear that counter in order for the interrupt warning to work again. An RX PTP STATS Unfreeze command can be used to clear all the counters at once if desired. Otherwise, when a counter is read, it will automatically be read.<br>Default: Hardware reset => 0, Software reset => 0 |

FIG. 37

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| ID3 | ID2 | ID1 | ID0 | AS | IBEN | BE | LFNB | LFBB | 1 | 1 | 1 | 1 | 1 | 1 | 1 |

| Bit | Symbol | Description |
|-----|--------|-------------|
| 15–12 | ID 3,2,1,0 | NCDI ID Decodes: This 4 bit code is used as the NCDI Bus identifier bits that are driven on ID<3:0>. |
| 11 | AS | Arbiter Select: This bit should be programmed with a 1 if the SCENIC receiving the EEPROM load has been designated the Bus Arbiter. A 0 in this location will disable the on chip arbiter. |
| 10 | IBEN | IBM Mode Enable: In order for this chip to function with an IBM BI chip, the IBM enable bit must be set to a 0. When this bit is set to a 1, the SCENIC will work with the National Semiconductor NCDI bus.<br><br>Note: External interface hardware may be needed to make the SCENIC work completely with IBM BI chips. The main purpose of this bit is to cause the SCENIC to use an IBM compatible PTP Command set. |
| 9 | BE | Bootstrap Enable: If this bit is reset the Bootstrap state machine will be enabled to help initialize the supporting bus interface chip by writing certain configuration information to that chip. If this bit is set to a 1, the Bootstrap logic will not perform the bus interface initialization steps. While operating with IBM Mode disabled (multi-MAC system), this bit must be set for proper operation. While operating in IBM Mode, this bit will need to be reset for proper operation. |

FIG. 38A

| Bit | Symbol | Description |
|---|---|---|
| 8 | LFNB | Look for NCDI Base: When set to 0, this bit causes the Boot Configuration state machine to look for a 16 bit base address for the NCDI register space following the 48 bit source address in the EEPROM. This 16 bit address is loaded into the NCDIBASE register. When set to 1 (the default), no address will be read. |
| | | Note: This bit serves no purpose on the SCENIC since the NCDIBASE register that would be loaded when this bit is set to 0 has been removed (due to the 8 bit address space of the SCENIC, NCDIBASE is no longer needed.) This bit is documented here because it was not removed when NCDIBASE was removed, so the SCENIC will still go through the motions of reading the NCDI Base address from the EEPROM. It will not, however, be able to write it into the NCDIBASE register. |
| 7 | LFBB | Look for BI Base: When set to 0, this bit causes the Boot Configuration state machine to look for another 16 bit address following the NCDI Base address (or the 48 bit source address if LFNB is not set to 0 above) in the EEPROM. This second address will contain the programmed base for the Bus Interface registers and will be loaded into the BIBASE register. When set to 1 (the default), no address will be read. |
| | | Note: This bit serves no purpose on the SCENIC since the BIBASE register that would be loaded when this bit is set to 0 has been removed (due to the 8 bit address space of the SCENIC, BIBASE is through the motions of reading the BI Base addressed from the removed when BIBASE was removed, so the SCENIC will still go through the motions of reading the BI Base address from the EEPROM. It will not, however, be able to write it into the BIBASE register. |
| 6-0 | | Reserved, must be 1. |

FIG. 38B

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| EXT | TPTST | LD | HBE | MS | LSS | AUI | JBEN | 0 | TFI | 0 | 0 | 0 | 0 | 0 | SATP |

| Bit | Symbol | Description |
|---|---|---|
| 15 | EXT | External ENDEC Mode: If this bit is set to a 1, the external ENDEC signals will be enabled for use with an external ENDEC.<br>Default: Hardware reset => 0, Software reset => unchanged |
| 14 | TPTST | TPI Test Configuration: If this bit is set to "1", the TPI will be put into test mode. In normal operation this bit should be set to "0".<br>Default: Hardware reset => 0, Software reset => unchanged |
| 13 | LD | Link Disable: If this bit is set to a 0, the link integrity function is disabled. If the Link function is disabled the transceiver does not transmit any link pulses and always remains at a good link state.<br>Default: Hardware reset => 1, Software reset => unchanged |
| 12 | HBE | Heart Beat Enable: If this bit is a 1, the heartbeat function is enabled. Resetting this bit to a "0" will disable this feature.<br>Default: Hardware reset => 1, Software reset => unchanged |
| 11 | MS | Media Select: This bit selects drivers for Unshielded Twisted Pair (UTP) or Shielded Twisted Pair (STP) media. If this bit is set to a 1, the STP (150 ohm cable) drivers will be selected. Programming this bit to be a 0 will select UTP (100 ohm cable) drivers.<br>Default: Hardware reset => 0, Software reset => unchanged |
| 10 | LSS | Low Squelch Select: When set to a 1, the twisted pair receiver threshold will be set lower than the IEEE 802.3 10BASE-T specification.<br>Default: Hardware reset => 0, Software reset => unchanged |
| 9 | AUI | AUI/TP: When set to a 1, the AUI (ENDEC only) is selcted. When set to a 0, the TPI (ENDEC and Twisted Pair transceiver) module is selected.<br>Default: Hardware reset => 0, Software reset => unchanged |
| 8 | JBEN | Jabber Enable: This bit enables the automatic transmit disable due to jabber. When this bit is set to 1, any time the SCENIC transmits for longer than 26 ms, the transmitter will be disabled until the transmission stops. The transmission must have stopped for at least 750 ms before the jabber function re-enables the transmit outputs again. When this bit is set to 0, the transmitter will not be shut down due to a jabber packet being transmitted.<br>Default: Hardware reset => 1, Software reset => unchanged |
| 7 | | Reserved, must be 0. |

FIG. 39A

| Bit | Symbol | Description |
|---|---|---|
| 6 | TFI | Traffic Ignore: When set, this configuration bit puts the SCENIC into full duplex mode. In this mode, the SCENIC MAC, ENDEC and transceiver may transmit and receive network data at the same time without conflicts due to collisions.<br>Default: Hardware reset => 0, Software reset => unchanged |
| 5-1 | | Reserved, must be 0. |
| 0 | SATP | ETEMPL Stand Along Mode: When this bit is set, the SCENIC ETEMPL module will be placed in ETEMPL stand alone mode. In this mode, the SCENIC becomes an ETEMPL. The external ENDEC interface is used to connect to the ETEMPL block so that it can be used like a stand along ENDEC and transceiver. This is mainly for test purposes.<br>Default: Hardware reset => 0, Software reset => unchanged |

FIG. 39B

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| 0 | OWC | CRSL | TXPE | FU | TCC1 | TCC0 | PTX | NCRS | DEF | EXD | EXC | Ncol3 | Ncol2 | Ncol1 | Ncol0 |

| Bit | Symbol | Description |
|-----|--------|-------------|
| 15 | | Reserved, must be 0. |
| 14 | OWC | Out of Window Collision: Indicates that an illegal collision has occurred after 51.2 us (one slot time) from either the first bit of preamble or from SFD depending upon the POWC bit (see Transmit Configuration register). The transmission backs off as in a normal transmission. |
| 13 | CRSL | Carrier Sense Lost: This bit indicates that a carrier sense has been detected following the transmission of the preamble. Then, at some later point in the transmission, the carrier sense is lost. Therefore, in order to set this status bit, the carrier sense must first arrive, then go away during the course of a transmission.<br>Note 1: This bit pertains only to transmission. When a packet is transmitted, the transceiver loops the packet back to the receive logic. This causes the carrier sense to be detected. If the transceiver does not loop the packet back, then the carrier will not be seen.<br>Note 2: When operating in full duplex mode, the transceiver is not suppose to loop the packet back. Hence, CRSL and NCRS have no meaning in full duplex mode.<br>Note 3: If carrier sense was never present (NCRS is set), then CRSL will also be set. |
| 12 | TXPE | Transmit Parity Error: This bit is set if a parity error has been detected on any commands or data used in the Transmit Packet Transfer Protocol (TPTP). This means anytime a parity error is detected when the SCENIC reads transmit commands or transmit data from the bus interface chip or anytime a parity error is detected during a TPTP command write to the SCENIC by the bus interface chip. If a Tarnsmit Parity Error occurs, the Transmission will be aborted and this status will be returned indicating the error.<br>Note 1: Any parity errors detected for data transfers to the SCENIC that are not related to transmits (e.g. all configuration register accesses, receive operations, etc.) will be indicated to the bus interface chip using the Parity Error interrupt in the Interrupt Status Register. |

FIG. 40A

| Bit | Symbol | Description |
|---|---|---|
| 11 | FU | Transmit FIFO Underrun: Indicates that the SCENIC has not been able to access the NCDI bus before the FIFO has emptied. This condition occurs from excessive bus latency. When a FIFO underrun occurs, the SCENIC will abort the current transmission using the Transmit ABORT PTP command, and pass status back to the supporting Bus Interface chip.<br><br>Note: If the Transmit ABORT command has been disabled by the TX ABORT disable bit in the Transmit Configuration Register, then when a FIFO underrun occurs, the SCENIC will continue pulling transmit data out of the bus interface chip until an EOF is reached. Then the transmit status will be written to the bus interface chip. |
| 10,9 | TCC 1,0 | Transmit Serial Completion Code: These two bits contain the following encoded information dealing with aborted and canceled transmissions:<br><br>TCC<1:0><br>  00  Normal Completion<br>  01  Confirm Transmit ABORT — This condition acknowledges that the Transmit PTP ABORT command from the bus interface chip was received and executed.<br>  10  Abort Transmission — One of 3 conditions occurred:<br><br>    — Un-Retransmitable Collision (URC) — This condition occurs if a collision is seen but the SCENIC is unable to back off and retransmit because the SOF has been over-written in the FIFO. This error causes the SCENIC to abort the current transmission and return status indicating this error. See Section 4.4.1.4, Automatic Re-transmit on Collision, for more information about packet retransmission.<br><br>    — Excessive Collision (EXC)<br>    — Excessive Deferral (EXD)<br><br>  11  Cancel Accept — This condition indicates that the transmitter was disabled (see TXEN in the Data Configuration Register) while an attempt to transmit a frame was being made. If the transmitter is disabled before the transmission on the network media has actually started, then the current transmission will be aborted and transmit status will be returned with TCC1 and TCC0 set to indicate the transmission was canceled. |

FIG. 40B

| Bit | Symbol | Description |
|---|---|---|
| 8 | PTX | Packet Transmitted OK: Indicates that a packet has been transmitted without an abort, cancel or any of the following fatal errors:<br>– Excessive Collisions (EXC)<br>– Excessive Deferral (EXD)<br>– Transmit FIFO Underrun (FU)<br>– Un-Retransmitable Collision (URC)<br>– Transmit Parity Error (TXPE)<br>When in IBM mode this bit is always a "0". |
| 7 | NCRS | No Carrier Sense: When set, NCRS means that carrier sense was not present any time during transmission afte the SFD has been transmitted. At the start of each transmission, NCRS is set to 1. Anytime after SFD has been transmitted, if carrier sense is sampled active during a transmission, NCRS is reset by the hardware.<br>Note 1: This bit pertains only to transmission. When a packet is transmitted, the transceiver loops the packet back to the receive logic. This causes the carrier sense to be detected. If the transceiver does not loop the packet back, then the carrier will not be seen.<br>Note 2: When operating in full duplex mode, the transceiver is not suppose to loop the packet back. Hence, CRSL and NCRS have no meaning in full duplex mode.<br>Note 3: If carrier sense was never present (NCRS is set ), then CRSL will also be set. |
| 6 | DEF | Deferred Transmission: Indicates that the SCENIC has deferred its transmission during the first attempt only. If subsequent collisions occur, this bit is reset. |
| 5 | EXD | Excessive Deferral: Indicates that the SCENIC has been deferring on the network for 1.6 ms. If the excessive deferral timer is enabled (see EXDIS in Transmit Configuration register), the SCENIC will abort the transmission with a Transmit ABORT command (if not disabled by the TXAD bit in the Transmit Configuration Register). |
| 4 | EXC | Excessive Collisions: Indicates that 16 collisions have occurred for a given transmission attempt. Should this condition occur, the SCENIC will abort the transmission with a Transmit ABORT COMMAND (if not disabled by the TXAD bit in the Transmit Configuration Register). |
| 3-0 | NCOL 3,2,1,0 | Number of Collisions: These four bits represent a count of the number of collisions that occurred for the transmission attempt. Bit 3 is the MSB and bit 0 is the LSB. Note that if 16 collisions are listed (NCOL<3:0> = 1), then EXC will also be set. |

FIG. 40C

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CRCI | ATP | Powc | Exdis | LB1 | LB0 | 0 | 0 | 0 | 0 | TXAD | FR64 | IFG3 | IFG2 | IFG1 | IFG0 |

| Bit | Symbol | Description |
|---|---|---|
| 15 | CRCI | CRC Inhibit: This bit is written by bit 11 in the attribute field of each Transmit SOF command written to the SCENIC. CRCI controls automatic appending of CRC on the end of a packet.<br>0: packet transmitted with automatically generated CRC<br>1: packet transmitted without the automatically generated CRC |
| 14 | ATP | Automatic Transmit Padding: This bit is written by bit 10 in the attribute field of each Transmit SOF command written to the SCENIC. When automatic padding is enabled, the transmitter will pad any runt frames transmitted (i.e. less than 64 bytes in length) until their total length is 64 bytes. If the CRC has not been inhibited, the automatic padding will only pad up to the 60th byte thus relying on the 4 bytes of CRC to meet the minimum 64 byte length requirement.<br>0: automatic padding disabled<br>1: automatic padding enabled |
| 13 | POWC | Program "Out of Window Collision" Timer: This bit is written by bit 9 in the attribute field of each Transmit SOF command written to the SCENIC. This bit programs when the out of window collision timer begins counting its 51.2$\mu$s slot time.<br>0: timer begins after the Start of Frame Delimiter (SFD)<br>1: timer beings after the first bit of preamble |
| 12 | EXDIS | Excessive Deferral Timer Disable: This bit is written by bit 8 in the attribute field of each Transmit SOF command written to the SCENIC. When the excessive deferral timer is enabled, the SCENIC will abort the transmission with a Transmit ABORT command (if not disabled by the TXAD bit in the Transmit Configuration Register) if it must defer for 1.6 ms.<br>0: excessive deferral timer enabled<br>1: excessive deferral timer disabled |

FIG. 41A

| Bit | Symbol | Description |
|---|---|---|
| 11,10 | LB 1,0 | Physical Layer Loopback Control: These bits are written by bits 7 and 6 of the attribute field of each Transmit SOF command written to the SCENIC. By carrying this information within the SOF command, the SCENIC will be able to change the loopback configuration on the fly. The following table shows the encoding scheme used for these two bits:<br><br>LB1,0<br><br>00   no loopback, normal operation<br>01   MAC loopback<br>10   ENDEC loopback<br>11   Transceiver loopback<br><br>Note: When Traffic Ignore mode (TFI from the Network Interface Configuration Register) is enabled, all three loopback modes do not work. |
| 9–6 | | Reserved, must be 0. |
| 5 | TXAD | TX ABORT Disable: When set, this configuration bit blocks the SCENIC's ability to send a Transmit PTP ABORT command to the supporting Bus Interface chip. If this command is disabled, the SCENIC will instead pull all remaining transmit data from the bus interface chip's transmit buffers until an EOF is reached. The ABORT command can be sent from the bus interface chip to the SCENIC for a reception and a transmit, but the SCENIC can only send an ABORT to the bus interface for a transmit. This bit will only disable the case where the SCENIC writes an ABORT to the bus interface chip to abort a transmit from the bus interface. |
| 4 | F64R | Forced 64 Byte Retransmit from the FIFO: When set to a 1, this bit ensures that the SCENIC will always be able to retransmit the first 64 bytes of a packet from the FIFO regardless of the FIFO threshold. Since increasing the Transmit FIFO threshold to a number greater than 64 reduces the number of bytes the SCENIC can retransmit from the FIFO, if it is desired to preserve the ability to retransmit the first 64 bytes, this bit must be set. For more information about this bit and how the FIFO threshold affects the transmit FIFO, see Section 4.4.1.4, Automatic Retransmit on Collision. |

FIG. 41B

| Bit | Symbol | Description |
|---|---|---|
| 3-0 | IFG 3,2,1,0 | Programmable Interframe Gap Time: These bits will afford the user some flexibility when it comes to determining the transmitter's IFG time. IEEE802.3 specifies the Interframe Gap to be 9.6 µs. By using these bits, the IFG time for the SCENIC can be programmed to be any value between 9.6 µs to 0.8 µs.<br><br>The following formula gives the desired IFG time based on these bits:<br>$$9.6\mu s - 0.8 \text{ (decimal IFG<3:0>) } \mu s$$<br>The "decimal IFG<3:0>" should be interpreted as the decimal value of the encoded bits. The range allowed for IFG<3:0> is 0000 to 1011 (decimal 0 to 11). If 1100 to 1111 (decimal 12 to 15) is programmed for IFG<3:0>, then the time modifier will default to 11 (an IFG of 0.8 µs).<br><br>Note that if the IFG is reduced from the default of 9.6 µs, it is possible that conflicts with the heart beat signal may occur. If this is the case, then heartbeat should be disabled in the twisted pair transceiver by clearing the HBE bit in the Network Interface Configuration Register. Also, the heartbeat lost interrupt should be masked out in the Interrupt Mask Register and the Heartbeat Lost Interrupt should be ignored. |

FIG. 41C

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| COL | CRCE | FAE | DA | MCA | BCA | LBP | PROK | FO | RUNT | LONG | PREJ | 0 | 0 | 0 | ABRT |

| Bit | Symbol | Description |
|---|---|---|
| 15 | COL | Collision Activity: Indicates that the packet received had a collision occur during reception. This bit will not be set due to a collision prior to the SFD (since a received packet cannot be copied to the bus interface chip unless more than the preamble is received). |
| 14 | CRCE | CRC Error: Indicates the packet received contains a CRC error. If the packet also contains a Frame Alignment error, FAE will be set instead of CRCE since a Frame Alignment error is also a CRC Error. |
| 13 | FAE | Frame Alignment Error: Indicates that the incoming packet was not correctly framed on an 8 bit boundary. This bit will only be set if a CRC error has also been detected. If this bit is set, then CRCE will not be set. |
| 12 | DA | Destination Address Match: This bit indicates that the received frame's destination address matched the address in the CAM. |
| 11 | MCA | Multicast Address: This bit indicates that the received frame's destination address is of type "multicast". |
| 10 | BCA | Broadcast Address: This bit indicates that the received frame's destination address is of type "broadcast". If this bit is set, the MC bit will not be set. |
| 9 | LBP | Loopback Packet: This bit indicates that the received frame originated from within the same SCENIC and was looped back to the receiver by a loopback configuration. This includes both ENDEC and transceiver loopback. |
| 8 | PROK | Packet Received OK: Indicates that a packet has been received without CRC, frame alignment, length (runt packet) errors or collisions. |
| 7 | FO | Receive FIFO Overrun: This bit indicates that the SCENIC Receive FIFO has overrun before the SCENIC was able to write the data to the bus interface chip. |
| 6 | RUNT | Runt Packet Received: This bit is set whenever a runt packet (a packet less than 64 bytes in length) has been received. |
| 5 | LONG | Jabber Packet Received: This bit is set whenever an oversized frame (a packet greater than 1518 bytes in length) has been received. |

FIG. 42A

| Bit | Symbol | Description |
|---|---|---|
| 4 | PREJ | Packet Rejected by $\overline{PREJ}$ Signal: When a packet is rejected by an external CAM by the use of the $\overline{PREJ}$ signal, this bit will be set. Since PREJ may be asserted anytime during a packet reception, it is possible that a packet will be rejected after part of that packet's data has been transferred to the bus interface chip. This bit will indicate to the bus interface, or the system software, that the packet was rejected by the external CAM in such a situation. |
| 3-1 | | Reserved, must be 0. |
| 0 | ABRT | Packet Aborted by Bus Interface: This bit is set when a PTP RX Abort Command is used to abort the current reception. This status bit confirms to the bus interface that the abort worked. |

FIG. 42B

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ERR | RNT | BRD | PRO | AMC | RJCM | TJAB | RAS | 0 | 0 | 0 | 0 | 0 | 0 | 0 | 0 |

| Bit | Symbol | Description |
|---|---|---|
| 15 | ERR | Accept Packets with Errors or Collisions: Enable reception of packets with CRC and collision errors.<br>0: All packets received with CRC errors or with collision indication are rejected.<br>1: All packets received with CRC errors or collision indication are accepted and passed on.<br>Default: Hardware reset => 0, Software reset => unchanged |
| 14 | RNT | Accept Runt packets: Enable reception of packets less than 64 bytes in length (excluding preample).<br>0: All runt packets are rejected.<br>1: All runt packets are accepted and passed on.<br>Default: Hardware reset => 0, Software reset => unchanged |
| 13 | BRD | Accept Broadcast Packets: Enable reception of all packets with the broadcast address as the destination address.<br>0: Normal Address Match mode. Broadcast packets are rejected.<br>1: Accept and pass on all broadcast packets.<br>Default: Hardware reset => 1, Software reset => unchanged |
| 12 | PRO | Physical Promiscuous Mode: Enable reception of all physical address packets.<br>0: Normal address match mode. Only packets with physical addresses that match addresses in the CAM are accepted and passed on.<br>1: Accept all packets with a destination address that is a physical address.<br>Default: Hardware reset => 1, Software reset => unchanged |
| 11 | AMC | Accept all Multicast Packets: Enable reception of all packets with a multicast address as the destination address.<br>0: Normal Address match mode. Packets with a multicast address for the destination address will only be accepted if the address is matched in the CAM.<br>1: Enables all multicast packets to be accepted, regardless of the contents of the CAM. Note that since the broadcast address is a multicast address, packets with a broadcast address will also be accepted.<br>Default: Hardware reset => 1, Software reset => unchanged |

FIG. 43A

| Bit | Symbol | Description |
|---|---|---|
| 10 | RJCM | Reject on CAM Match: When this bit is set to "1", the SCENIC will reject a packet on a CAM match. Setting RJCM to "0" causes the SCENIC to operate normally by accepting packets on a CAM match. Setting this mode is useful for a small bridge with a limited number of nodes attached to it. RJCM only affects the CAM, though. Setting RJCM will not invert the function of the BRD, PRO or AMC bits. This means, for example, that it is not possible to set both RJCM and BRD in order to reject all broadcast packets. If RJCM and BRD are set at the same time, all broadcast packets will be accepted, but any packets that have a destination address that matches an address in the CAM will be rejected, even if that address is a broadcast address.<br><br>Default: Hardware reset => 0, Software reset => unchanged |
| 9 | TJAB | Truncate Jabber Packets: Enable reception of packets that are greater than 1518 bytes in length (excluding preamble).<br><br>0: The full length jabber packet will be passed on. The receive status will still indicate that the packet was a jabber packet.<br><br>1: All jabber packets are truncated at 1518 bytes. When the length of a packet being received exceeds 1518 bytes, the SCENIC will stop putting received data into the FIFO and stop the current packet reception. An EOF command and status will be sent to the bus interface indicating a jabber packet was received (see the LONG bit in the Receive Status Register).<br><br>Default: Hardware reset => 1, Software reset => unchanged |
| 8 | RAS | Received Address Strobe Mode: This bit controls the function of the BSTR/ADFG signal. When RAS = 0, BSTR/ADFG will operate as the BSTR signal. When RAS = 1, it will operate as the ADFG signal. As BSTR, the signal will produce a strobe pulse at the SFD, and the end of each byte received as the serial data from the network is driven on the RXD line. As ADFG, whenever the destination and source address is transferred across the NCDI bus, ADFG will be asserted low to indicate this fact. As long as ADFG is low, the data being transferred is made up of packet address information.<br><br>Default: Hardware reset => 0, Software reset => unchanged |
| 7-0 | | Reserved, must be 0. |

FIG. 43B

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| FAIR | 3BR2 | 3BR1 | 3BR0 | 2BR2 | 2BR1 | 2BR0 | 1BR2 | 1BR1 | 1BR0 | 0BR2 | 0BR1 | 0BR0 | ARB2 | ARB1 | ARB0 |

| Bit | Symbol | Description |
|---|---|---|
| 15 | FAIR | Fairness Enable: When set, this configuration bit instructs the bus arbiter to grant the bus in a fair manner. That means that once a bus master has given up the bus, that bus master cannot own the bus again until all other bus masters have been given the chance to own the bus. This is regardless of priority.<br>Default: Hardware reset => 1, Software reset => unchanged |
| 14-12 | 3BR2..0 | Priority for $\overline{BREQ3}$: This 3 bit value would be programmed with the priority of the device connected to $\overline{BREQ3}$.<br>Default: Hardware reset => 4h, Software reset => unchanged |
| 11-9 | 2BR2..0 | Priority for $\overline{BREQ2}$: This 3 bit value would be programmed with the priority of the device connected to $\overline{BREQ3}$.<br>Default: Hardware reset => 3h, Software reset => unchanged |
| 8-6 | 1BR2..0 | Priority for $\overline{BREQ1}$: This 3 bit value would be programmed with the priority of the device connected to $\overline{BREQ3}$.<br>Default: hardware reset => 2h, Software reset => unchanged |
| 5-3 | 0BR2..0 | Priority for $\overline{BREQ0}$: This 3 bit value would be programmed with the priority of the device connected to $\overline{BREQ3}$..<br>Default: Hardware reset =>1h, Software reset => unchanged |
| 2-0 | ARB2..0 | Priority for Bus Arbiter: This 3 bit value would be programmed with the priority of the Bus Arbiter itself.<br>Default: Hardware reset => 0h, Software reset => unchanged |

FIG. 44

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ERD | EWR | NDTA | 0 | 0 | 0 | 0 | EPSB | EC7 | EC6 | EC5 | EC4 | EC3 | EC2 | EC1 | EC0 |

| Bit | Symbol | Description |
|---|---|---|
| 15 | ERD | EEPROM Read Command Flag: When writing a command into the EEPROM Command Register, this bit must be set to "1" to indicate that the command written in EC<7:0> is an EEPROM read command. ERD and EWR or NDTA should never be set at the same time.<br>Default: Hardware reset => 0, Software reset => unchanged |
| 14 | EWR | EEPROM Write Command Flag: When writing a command into the EEPROM Command Register, this bit must be set to "1" to indicate that that command written in EC<7:0> is an EEPROM write command. EWR and ERD or NDTA should never be set at the same time.<br>Default: Hardware reset => 0, Software reset => unchanged |
| 13 | NDTA | EEPROM No Data Command Flag: When writing a command into the EEPROM Command Register, this bit must be set to "1" to indicate that the command written in EC<7:0> is a command that does not require either writing or reading of data. This means that only EC<7:0> will be sent to the EEPROM. No data will be written or read from the EEPROM. NDTA and ERD or EWR should never be set at the same time.<br>Default: Hardware reset => 0, Software reset => unchanged |
| 12-9 | | Reserved, must be 0. |
| 8 | EPSB | EEPROM Start Bit: All NM93C06 EEPROM commands are started with a 01 pattern where the 1 is a start bit. The 0 comes from the fact that the EEPROM DI pin (equivalent to the SCENIC PROMDI signal) is normally held low. Following the 01 pattern is the 8 bit command/address. When using the BECR, the start bit is not automatically sent by the SCENIC. Because of this, thr EPSB bit must be used. EPSB is the start bit that precedes the command that is written to EC<7:0>. In order to meet the requirements of the NM93C06, EPSB should always be written with a 1.<br>Default: Hardware reset => 1, Software reset => unchanged |

FIG. 45A

| Bit | Symbol | Description |
|---|---|---|
| 7-0 | EC<7:0> | EEPROM Command Field: This 8 bit value is the 8 bit command that will be deserialized and sent to the boot EEPROM. The first bit sent will be bit EC7. If the command is a read command, then ERD, above, should be set to indicate this fact. This will cause the SCENIC to expect data back from the EEPROM. The first 16 bits of data deserialized from the EEPROM in a read operation will be loaded into the EEPROM Data Register (BEDR). If the command is a write command, then EWR should be set above. This will cause the SCENIC to follow the 8 bit command with 16 bits of date from the BEDR register. If the command is neither a write nor a read (i.e. the BEDR is not needed for this command), then the NDTA bit should be set above. After a command has been written out to the EEPROM, this register will be cleared.<br>Default: Hardware reset => 00h, Software reset => unchanged |

FIG. 45B

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| EIOS | EBPS | ESMO | TBEN | TBD | TBF | RBEN | RBD | RBF | SSBO | LBYP | 0 | 0 | 0 | 0 | 0 |

| Bit | Symbol | Description |
|---|---|---|
| 15 | EIOS | Enable IO Scan: If set to "1", indicates that the IO scan has been enabled. |
| 14 | EBPS | Enable BYPASS mode: If set to a 1, the IO scan chain is being by-passed, thus the first boundary scan cell is shorted to the last. Default: Hardware reset => 0, Software reset => unchanged |
| 13 | ESMO | Enable State Machine Observation Mode: When this bit is set to 1, and the SCENIC is not in external ENDEC or Stand Alone ENDEC mode, the state of the selected state machine is output on the External ENDEC pins. The desired state machine is selected by writing its mapped value into register 52H (see Roy). The bit mapping for the state# (in hex) on the output pins is as follows: <0..5>= <COL,RXC,RXD,CRS,TXD,TXC>. In addition, the ring clock can be observed on the TXE pin. |
| 13 | | Reserved: Must be 0. |
| 12 | TBEN | Transmit BIST Enable: If this bit is a 1, then BIST has been enabled for the transmit FIFO. If TBD is also set, then BIST is complete. |
| 11 | TBD | Transmit BIST Done: This bit, when set to a 1, indicates that BIST has been performed and completed on the transmit FIFO. |
| 10 | TBF | Transmit BIST Fail: When set to a 1, indicates the transmit FIFO had a BIST error. |
| 9 | RBEN | Receive BIST Enable: If this bit is a 1, then BIST has been enabled for the receive FIFO. If RBD is also set, then BIST is complete. |
| 8 | RBD | Receive BIST Done: This bit, when set to a 1, indicates that BIST has been performed and completed on the receive FIFO. |
| 7 | RBF | Receive BIST Fail: When set to a 1, indicates the receive FIFO had a BIST error. |
| 6 | SSBO | Single Slot Back Off: When set to 1, SCENIC will back off exactly one slot time before trying to retransmit after a collision. This should only be used for test purposes, since there must be a random back off time before retransmit for IEEE compliance. |
| 5 | LBYP | Loopback BYPass: When this bit is set to 1, the Loopback logic is bypassed, in case it doesn't work. |
| 4-0 | | Reserved: Must be 0. |

FIG. 46

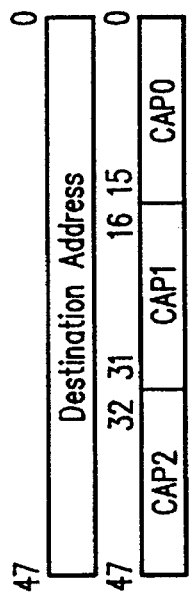
FIG. 47
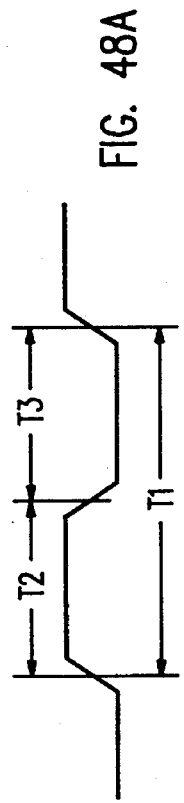
FIG. 48A
| Number | Parameter | 10 MHz | | 12.5 MHz | | 16.67 MHz | | Units |
|---|---|---|---|---|---|---|---|---|
| | | Min | Max | Min | Max | Min | Max | |
| T1 | BSCK Cycle Time (note 1) | 100 | 125 | 80 | 125 | 60 | 125 | ns |
| T2 | BSCK High Time | 40 | | 32 | | 24 | | ns |
| T3 | BSCK Low Time | 40 | | 32 | | 24 | | ns |
Note 1: The SCENIC is specified to work down to 8 MHz for the data sheet, but has been functionally tested to work down to X MHz.
FIG. 48B

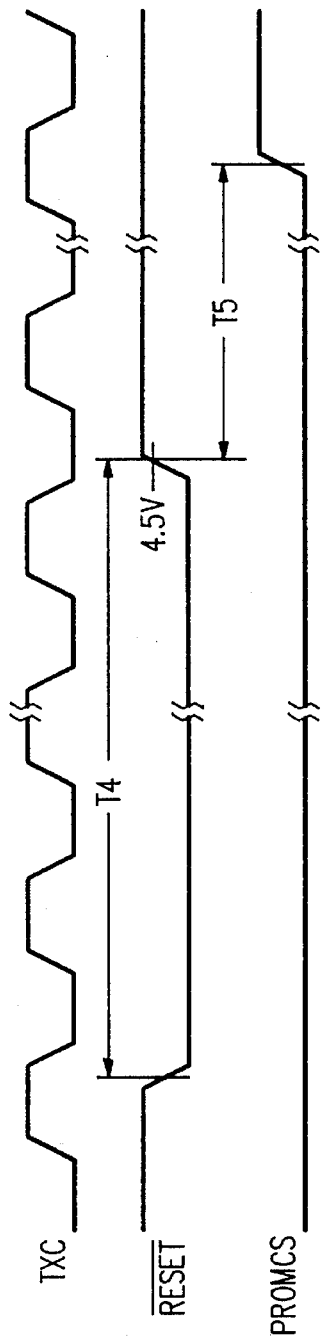

FIG. 50A

| Number | Parameter | 10 MHz | | 12.5 MHz | | 16.67 MHz | | Units |
|---|---|---|---|---|---|---|---|---|
| | | Min | Max | Min | Max | Min | Max | |
| T4 | RESET Pulse Width (notes 1, 2) | 10 | | 10 | | 10 | | TXC |
| T5 | RESET High to PROMCS High (notes 1, 3) | 1 | | 1 | | 1 | | PROMSK |

Note 1: These specifications are not tested, but are guaranteed by design.

Note 2: The RESET signal must be held asserted for a period of at least 10 transmit clocks (TXC) to properly reset the chip. If BSCK is much slower than TXC (<8 MHz), then RESET should be held low for 10 bus clocks (BSCK) instead.

Note 3: This is an indication of the period between RESET being deasserted, and the SCENIC starting the initialization from the PROM. When RESET is deasserted, the EEPROM clock, PROMSK, starts its first period. PROMCS is asserted high immediatly after the end of the first PROMSK period. PROMSK operates at 1/20th of the BSCK frequency.

FIG. 50B

| Number | Parameter | 10 MHz | | 12.5 MHz | | 16.67 MHz | | Units |
|---|---|---|---|---|---|---|---|---|
| | | Min | Max | Min | Max | Min | Max | |
| T8 | BREQ<3:0> Input Setup Time to BSCK High | 17 | | 14 | | 10 | | ns |
| T9 | BREQ<3:0> Input Hold Time from BSCK High | 10 | | 8 | | 6 | | ns |
| T10 | BGRANT<3:0> Output Low from BSCK High (note 1) | | 21 | | 17 | | 13 | ns |
| T11 | BGRANT<3:0> Output High from BREQ<3:0> High (note 2) | | 21 | | 17 | | 13 | ns |
| T12 | BGRANT<3:0> Output High from BSCK High (due to bus preemption) (note 3) | | 21 | | 17 | | 13 | ns |

Note 1: BREQ is sampled at the rising edge of the BSCK. Unless another device is currently using the bus, BGRANT will be asserted off the rising edge 1 BSCK later (as shown in the timing diagram above). If another device is using the bus, then the delay between BREQ being sampled and BGRANT being asserted will be much greater.

Note 2: When BREQ is driven high by the current bus master, the bus arbiter asynchronously deasserts BGRANT immediatly instead of off the next rising BSCK edge.

Note 3: Bus preemption is accomplished by the bus arbiter deasserting BGRANT to the current bus master. The current master must complete its current transfer and not perform a new transfer. It is not necessary, however, to deassert BREQ if the master still needs to use the bus.

FIG. 51B

| Number | Parameter | 10 MHz Min | 10 MHz Max | 12.5 MHz Min | 12.5 MHz Max | 16.67 MHz Min | 16.67 MHz Max | Units |
|---|---|---|---|---|---|---|---|---|
| T15 | BREQ<3:0> Output Valid from BSCK High | | 21 | | 17 | | 13 | ns |
| T16 | BGRANT<3:0> Input Setup to BSCK High | 33 | | 27 | | 20 | | ns |
| T17 | BGRANT<3:0> Input Hold from BSCK High | 10 | | 8 | | 6 | | ns |
| T18 | BVALID, CS High to TRI-STATE from BSCK Low (note 1, 2, 3) | | 21 | | 17 | | 13 | ns |
| T19 | A<7:0>, ID<3:0>, BYTE R/W Valid to TRI-STATE from BSCK High (note 2, 3) | | 21 | | 17 | | 13 | ns |
| T20 | D<15:0>, PARITY, P<1:0>, D/C, ADFG Valid to TRI-STATE (bus master write) (note 2, 3) | | 21 | | 17 | | 13 | ns |

Note 1: These signals are deasserted off the rising edge of BSCK. A half cycle later, they are made TRI-STATE off the falling edge of BSCK.

Note 2: The TRI-STATE to Valid timing for these signals is the same as the BSCK High to Valid timing shown in the Bus Master Read and Write Timing diagrams. If the transfer is the first of a bus tenure, then the signals come out of TRI-STATE to a valid state. On all subsequent transfers, the signals go from an invalid state to a valid state. In either case, the valid delay is the same.

Note 3: This timing value includes an RC delay inherent in the test measurement. These signals typically TRI-STATE 7 ns earlier, enabling other devices to drive these lines without contention.

FIG. 52B

| Number | Parameter | 10 MHz Min | 10 MHz Max | 12.5 MHz Min | 12.5 MHz Max | 16.67 MHz Min | 16.67 MHz Max | Units |
|---|---|---|---|---|---|---|---|---|
| T25 | BSCK High to A<7:0>, ID<3:0>, CS Valid | | 38 | | 30 | | 23 | ns |
| T26 | BSCK High to A<7:0>, ID<3:0>, CS Invalid | 10 | | 8 | | 6 | | ns |
| T27 | BSCK High to BVALID, R/W, BYTE Valid | | 32 | | 25 | | 19 | ns |
| T28 | BSCK High to D<15:0>, D/C Valid | | 32 | | 25 | | 19 | ns |
| T29 | BSCK High to P<1:0> Valid | | 38 | | 30 | | 23 | ns |
| T30 | BSCK High to D<15:0>, D/C, P<1:0> Invalid | 10 | | 8 | | 6 | | ns |
| T31 | BSCK High to PARITY Valid | | 38 | | 30 | | 23 | ns |
| T32 | BSCK High to ADFG Valid | | 38 | | 30 | | 23 | ns |
| T33 | BUSY, BS8 Setup to BSCK High | 32 | | 25 | | 19 | | ns |
| T34 | BRT Setup to BSCK High | 32 | | 25 | | 19 | | ns |
| T35 | BUSY, BS8, BRT Hold from BSCK High | 17 | | 14 | | 10 | | ns |

FIG. 53B

| Number | Parameter | 10 MHz Min | 10 MHz Max | 12.5 MHz Min | 12.5 MHz Max | 16.67 MHz Min | 16.67 MHz Max | Units |
|---|---|---|---|---|---|---|---|---|
| T25 | BSCK High to A<7:0>, ID<3:0>, CS Valid | | 38 | | 30 | | 23 | ns |
| T26 | BSCK High to A<7:0>, ID<3:0>, CS Invalid | 10 | | 8 | | 6 | | ns |
| T27 | BSCK High to BVALID, R/W, BYTE Valid | | 32 | | 25 | | 19 | ns |
| T33 | BUSY, BS8 Setup to BSCK High | 32 | | 25 | | 19 | | ns |
| T34 | BRT Setup to BSCK High | 32 | | 25 | | 19 | | ns |
| T35 | BUSY, BS8, BRT Hold from BSCK High | 17 | | 14 | | 10 | | ns |
| T36 | D<15:0>, D/C Setup to BSCK High | 42 | | 33 | | 25 | | ns |
| T37 | PARITY, P<1:0> Setup to BSCK High | 32 | | 25 | | 19 | | ns |
| T38 | D<15:0>, D/C, PARITY, P<1:0> Hold from BSCK High | 17 | | 14 | | 10 | | ns |

FIG. 54B

| Number | Parameter | 10 MHz | | 12.5 MHz | | 16.67 MHz | | Units |
|---|---|---|---|---|---|---|---|---|
| | | Min | Max | Min | Max | Min | Max | |
| T45 | A<7:0>, ID<3:0>, BVALID, R/W Setup to BSCK High (note 1, 2, 3) | 50 | | 40 | | 30 | | ns |
| T46 | A<7:0>, ID<3:0>, BVALID, R/W Hold from BSCK High | 15 | | 12 | | 9 | | ns |
| T47 | D<15:0>, P<1:0>, D/C, PARITY Setup to BSCK High | 21(10) | | 17 | | 13 | | ns |
| T48 | D<15:0>, P<1:0>, D/C, PARITY Hold from BSCK High | 15(7) | | 12 | | 9 | | ns |

Note 1: Since 8 bit tranfers are not supported, the BYTE signal is ignored during slave transfers.

Note 2: Since CS is only used to select the Bus Interface Chip, CS is ignored during slave cycles.

Note 3: There is no need for the SCENIC to assert BS8, BUSY AND BRT since the SCENIC does not support 8 bit slave tranfers, it does not need to add wait states and the SCENIC will never need to cause a transfer retry. Because of this, the SCENIC does not drive these signals at all during slave transfers. Instead, the SCENIC expects external pullup resistors to be placed on these signal to pull them high.

FIG. 55B

| Number | Parameter | 10 MHz | | 12.5 MHz | | 16.67 MHz | | Units |
|---|---|---|---|---|---|---|---|---|
| | | Min | Max | Min | Max | Min | Max | |
| T45 | A<7:0>, ID<3:0>, $\overline{BVALID}$, R/$\overline{W}$ Setup to BSCK High (note 1, 2, 3, 5) | 50 | | 40 | | 30 | | ns |
| T46 | A<7:0>, ID<3:0>, $\overline{BVALID}$, R/$\overline{W}$ Hold from BSCK High | 15 | | 12 | | 9 | | ns |
| T49 | D<15:0>, D/$\overline{C}$ Valid from A<7:0>, $\overline{BVALID}$, ID<3:0>, R/$\overline{W}$ Valid (note 4, 5) | | 42(25) | | 33 | | 25 | ns |
| T50 | $\overline{PARITY}$, P<1:0> Valid from A<7:0>, $\overline{BVALID}$, ID<3:0>, R/$\overline{W}$ Valid (note 4, 5) | | 47(28) | | 37 | | 28 | ns |
| T51 | D<15:0>, D/$\overline{C}$, $\overline{PARITY}$, P<1:0> Hold from BSCK High (note 4, 5) | 10(10) | | 8 | | 6 | | ns |

Note 1: Since 8 bit tranfers are not supported, the BYTE signal is ignored during slave transfers.

Note 2: Since $\overline{CS}$ is only used to select the Bus Interface Chip, $\overline{CS}$ is ignored during slave cycles.

Note 3: There is no need for the SCENIC to assert $\overline{BS8}$, $\overline{BUSY}$ AND $\overline{BRT}$ since the SCENIC does not support 8 bit slave tranfers, it does not need to add wait states and the SCENIC will never need to cause a transfer retry. Because of this, the SCENIC does not drive these signals at all during slave transfers. Instead, the SCENIC expects external pullup resistors to be placed on these signal to pull them high.

Note 4: $\overline{BVALID}$, A<7:0>, R/$\overline{W}$ and ID<3:0> must all be valid before the SCENIC will recognize that it must start a slave read. These signals must remain valid throughout the entire cycle (the hold times must be met), or the SCENIC will prematurely terminate the cycle. Slave cycles are started asynchronously based on these signals being valid.

Note 5: The sooner $\overline{BVALID}$, A<7:0>, R/$\overline{W}$ and ID<3:0> are valid and stable, the sooner the SCENIC will start its slave cycle. Notice that the data out times (T49 and T50) are referenced from valid $\overline{BVALID}$, A<7:0>, R/$\overline{W}$ and ID<3:0>, not from a clock edge. Meeting T45 will start the slave cycle without problems, but the data out time may not provide enough setup time for the master to sample the data. The data out time and the master's data setup time need to be considered when designing the master's BSCK to $\overline{BVALID}$, A<7:0>, R/$\overline{W}$ and ID<3:0> delay timing.

FIG. 56B

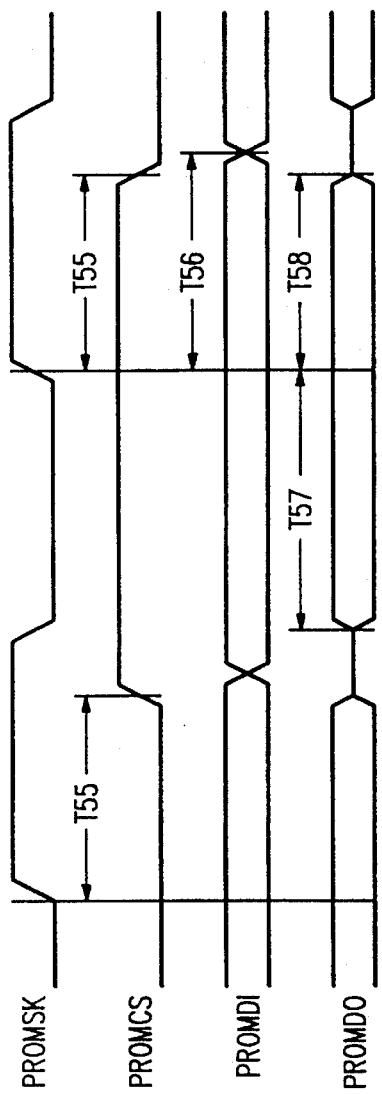

FIG. 57A

| Number | Parameter | Note 1 | | Units |
|---|---|---|---|---|
| | | Min | Max | |
| T55 | PROMCS Valid from PROMSK High | | 500 | ns |
| T56 | PROMDI Valid from PROMSK High (note 2) | | 500 | ns |
| T57 | PROMDO Setup to PROMSK High (note 2) | 100 | | ns |
| T58 | PROMDO Hold from PROMSK High | 100 | | ns |

Note 1: The frequency of PROMSK is equal to 1/20th the frequency of BSCK. The EEPROM Interface Timing does not change with respect to BSCK frequency though.

Noe 2: PROMDI is an output and PROMDO is an input on the SCENIC.

FIG. 57B

METHOD OF OPERATING AN EXTENSION FIFO IN ANOTHER DEVICE WHEN IT IS FULL BY PERIODICALLY RE-INITIATING A WRITE OPERATION UNTIL DATA CAN BE TRANSFERRED

This is a division application of application Ser. No. 08/147,348 filed on Nov. 2, 1993 now abandoned.

BACKGROUND OF THE INVENTION

1. Field of the Invention

The present invention relates to first-in, first-out (FIFO) memory devices and, in particular, to a method by which physically separate FIFOs can be made to operate as though they are a single FIFO.

2. Discussion of the Prior Art

The SCENIC device described below is an improvement of National Semiconductor Corporation's DP83932B Systems-Oriented Network Interface Controller (SONIC™).

The features of the SONIC device are described in detail in the following documents published in National Semiconductor Corporation's Local Area Network (LAN) Databook, 1992 Edition:

(1) DP83932B System-Oriented Network Interface Controller Preliminary Data Sheet, pp. 1–288 to 1–383 of the LAN Databook;

(2) National Semiconductor Application Note 745, Wesley Lee, DP83932 SONIC™ Bus Operations Guide, pp. 1–384 to 1–395 of the LAN Databook; and (3) National Semiconductor Application Note 746, Wesley Lee and Mike Lui, Software Driver Programmer's Guide for the DP83932 SONIC™, pp. 1–396 to 1–432 of the LAN Databook.

The three above-referenced publications are hereby incorporated by reference to provide additional background information regarding the present invention.

U.S. Pat. No. 5,245,606, issued on Sep. 14, 1993, to Edwin Z. DeSouza and commonly-assigned herewith to National Semiconductor Corporation, discloses a media access controller having a content addressable memory (CAM) architecture whereby address filtering is provided for filtering physical, group and broadcast addresses on an Ethernet network.

The '606 DeSouza patent is hereby incorporated by reference to provide additional background information regarding the present invention.

SUMMARY OF THE INVENTION

The present invention provides a protocol by which physically separated first-in, first-out (FIFO) memories may be made to operate as a single FIFO. In one case, one FIFO will write data to the other. If the receiving FIFO becomes full, then, by using a retry signal, it can request that the transmitting FIFO stop sending data and retry at a later time. This gives the reciver FIFO time to empty out and prevent an overflow. In the read case, one FIFO will continue to pull data from the other. If the FIFO being read becomes empty, it can issue a retry signal that tells the reading FIFO to stop pulling data and to reinitiate the read operation at a later time when the FIFO being read has had a chance to fill, thus preventing an underflow.

In accordance with a first aspect of the invention, the configurable network interface controller performs a selective FIFO backup operation to remove unwanted data from the FIFO after it has been determined that the data is no longer wanted. The operation does not require a FIFO reset or the need to search through the bad data looking for the next good data. The bad data is removed before any more good data is written into the FIFO.

In accordance with another aspect of the invention, the configurable network interface controller provides for the automatic retransmission of collided frames from a local RAM while observing two modes of operation: (1) retransmission of as much of the frame as possible without violating latency requirements and (2) first guaranteeing the safe retransmission of the first 64 bytes and then returning to observation of the latency requirements.

In accordance with another aspect of the invention, the configurable network interface controller provides a user-programmable, two-level priority arbitration mechanism. The arbitration mechanism allows users to program their own priority settings. Within a single bus cycle, the arbiter attempts to determine who the next bus owner will be, first from the user programmed register. If a clear "winner" is not found, then a second "default" level decides the successor to the bus.

In accordance with another aspect of the invention, the configurable network interface controller provides a mechanism for observing the present states of any internal state machine of the device. This feature saves debugging time for first silicon.

In accordance with another aspect of the invention, the configurable network interface controller provides a dual-function encoded chip select signal. The encoded chip select signal serves both as a chip select for multiple devices and as an identification signal to a master controller.

In accordance with another aspect of the invention, the configurable network interface controller provides a multi-chip FIFO extension protocol. Utilizing this protocol, FIFOs that are physically separated (e.g., in separate chips) can be made to operate as though they are a single FIFO.

In accordance with another aspect of the invention, the configurable network interface controller provides for programmed ignore bits in address matching. Thus, partial filtering is possible to allow for "don't care" bits within the address field.

In accordance with another aspect of the invention, the configurable network interface controller provides for variable sized blocked address space by which it is possible to create a bus where multiple devices of different address space sizes can coexist on the same bus at the same time, the address space for each bus device being separate from the others.

In accordance with another aspect of the invention, the configurable network interface controller architecture includes receive and transmit network statistics counters that support LME, MIB and RMON statistics. Because of the differences between IEEE, LME, MIB and RMON protocols, subsets of the statistics are made available.

A better understanding of the features and advantages of the various aspects of the invention will be obtained by reference to the following detailed description of a configurable network interface controller and accompanying drawings which set forth an illustrative embodiment in which the principles of the invention are utilized.

BRIEF DESCRIPTION OF THE DRAWINGS

FIG. 3 is a table that provides a pin description corresponding to the FIG. 2 connection diagram.

FIG. 7 is a table that provides a description of data sizing and byte positioning for the BYTE, and $\overline{BS8}$ signals in the disclosed embodiment of a configurable network interface controller in accordance with the present invention.

FIGS. 10–15 are five timing diagrams illustrating the multi-chip FIFO extension protocol feature of the SCENIC.

FIG. 18 is a table that provides a description of the instruction set for a NM93C06 EEPROM.

FIG. 19 is a graphic representation of the bit order of a transmitted network address.

FIG. 20 is a table that provides a description of transmit PTP commands.

FIG. 21 is a graphic illustrating the relationship between transmit FIFO threshold and retransmitting from the FIFO.

FIG. 22 is a table that provides a description of receive PTP commands.

FIG. 30 is a table that provides a description of IO scan operation control.

FIG. 31 is a table that provides a description of the general registers of a configurable network interface controller in accordance with the present invention.

FIG. 32 is a table that provides a description of the transmit registers of a configurable network interface controller in accordance with the present invention.

FIG. 33 is a table that provides a description of the receive registers of a configurable network interface controller in accordance with the present invention.

FIG. 34 is a table that provides a description of the statistics counter registers of a configurable network interface controller in accordance with the present invention.

FIG. 35 is a table that describes the Data Configuration Register (DCR) of the SCENIC device.

FIG. 36 is a table that describes the Interrupt Mask Register (IMR) of the SCENIC device.

FIG. 37 is a table that describes the Interrupt Status Register (ISR) of the SCENIC device.

FIG. 38 is a table that describes the EEPROM Configuration Register (EPCR) of the SCENIC device.

FIG. 39 is a table that describes the Network Interface Configuration Register (NICR) of the SCENIC device.

FIG. 40 is a table that describes the Transmit Network Status Register (TXSR) of the SCENIC device.

FIG. 41 is a table that describes the Transmit Configuration Register (TXCR) of the SCENIC device.

FIG. 42 is a table that describes the Receive Network Status Register (RXSR) of the SCENIC device.

FIG. 43 is a table that describes the Receive Configuration Register (RXCR) of the SCENIC device.

FIG. 44 is a table that describes the Bus Master Priority Configuration Register (BMPC) of the SCENIC device.

FIG. 45 is a table that describes the BOOT EEPROM Command Register (BECR) of the SCENIC device.

FIG. 46 is a table that describes the Test Control Register (TCR) of the SCENIC device.

FIG. 47 provides graphic representation of the CAP register relation to network address.

FIG. 48 is a timing diagram illustrating bus clock timing for the SCENIC device.

FIG. 50 is a timing diagram illustrating the non-power reset operation for the SCENIC device.

FIG. 57 is a timing diagram illustrating the boot EEPROM interface timing for the SCENIC device.

DETAILED DESCRIPTION OF THE INVENTION

GENERAL DESCRIPTION

Figure 1:
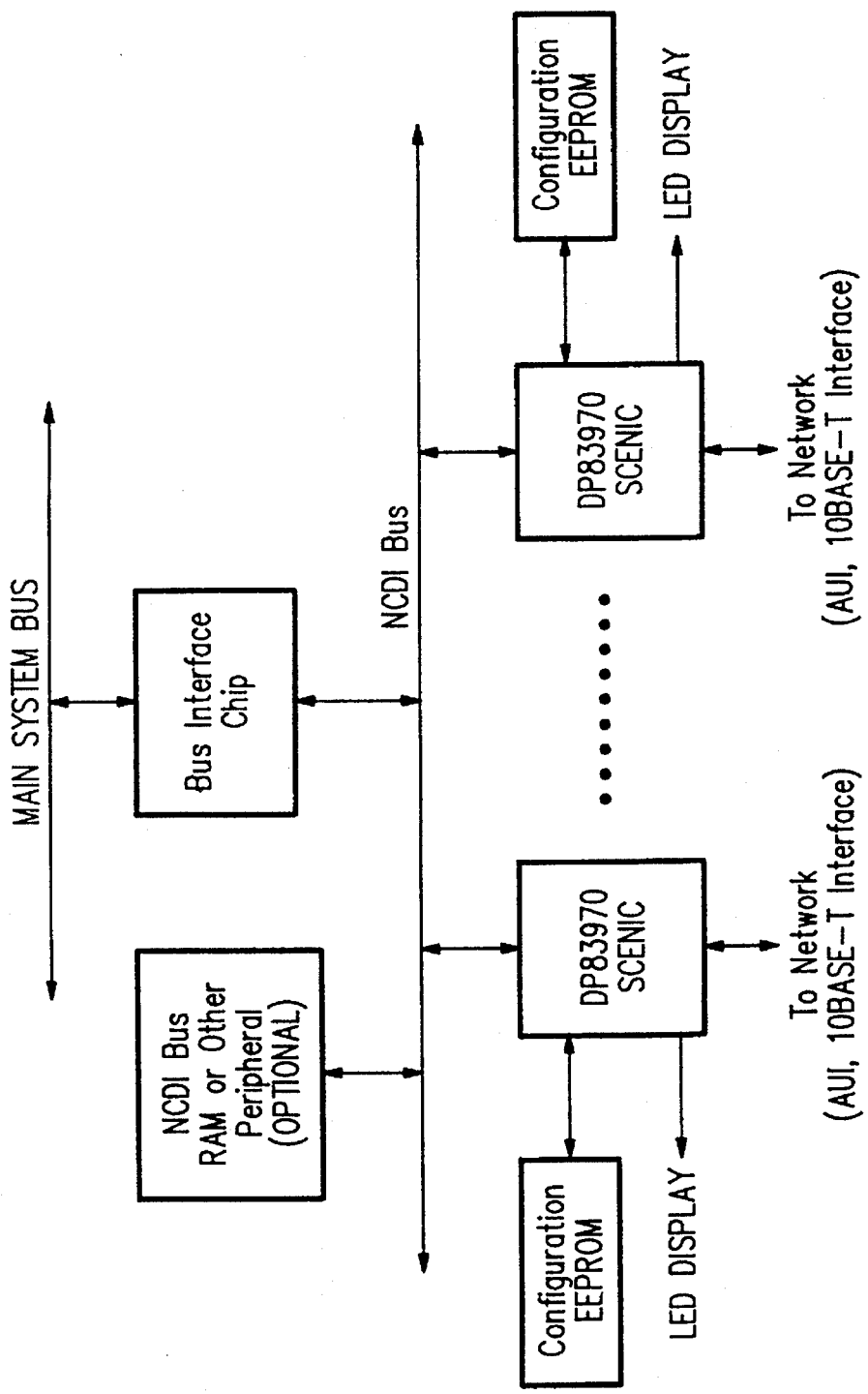
FIG. 1 is a block diagram illustrating a system that utilizes a configurable network interface controller in accordance with the present invention.

FIG. 1 shows a SCENIC System that is designed for easy implementation of CSMA/CD Local Area Networks with a flexible, generic bus interface. One or more SCENICs, combined with a Bus Interface (BI) chip, provides system level product differentiation and efficiency through the NCDI (Networking Control and Data Interface) bus. This generic bus can be used to interconnect up to 16 controllers to a single bus interface chip.

The Bus Interface chip, or BI, would be used to interface the generic NCDI bus to a more common bus such as EISA, Microchannel, or any proprietary bus. This provides an easy integration path for incorporating Ethernet into several different kinds of architectures where the system bus interface would be tailored to the specific architecture. In audition, the BI provides an interface between the system software and the SCENIC, eliminating the need to write software drivers specific to the SCENIC. Instead, the drivers are written specific to the BI.

Many different bus interface chips can be designed to work with the SCENIC. Similarly, many different network interface controllers can be tied to the same BI. In all cases where the BI is the same, the software and hardware interface to the NCDI bus do not change, even if the SCENIC or network interface controller does.

Along with many other features, the SCENIC can be configured to provide full duplex operation. Full duplex increases the SCENIC's maximum throughput to 20 Mbps by transmitting and receiving data simultaneously.

Figure 2A:
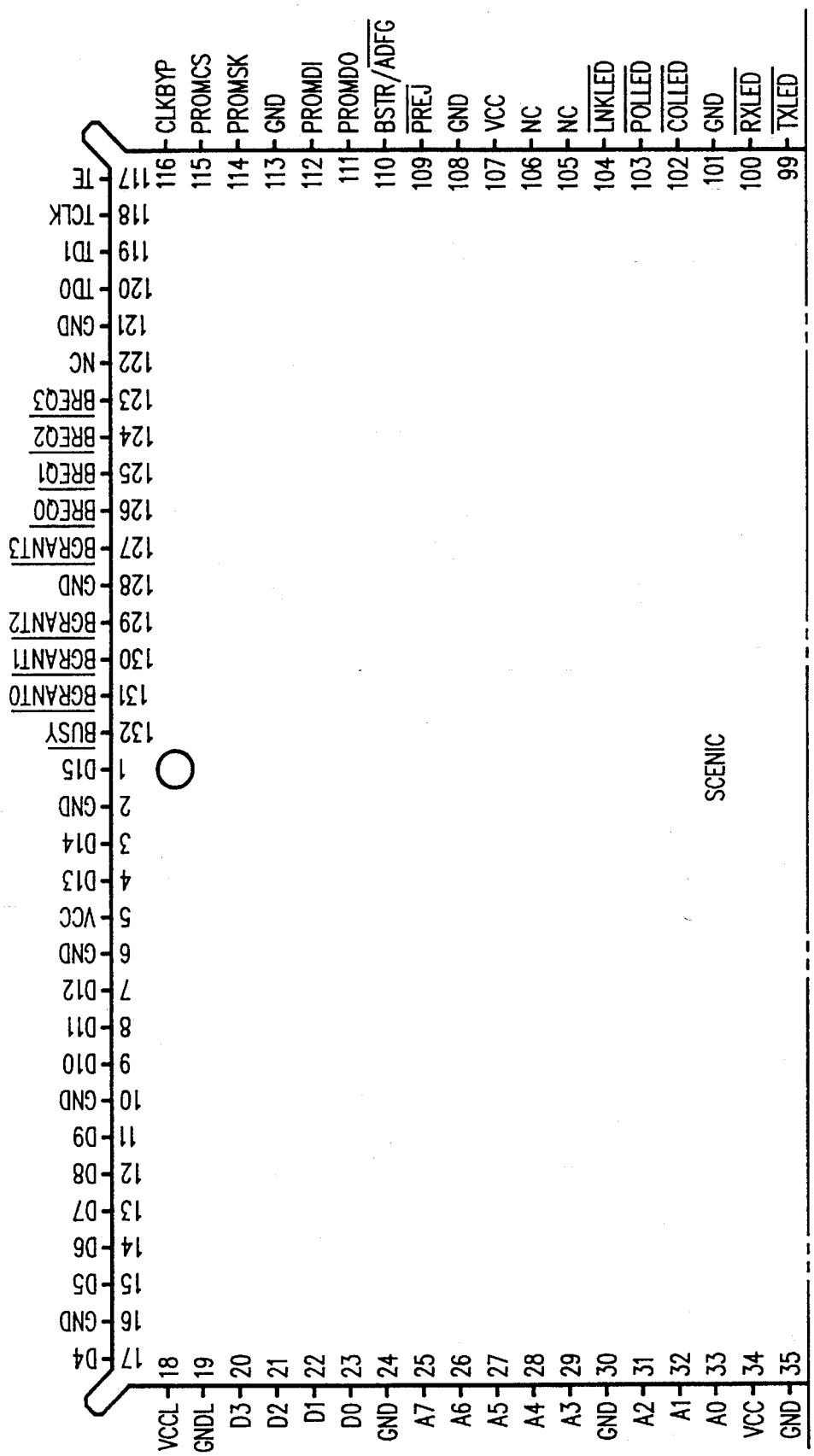
FIG. 2 is a connection diagram illustrating the pin out of a configurable network interface controller in accordance with the present invention.
Figure 2B:
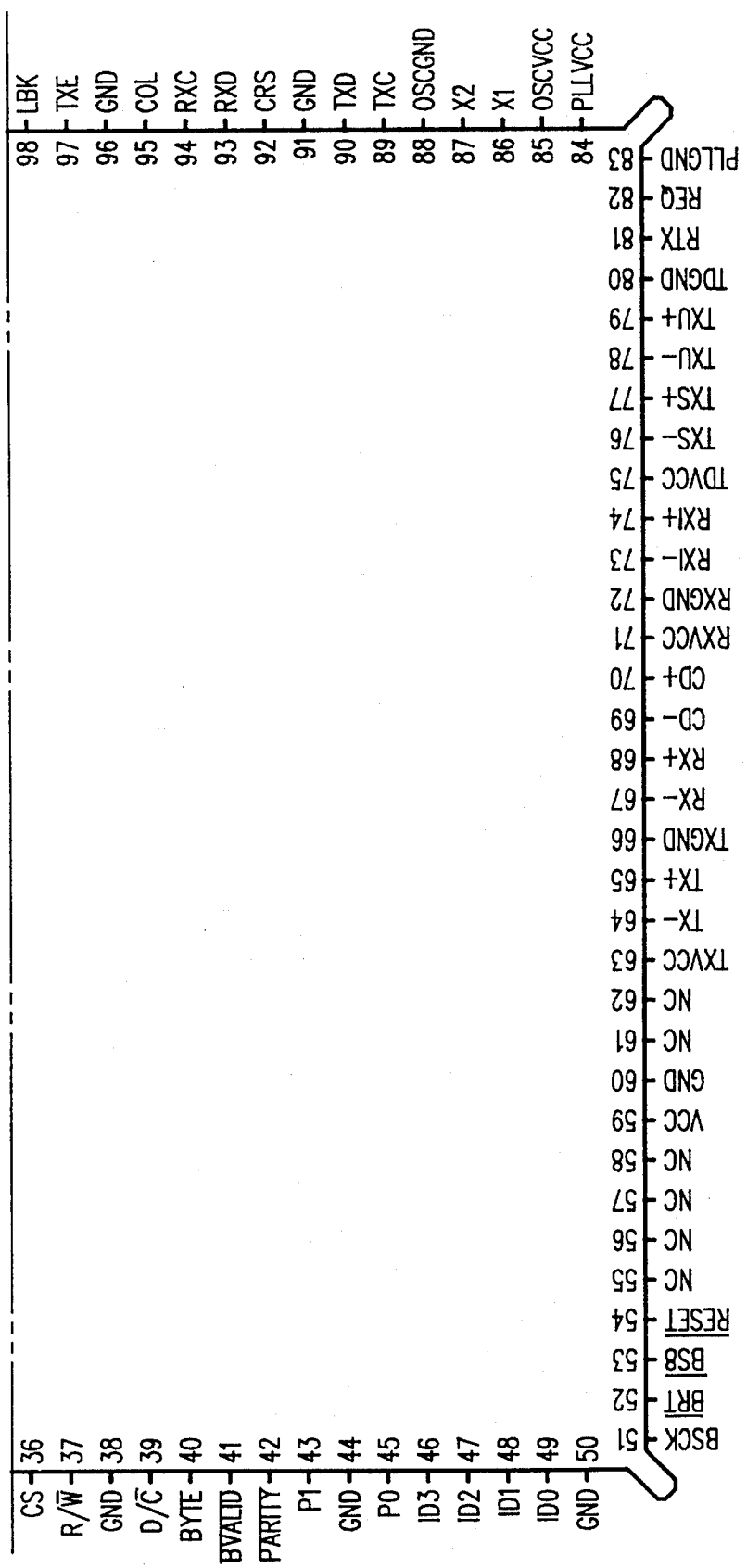

FIG. 2 shows the SCENIC's pin out. FIG. 3 provides complete pin descriptions for all of the SCENIC device pins.

INTERNAL BLOCK DIAGRAM

Figure 4:
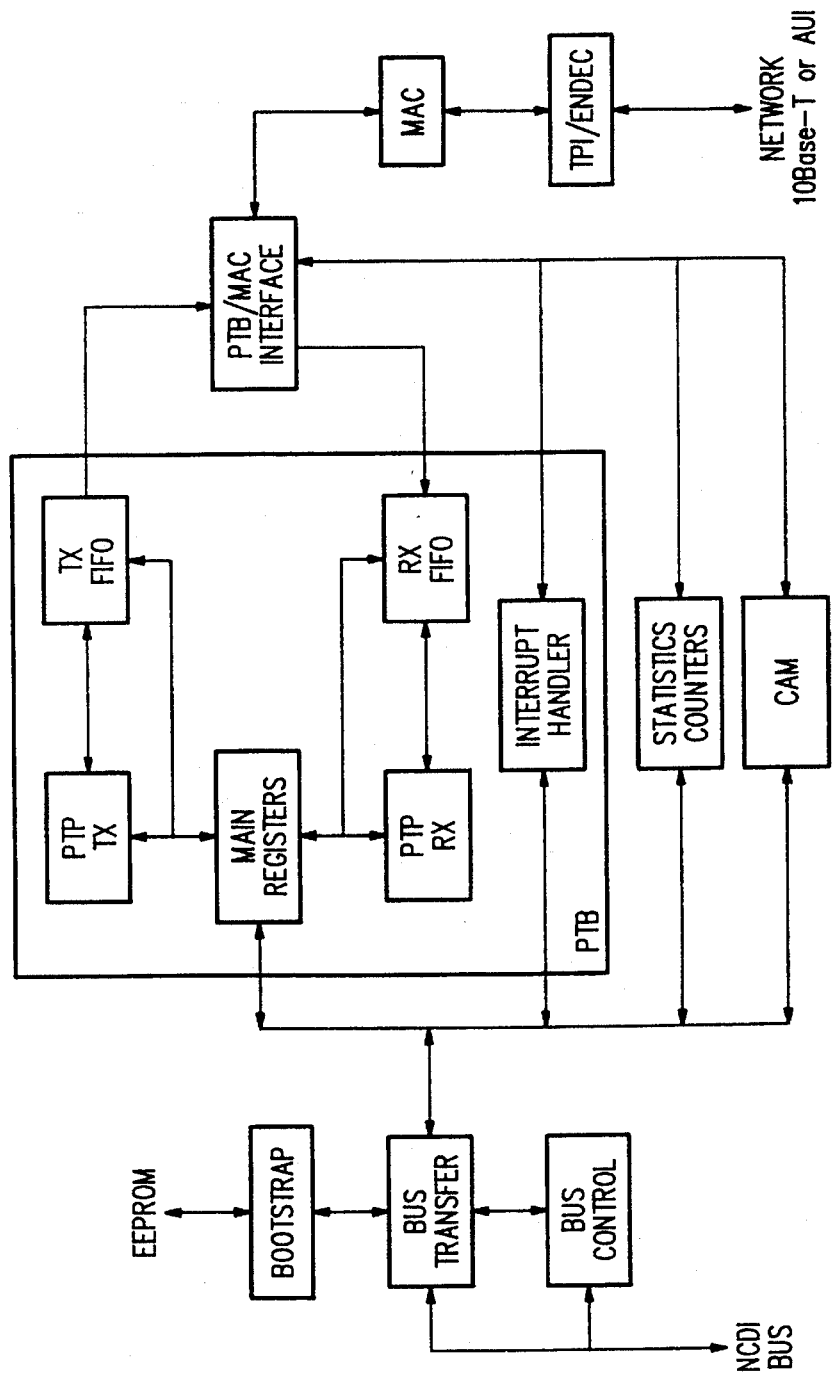
FIG. 4 is a block diagram illustrating the internal logic of a configurable network interface controller in accordance with the present invention.

The SCENIC device consists of several blocks, as shown in FIG. 4. These blocks are a twisted pair interface (TPI), a Manchester encoder/decoder (ENDEC), a Media Access Controller (MAC), separate receive and transmit FIFOs and protocol blocks (all part of the Packet Transfer Block, or PTB) and a network interface which consists of the Bus Transfer and Bus Control blocks. Additionally, there is a configuration block called Bootstrap which reads an external configuration block called Bootstrap which reads an external serial EEPROM (the NM93C06 EEPROM) for configuration information such as the CAM address and the NCDI identifier codes.

The SCENIC MAC, ENDEC and TPI provide the ability to connect to both AUI and TPI networks directly, as well as providing the option to use an external ENDEC.

The MAC unit performs the control functions for transmission and receipt of packets over TPI and AUI. During transmission, the MAC unit frames information from the transmit FIFO and supplies serialized data to the ENDEC unit. During reception, the incoming information from the ENDEC unit is deserialized, the frame checked for valid reception, and the data is transferred to the receive FIFO. Control and status registers on the SCENIC govern the operation of the MAC unit. The PTB/MAC Interface block takes care of interfacing the MAC with the FIFOs and other parts of the SCENIC, as shown in FIG. 4.

The Packet Transfer Block (PTB) contains the receive and transmit FIFOs and the Packet Transfer Protocol (PTP) logic and state machines. In addition to these, the PTB contains a major portion of the SCENIC registers, the interrupt logic, and some control logic of the Network Statistics registers. The PTB is connected to the Bus Control and Bus Transfer blocks which provide the bus interface that is used to transfer the network data to and from the Bus Interface chip and the SCENIC. This interface is called the Networking Control and Data Interface (NCDI). The NCDI is a generic interface for coupling one or more network controllers (and other peripherals) to a single bus interface chip.

The BOOTSTRAP block is the initialization engine for the SCENIC. This block contains the logic that reads in configuration information and the device's physical Ethernet address from a serial EEPROM, and uses the information to prepare and configure both the SCENIC and other parts of the NCDI bus.

The CAM block contains the single CAM location and other address matching logic.

The Statistics Counters block contains the IEEE 802.3 LME, MIB and RMON network statistics counters.

FUNCTIONAL DESCRIPTION

This section describes the SCENIC in an overview fashion. The entire device architecture is covered with respect to overall function. In conjunction with the FIG. 4 block diagram, this section contains a more detailed description of the SCENIC functionality.

A. NCDI Bus System Overview

The Networking Control and Data Interface (NCDI) Bus is a data transfer bus used to transfer data and commands to and from one or more SCENIC devices and a bus interface chip, called the BI. The BI provides the interface between the NCDI bus and a common or proprietary system bus. The BI will buffer data from each SCENIC separately, and direct it to the system bus, or to another SCENIC on the NCDI bus. Data coming from the system bus will go through the BI chip and out to the correct SCENIC. Each SCENIC or the BI chip, can become a bus master.

B. The NCDI Bus and the SCENIC

The NCDI bus uses a 16 bit data path and a variable size address path. There are 32 distinctly selectable address spaces. Each address space can be any size. The size is determined by the number of address pins in a given address space which is really determined by the number of address pins a specific device uses. The SCENIC uses an 8 bit address space for register access purposes. The different address spaces are selected by a 5 bit identifier code made up of ID<3:0> and $\overline{CS}$.

The NCDI bus can operate between 8 MHz and 16 MHz. The bus speed used depends on the bandwidth needed. At 10 MHz, the theoretical bus throughput is 20 Mbytes per second. Both 8 and 16 bit slaves are supported. An 8 bit master can use the bus. The SCENIC cannot operate as an 8 bit master. There is a distinction between command and data cycles. This distinction is used as part of the PTP protocol, which is discussed below.

Figure 5:
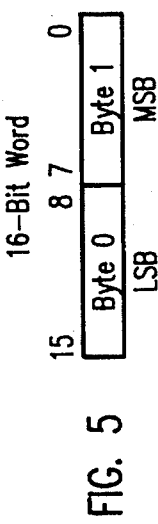
FIG. 5 is a graphic representation of NCDI byte orientation.

The NCDI bus is a big endian bus. Hence, all NCDI bus transfers will be made with the byte orientation shown in FIG. 5.

NCDI Bus Transfers

There are several different types of transfers on the NCDI bus. They are made up of read and write cycles, command or data cycles and 8 bit verses 16 bit cycles. Each of these different cycles will be explained below.

The signals that distinguish the different kinds of transfer modes are R/$\overline{W}$, to distinguish a read versus a write cycle, D/$\overline{C}$, to distinguish a command or data cycle and BYTE and $\overline{BS8}$, to distinguish between 16 bit and 8 bit transfer cycles. The basic transfer is the same for all of these variations and is shown in the FIG. 6 timing diagram.

Read and Write Cycles

Figure 6:
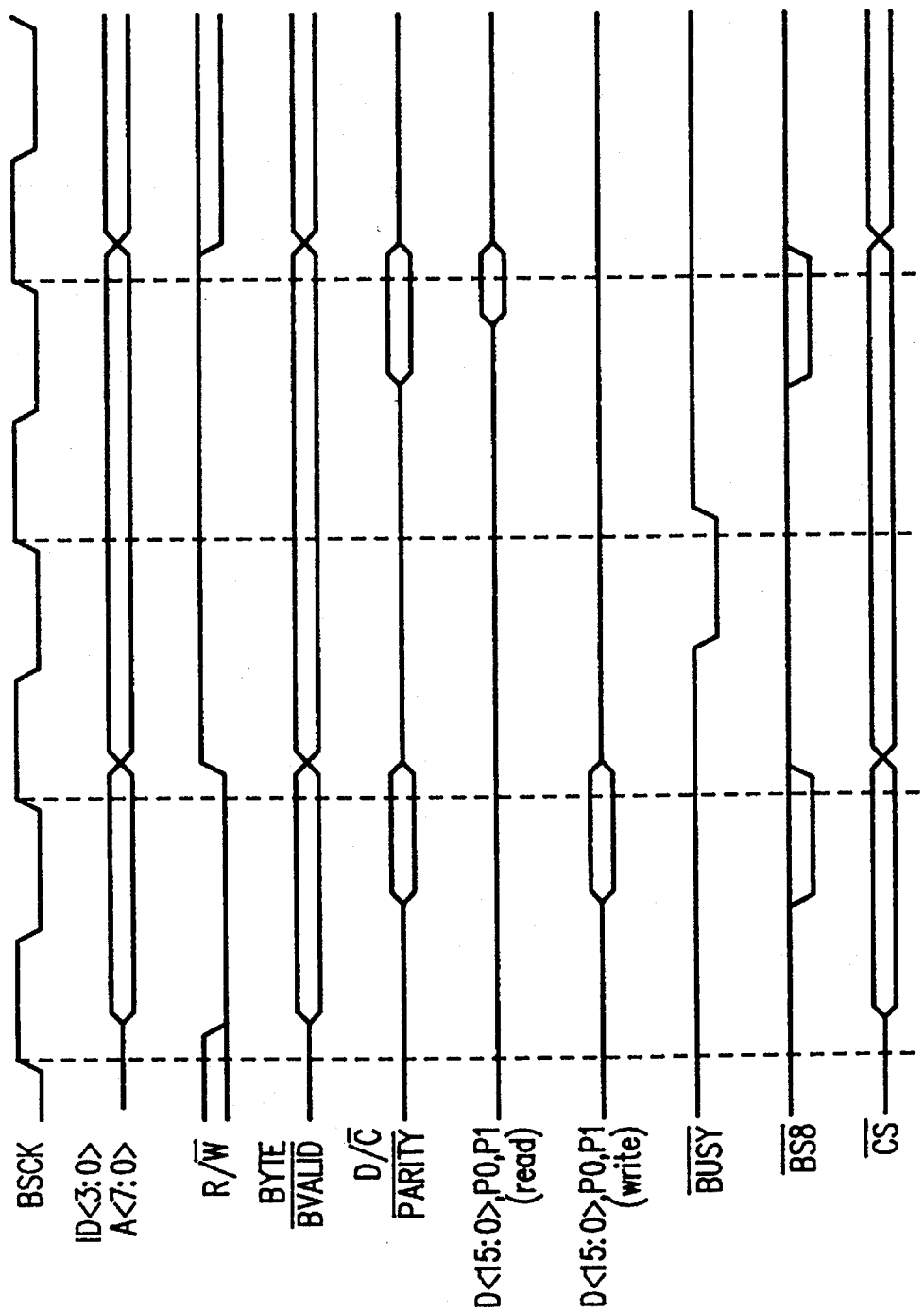
FIG. 6 is a timing diagram illustrating a basic NCDI bus transfer.

All data transfers on the NCDI bus take a minimum of BSCK up to a maximum determined by the $\overline{BUSY}$ signal. FIG. 6 shows two transfers—a one cycle write operation followed by a read operation. There is one wait state in the read operation. Most of the signal transitions are based off the rising edge of BSCK. The exceptions to this are D/$\overline{C}$, $\overline{PARITY}$ and data which can be driven off the falling edge of BSCK.

FIG. 6 assumes that the SCENIC has already acquired the bus. After doing so, the SCENIC will start the cycle by driving Address, ID<3:0>, $\overline{CS}$, R/W, BYTE and $\overline{BVALID}$ of the rising edge of BSCK. $\overline{CS}$ is driven to select the BI and ID<3:0> is driven with the value assigned to the SCENIC that is the bus master in this cycle.

For a write cycle, the SCENIC will drive D/$\overline{C}$, $\overline{PARITY}$, P0, P1 and the date off the falling edge of BSCK. For a read operation, these signals would be driven by the slave. It is suggested that the slave also drive these signals off the falling edge of BSCK. Driving them sooner has no adverse affect.

If there are no wait states inserted, then the SCENIC will end the cycle just after the rising edge of BSCK by de-asserting or changing all of its signals. This is true for read or write cycles. If the cycle was a read cycle then the SCENIC will also sample the data, P0, P1, D/$\overline{C}$ and $\overline{PARITY}$ signals on the rising edge of BSCK.

Wait states are added by the slave by asserting $\overline{BUSY}$. The SCENIC will sample $\overline{BUSY}$ on the rising edge of BSCK. If $\overline{BUSY}$ is low, then the SCENIC will wait another cycle. It is not necessary to drive $\overline{BUSY}$ low at all if the slave does not require wait states. All that is required to have 0 wait states is for $\overline{BUSY}$ to be de-asserted and meet the set up and hold times to the rising edge of BSCK.

Data Size

The date size used on the NCDI bus is controlled by three signals. They are $\overline{BS8}$, BYTE and A0. The slave drives $\overline{BS8}$ if it only supports an 8 bit data size or if it would like to make an 8 bit data transfer when it supports a 16 bit data path.

When the SCENIC transfers data to and from an 8 bit only slave, the SCENIC must make two transfers in order to send or receive a complete word. Initially, the SCENIC assumes that the slave is a 16 bit slave. Hence, the first transfer is made without the SCENIC knowing that the slave is an 8 bit device. The SCENIC will sample $\overline{BS8}$ on the rising edge of BSCK, at the end of the first transfer, to see if the slave is an 8 bit salve. If it samples $\overline{BS8}$ low, then the SCENIC will do a second transfer to the slave. In the first transfer, the slave receives the LSB of the word on D<15:8>, but does not get the MSB on D<7:0>. On the second transfer, the SCENIC drives the MSB on D<15:8> so that the 8 bit slave can receive it.

The bus master can also specify an 8 bit data size by driving BYTE high. In the case where the SCENIC is writing to an 8 bit slave, the first of the two transfers will be made with BYTE driven low. The second transfer will be made with BYTE driven high.

BYTE and A0 are used to signify the data size and where the data is on the data lines (high or low byte in the word). FIG. 7 explains the relationship between BYTE, A0 and $\overline{BS8}$.

Command and Data Cycles

Along with read and write cycles, there are also command and data cycles. Data cycles are simply cycles where data is being transferred. Command cycles are special cycles where the data is a PTP command. PTP commands are only addressed to the Transmit and Receive Network Ports on the SCENIC and BI. Every network controller on the NCDI bus, along with the BI, has a pair of these ports. Through the use of commands intermixed with data, the BI and network controllers, such as the SCENIC, communicate and perform tasks.

Command and data cycles are distinguished by the D/$\overline{C}$ signal. When D/$\overline{C}$ is driven high, the cycle is a data cycle. When drive low, the cycle is a command cycle. As shown in FIG. 6, D/$\overline{C}$ is driven off the falling edge of BSCK by the SCENIC or the BI and is sampled, along with the data, on the rising edge at the end of a transfer. D/$\overline{C}$ is always driven by the device that drives the data.

Parity Checking ($\overline{PARITY}$, P0, P1)

The NCDI bus has data parity checking through $\overline{PARITY}$, P0 and P1. P0 and P1 indicate odd parity for D<15:8> and D<7:0>, respectively. This means that the 9 bit combination of D<15:8> and P0 should sum up to an odd number of bits. The same is true for P1 and D<7:0>.

$\overline{PARITY}$ is used to indicate that P0 and P1 are valid on the bus. It is driven by the current bus master during any write operation, and by the current Bus Slave during any read operation. If $\overline{PARITY}$ is not asserted, then the device driving the data does not support parity for this transfer. All devices on the NCDI bus, when latching data should, use $\overline{PARITY}$ to determine if or when P0 and P1 are valid. If $\overline{PARITY}$ is not asserted, then P0 and P1 should be ignored since this indicates lack of parity support by the device driving the data.

Valid Bus Cycles ($\overline{BVALID}$)

All cycles on the NCDI bus are considered to be valid only if $\overline{BVALID}$ is asserted low. Invalid cycles are used sometimes when it is necessary to invalidate a transfer that has already started. One example of this is when the SCENIC reads an EOF command from the BI. Once an EOF is read, the BI has no more data in the current packet. By the time the SCENIC interprets the EOF and realizes that there is no more data to read, a new cycle has already been started. This new cycle must be invalidated to prevent the BI from being confused. $\overline{BVALID}$ is de-asserted before the end of the cycle to invalidate it.

If there are no bus masters currently using the bus, then $\overline{BVALID}$ will not be driven low by any device. Furthermore, since the NCDI bus arbiter pulls $\overline{BVALID}$ high by an internal pull up, $\overline{BVALID}$ will remain high during the dead cycle. Whenever $\overline{BVALID}$ is high, all devices on the bus ignore the bus.

NCDI Device Identifier Code (ID<3:0>, $\overline{CS}$)

For ease of interfacing more than one SCENIC (or other NCDI device) to a supporting BI chip, the NCDI bus has a 4 bit identifier code, ID<3:0>, used to identify up to 16 separate NCDI devices. When including the $\overline{CS}$ in this code, the 5 bit identifier code creates 32 separate address spaces.

The BI normally takes up 16 of the 32 address spaces. That leaves the other 16 spaces for the network controllers, such as the SCENIC, on the NCDI bus. This breakdown is made so that each NCDI network controller can be selected individually when the BI needs to access that device. On the other hand, when the NCDI network controller wants to access the BI, the controller must tell the BI which device it is so the BI knows where the data is coming from.

ID<3:0> is driven by the SCENIC to the BI chip to identify which SCENIC is writing to the BI chip. This is important because many of the transmit and receive registers are located at a common NCDI address location. The BI chip can use the identifier to know which SCENIC that data being written or read pertains to. Hence, the bus interface can determine which of its internal FIFOs or buffers to read or write the data from or to.

When the BI wants to access a SCENIC, it will leave the CS signal de-asserted, and only drive the ID code for the SCENIC it wants to access. When using multiple SCENICs in a system, all of the SCENIC's registers may be mapped to the same 8 bit address locations in NCDI address space. The identifier acts like a chip select to the particular SCENIC that the bus interface chip is accessing.

The SCENIC provides a common signal encoded chip select signal that serves both as a chip select for multiple devices and as an identification signal to a master controller.

That is, a primary bus user would be able to address multiple secondary bus users by using an encoded chip select. At the same time, these encoded chips select signals can be used by the secondary bus users to indicate to the primary bus user when they are accessing the primary bus user, and who they are. Hence, the encoded chip select function is a chip select when the primary bus user accesses the secondary users, and an identification code when the secondary bus users access the primary bus user. This is all in reference to the ID<3:0> bits on the SCENIC.

Normally, a chip select would be a separate signal specifically connected to separate devices that are to be selected. This kind of chip select requires decode logic to generate the chip set for each individual signal. This also requires many signals to come from the decode logic. With the encoded chip select, each bus master drives the same number of signals (4 on the SCENIC) to all the slaves. In this sense, the encoded chip select is like an address, but it is different because it is specifically meant to be a chip select, regardless of the address being driven.

More important than the ID signals being a chip select is that they are turned around to become an identifier signal. As was described above, there is a primary bus user, which will be called the bus interface or BI here. The BI has need to specifically select one of several different secondary bus devices. It uses the encoded chip select to do this. The code used to select the secondary bus device is assigned to that device at an earlier time.

When one of the secondary devices needs to select the BI, it is required that it identify to the BI what device it is. In this case, the secondary device drives the same identification code that was used to select it by the BI. This is the code that was assigned to it earlier. The BI knows that it is being accessed because of its own address or CS signal. It knows who is accessing it by decoding the identification signals.

Note that in a bus where the BI always knows that, when it is not accessing the bus, another bus device is access the BI, it is not necessary for the BI to decode a chip select. It only needs to understand that it is not accessing the bus. Therefore, the current cycle is meant for the BI and the ID codes identify which device is accessing the BI. In the case of the SCENIC, a special BI chip select is used because this is not always the case.

It is not necessary that the ID codes be 4 bits. Any number of bits required for the design will work the same. Furthermore, a variation on systems that do require a special chip select, as described above for the BI, can be looked upon as though the chip select is an extra identifier bit. In such a case, the BI is selected by half of the total number of codes that can be driven (e.g., With 4 ID codes and a special signal for the BI, this is a 5 bit code and there are 32 possible code combinations of which the BI will be selected whenever the special chip select is asserted. This will occur for half of the 32 possible codes). In this situation, the identifier code is still working as a dual function encoded chip select. The ID code works to select the device as well as identify the device that is doing the selecting.

Note that when using the SCENIC with a BI chip that has a larger address space than 8 bits, it may be necessary to use external decode logic to turn the SCENIC's 8 bit address, ID code and $\overline{CS}$ into an address that correctly maps into the BI's address space.

The SCENIC provides for variable sized blocked address space by which it is possible to create a bus where multiple devices of different address space sizes can coexist on the same bus at the same time, the address space for each bus device being separate from the others.

On the NCDI bus, it is necessary to create separate individual address spaces that would co-exist on the same bus. The purpose of this is so that different kinds of devices can be attached to this bus without having to be tied down to a specific address space. Another factor is that it is not possible on this bus to place each NCDI device in the same address space, even if that address space was infinite in length, since most of these devices must work with the same address to certain key registers.

The solution to this problem is to use the ID<3:0> signals of the NCDI bus to create separate address spaces that could be of any size.

It is also necessary to use the same bus as all other devices regardless of the address space needs of those devices, to allow common addresses to be used for certain registers and to allow different devices to be grouped together in the same address space if needed (such a controller device and its RAM0. An additional advantage of this mechanism is that not all devices need to support the maximum address space needed by some devices. This creates a pin savings on certain chips.

Figure 9:
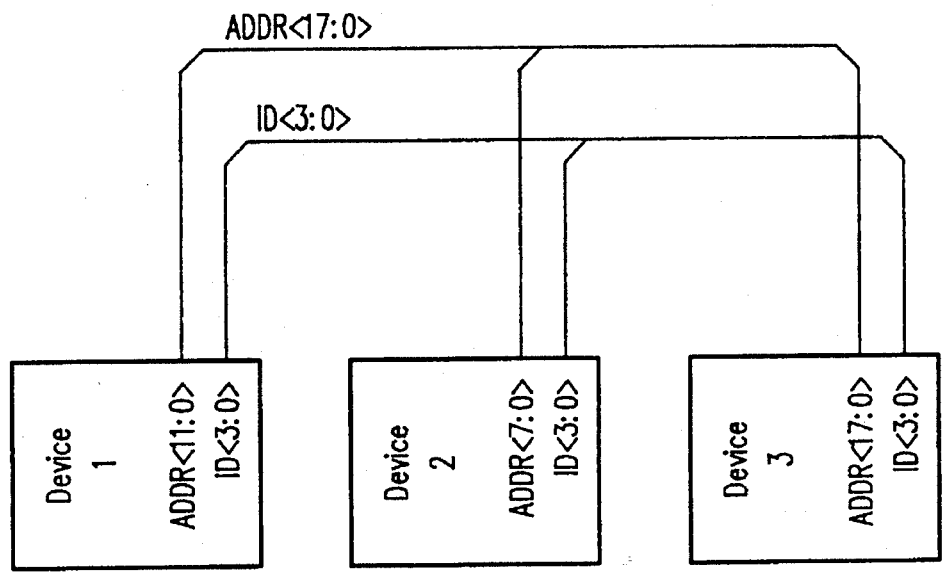
FIG. 9 is a block diagram illustrating the connection of three different devices with different numbers of address signals on the same bus.
Figure 8:
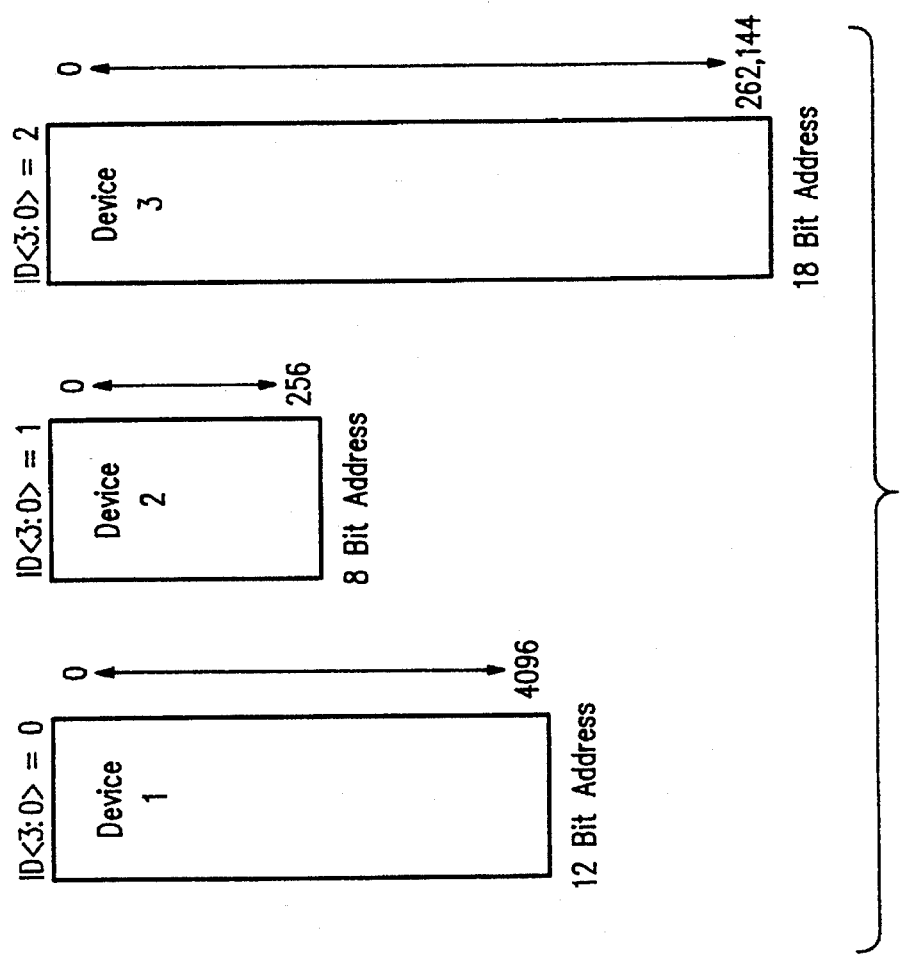
FIG. 8 is a graphic representation of three different address spaces on the same bus.

An example of the different size address spaces is shown in FIG. 8. Three devices are shown. Devices 1, 2 and 3. Device 1 uses 12 bits of address for a 4096 byte address space. Device 2 uses 8 bits of address for a 256 byte address space. Device 3 uses 18 bits of address for a 262.144 byte address space. As shown in FIG. 9, all three devices are connected to the same set of address signals on the bus. Device 1 connects to ADDR<11:0> of the bus. Device 2 connects to ADDR<7:0> of the bus. Device 3 connects to ADDR<17:0> of the bus. There are 18 address lines total on the bus, and each device only uses the number of least significant address lines that it needs.

Each different device on the bus is able to differentiate its address space from another by using the ID<3:0> signals. Each device is assigned a different ID code. As described above, the ID<3:0> signals are an encoded Chip Select which is used, similar to an address, to select a particular device. If the device does not see its ID, then it ignores the address on the bus. This allows the same address to be used for all devices to access similar functioning registers and functions. In FIG. 8, Devices 1, 2 and 3 use ID<3:0> equal to 0.1 and 2, respectively.

Note that each device shown in FIGS. 8 and 9 does not necessarily have to be a single device. They can also be a system of components. For example, a controller of some kind may have need of a RAM or ROM, or the "Device" may be a set of components that perform a similar function that requires that they share the same address space. In such a case, all devices in a group must decode the ID<3:0> signals to the same identifier.

Note also that it is possible for devices in one address space to access devices in other address spaces by driving the correct ID signals (i.e., ID<3:0> are an output as well as an input).

Bus Retry ($\overline{BRT}$)

Bus Retry is used to force the SCENIC to retry the current cycler at a later time. This function can be used in situations where the BI chip's receive FIFO is overflowing and cannot take anymore receive data or when the BI's transmit FIFO is empty and cannot give any more data to the SCENIC.

When $\overline{BRT}$ is asserted, regardless of the state of BUSY, or a bus master preemption (the removal of the $\overline{BGRANT}$ signal to the current bus master), the SCENIC will release the bus. The bus will be immediately requested again to either perform the same transfer again, or, if there were other transfers pending in the SCENIC, to perform those transfers first. In any case, the SCENIC will eventually request the bus and retry the transfer operation that was in progress when $\overline{BRT}$ was asserted in the first place.

In accordance with the invention, the SCENIC provides a multi-chip FIFO extension protocol. Utilizing this protocol, FIFOs that are physically separated can be made to operate as though they are a single FIFO.

By way of background, a signal similar to the SCENIC/BRT signal is commonly used in microprocessor busses (e.g., 80386 and 80486) to indicate that a bus error occurred. The signal is asserted by a slave device to cause the current bus master to get off the bus and re-request it again. When the master gets on the bus again, it performs the same transfer operation again, hence, retrying the operation that it was attempting before. The similarity between this microprocessor bus error signal and this aspect of the present invention is the signal alone. The difference is that an integral part of the SCENIC bus, i.e. the bus that the SCENIC uses to connect to a BI chip, is the ability to use this bus retry signal, –BRT, to create a FIFO that is larger than one chip might be able to hold. The FIFO in the BI and the FIFO in the SCENIC become one FIFO because of the –BRT signal and how it works.

Given a situation where one chip does not have enough FIFO space to cover its needs, a method is needed to extend the size of that FIFO. This can be done using another FIFO in another device. These two FIFOs can be considered independent FIFOs, except that the secondary FIFO is always trying to transfer data into the primary FIFO. If the primary FIFO is not able to accept the data, it needs a protocol that can tell the secondary FIFO to hold off and come back later. This signal is called the –BRT signal on the SCENIC.

The SCENIC has a FIFO in it and connects to another chip called the Bus Interface or BI. The BI also has a FIFO. The two FIFOs are expected to work together such that their combined size (the sum of the size of each individual FIFO) creates a larger FIFO without having to place the entire FIFO in a single integrated circuit (or on a single die).

In the receive case, the SCENIC will continue to write data to the BI. If the BI's FIFO becomes full, and the SCENIC writes any more data into it, then the BI's FIFO will overflow with data and cause an error. By using the –BRT signal, the BI can request that the SCENIC stop sending data and come back later to try again. This gives the BI more time to empty out its FIFO and present an overflow that would have happened otherwise.

In the transmit case, the SCENIC will continue to read data from the BI. If the BI is unable to prevent the SCENIC from reading all the data from its FIFO, then the BI's FIFO will underrun and cause an error. By using the –BRT signal, the BI can request that the SCENIC stop pulling data from the BI and come back later to tPt again when the BI has had a chance to fill its FIFO more.

Figure 10:
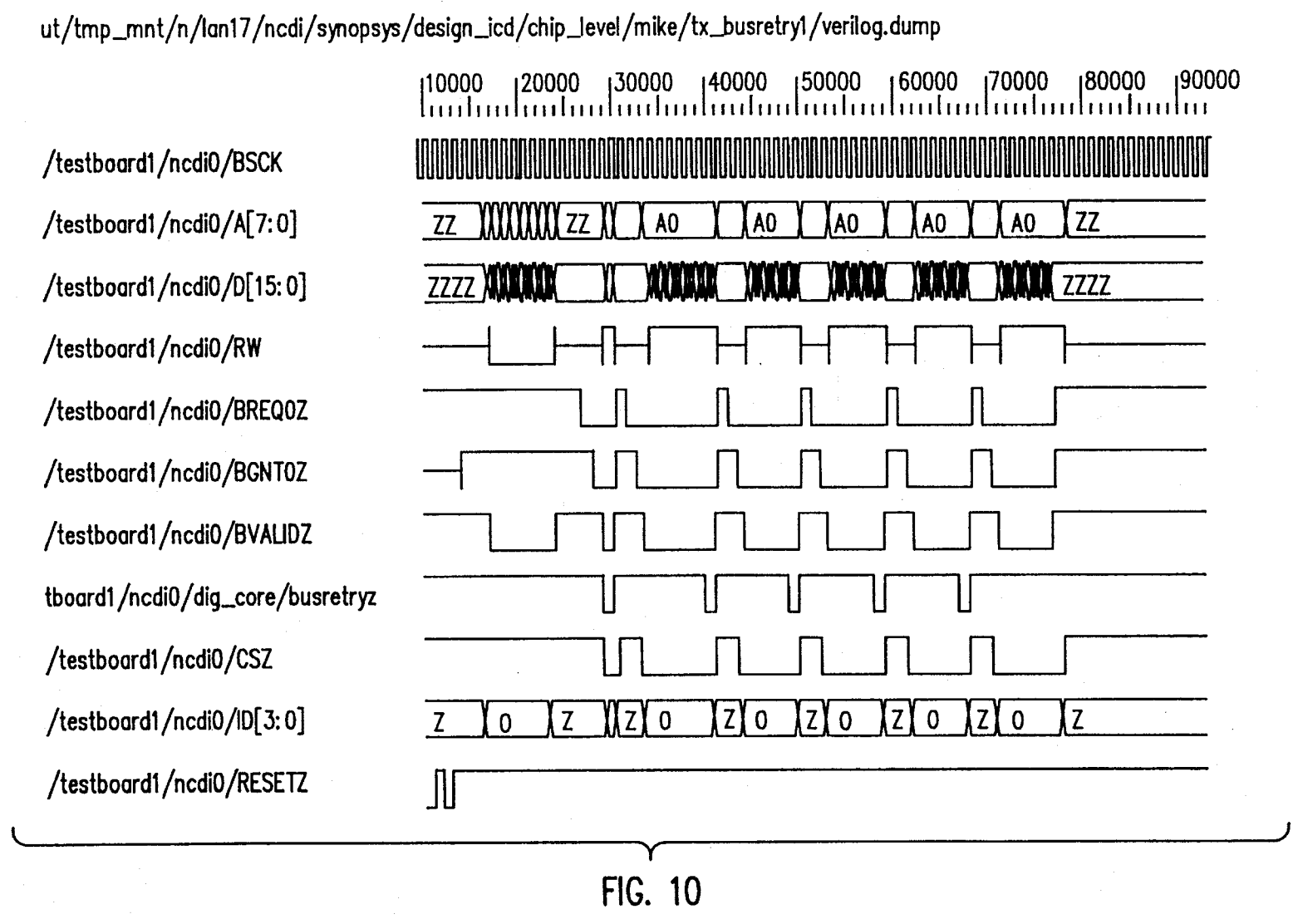
Figure 10A:
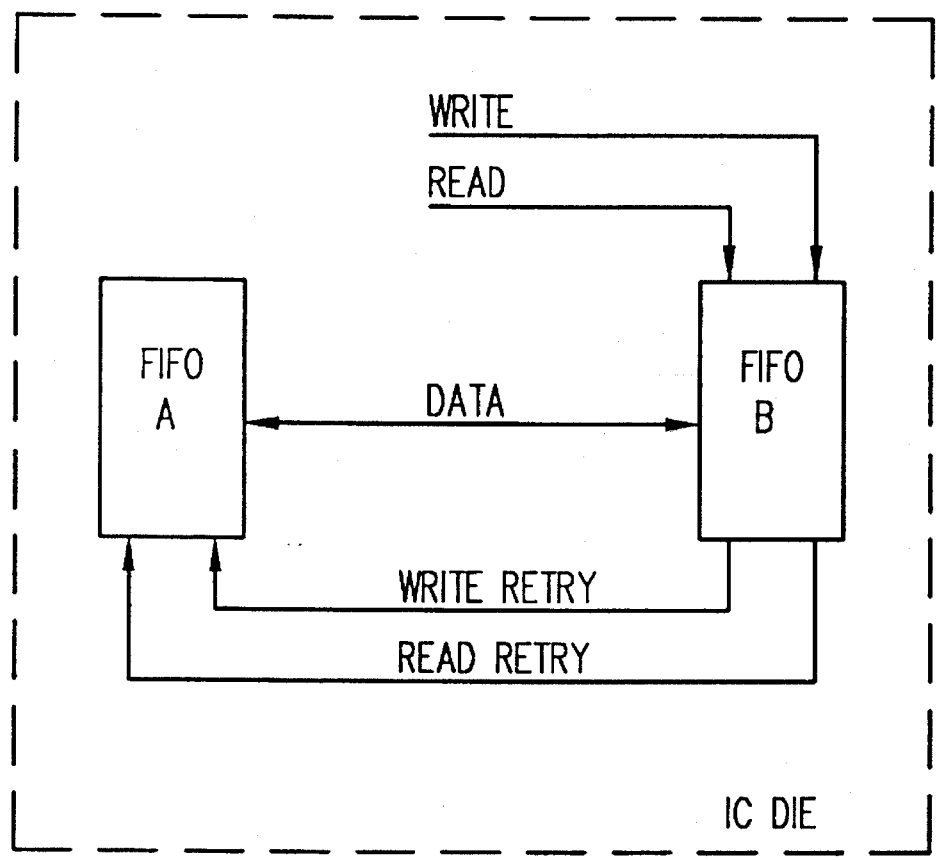
FIG. 10A is a block diagram illustrating a method of operating first and second FIFO memory devices as a single FIFO.
Figure 11:
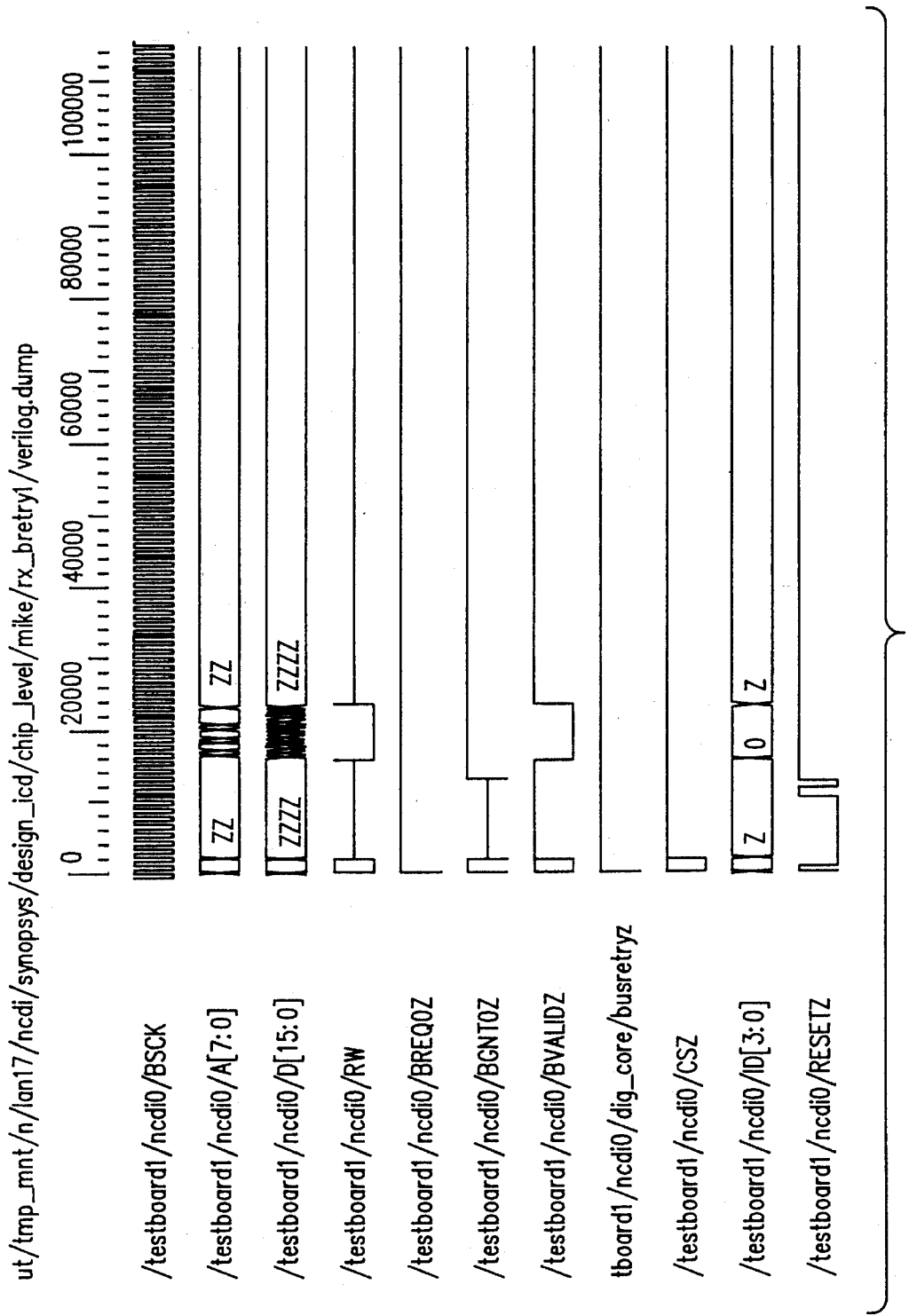
Figure 12:
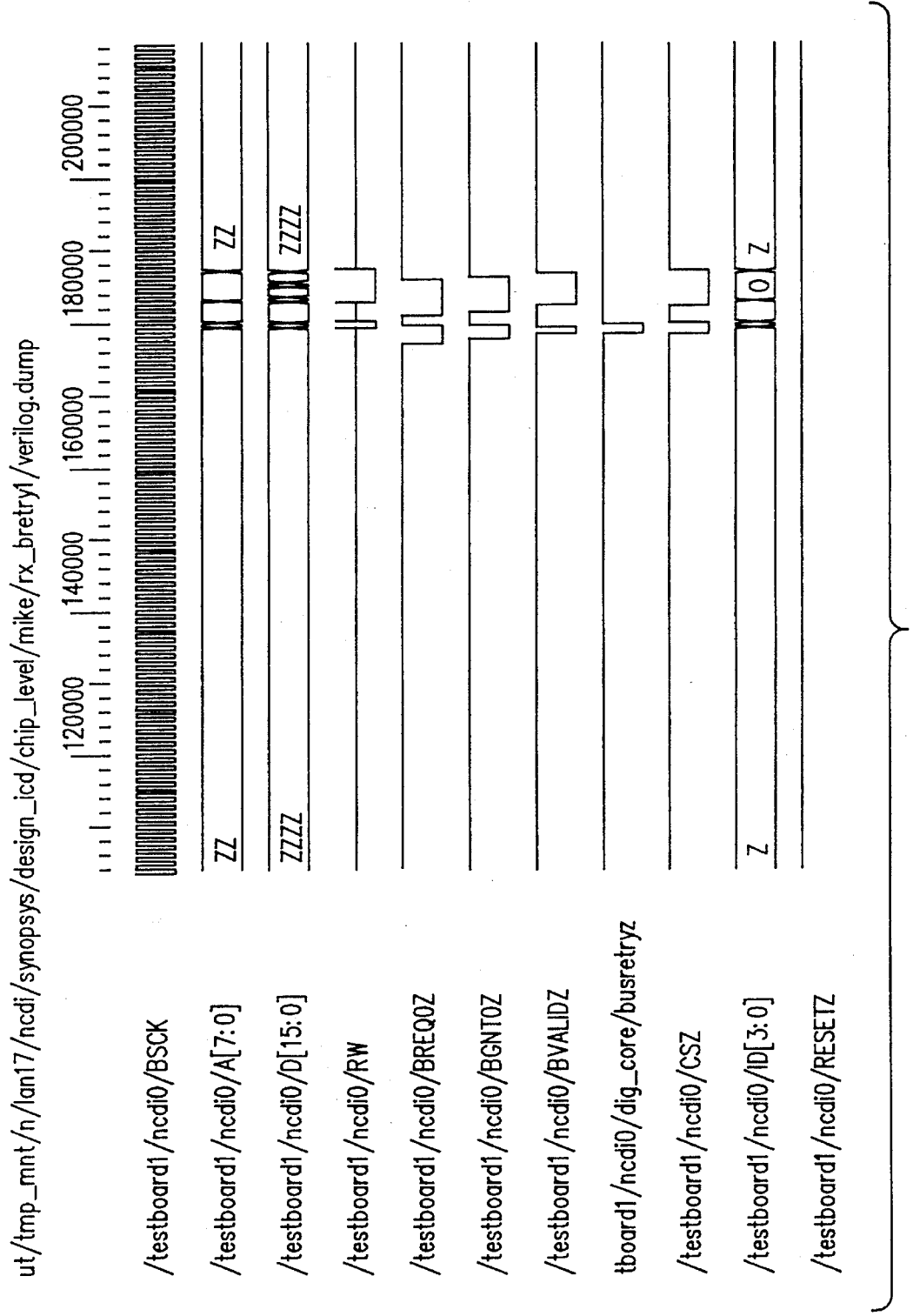
Figure 13:
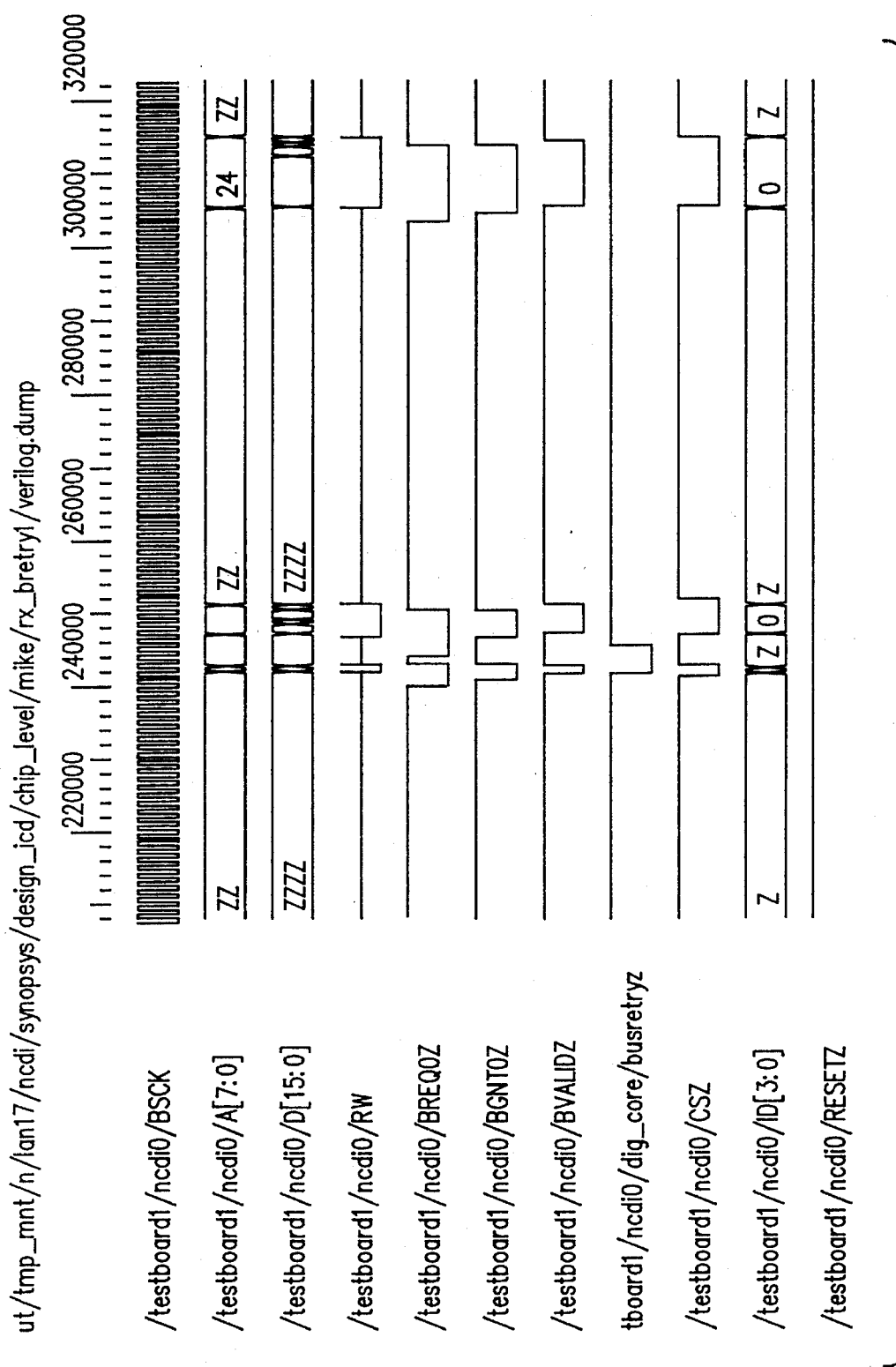
Figure 14:
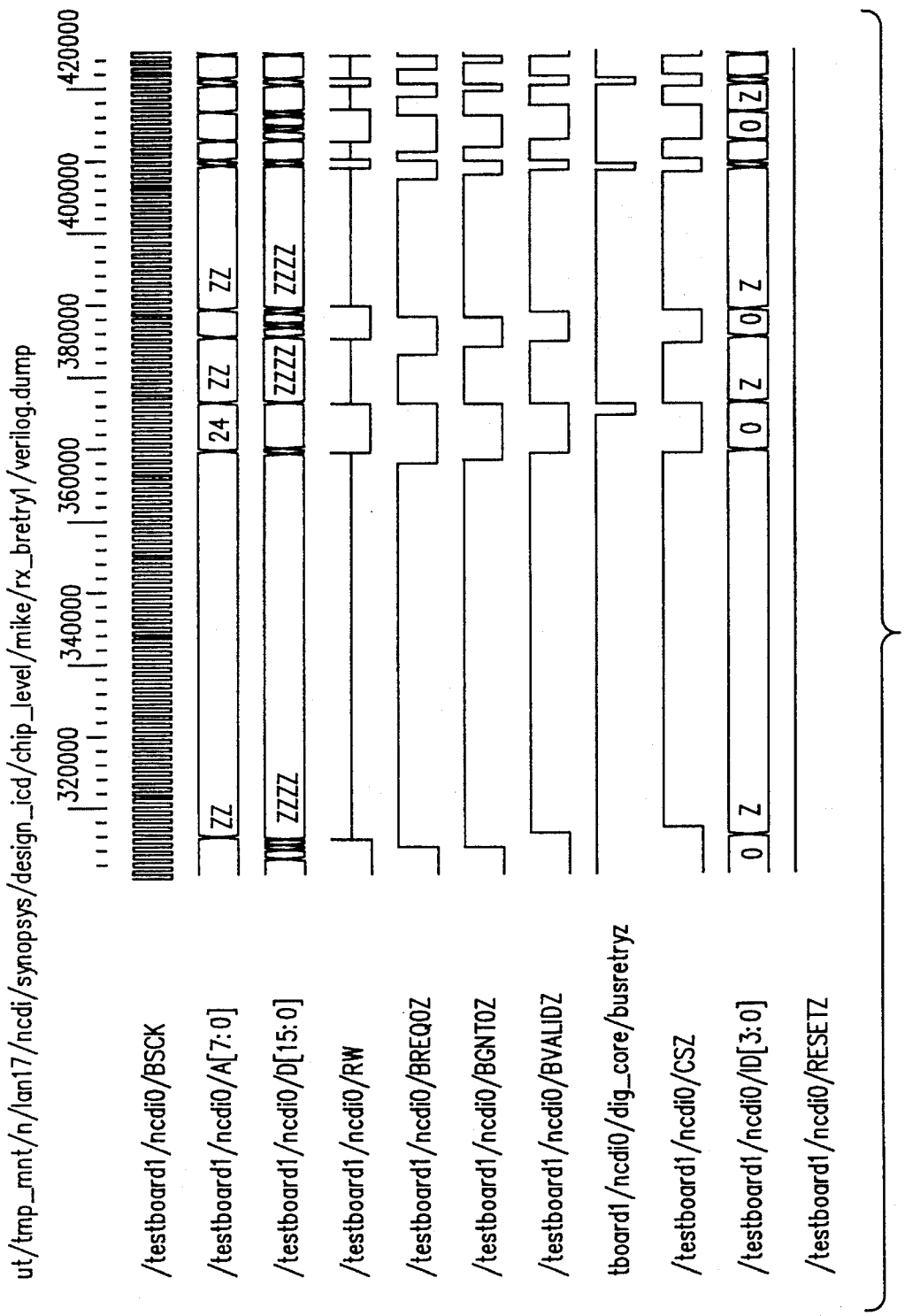
Figure 15:
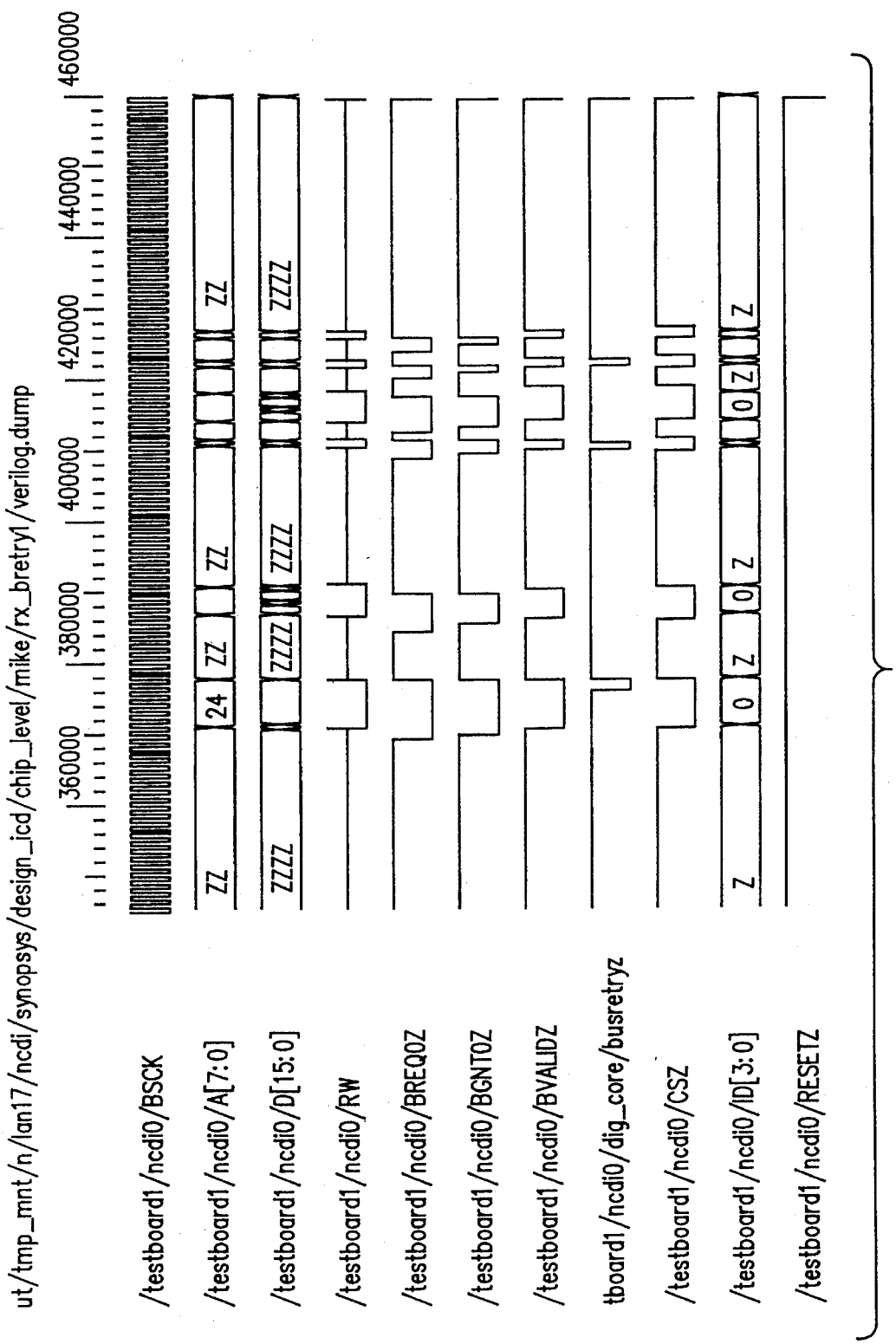

Basically, as shown in FIG. 10A, there are two FIFOs involved. One FIFO is providing data to another and one FIFO is in control of the process of moving data. If the FIFO that is not in control cannot take anymore data, or does not have anymore data to give, it must be able to notify the controlling FIFO. It does this using the –BRT signal. By following this protocol, the two FIFOs can act as if they were a single FIFO with a length equal to the sum of the two FIFO's length. This means that neither FIFO will underrun or overflow unless both FIFOs reach such a condition.

Note that for such a protocol to work, some method is needed for the data to be transferred from one FIFO to another. The method used can be made up of a bus, as in the case of the SCENIC and a BI, or other methods. Also, it is not necessary that the FIFO's be in physically separate chips. This protocol will work if the FIFOs are on the same silicon die or in a multichip module.

FIG. 10 shows a simulation output of a transmit FIFO operation that was aborted using –BRT. FIG. 11–15 show a simulation output of a receive FIFO operation that was aborted using –BRT. Each of these traces are taken from the viewpoint of the SCENIC device.

For the transmit case, the SCENIC is pulling data from the BI chip. The BI will assert –BRT to tell the SCENIC that its FIFO does not have data for the SCENIC to read. The signal . . . busretryz is the —BRT signal. This signal shows five active low pulses representing five times that the transmit FIFO transfer was aborted. The BVALDZ signal is an active low signal that shows when a device is using the bus. It is shown low seven times. The first time is a command by the BI telling the SCENIC to start a transmit operation. The next five assertions of BVALDZ represent five attempts by the SCENIC to read data from the BI's Transmit FIFO. In all five attempts, some data is transferred, but the BI's FIFO uses –BRT to tell the SCENIC's FIFO that there is no more data to read. This causes the SCENIC to re-attempt. The last assertion of BVALDZ shows that the transfer occurred normally since busretryz was not asserted.

The other signals in this simulation are:

| BSCK | the bus clock |
|---|---|
| A[7:0] | the address |
| D[15:0] | the data |

-continued

| | |
|---|---|
| RW | the read/write signal where high means a read and low means a write |
| BREQ0Z | the bus request signal asserted by the SCENIC to request the bus |
| BGNT0Z | the bus grant signal asserted by the bus arbiter to grant the bus to the SCENIC |
| CSZ | the chip select signal used to indicate a bus access to or from the BI |
| ID[3:0] | a 4 bit identifier code used to select the SCENIC or identify the SCENIC. |

For the receive case, the situation is very similar, except that the traces are more spread out. Also, in this case, the SCENIC is trying to write data to the BI, and the BI is telling the SCENIC that its FIFO does not have any space to accept the data that is being written. Again, several attempts are made to transfer data to the BI. In many of the attempts, data is transferred, but also, in many attempts, the BI must request that the SCENIC FIFO hold onto its data until a later time while the BI makes space for the new data. These occurrences are shown by the assertion of the busretryz signal.

Bus Arbitration

Before any transfers can occur on the bus, the bus must be acquired. This is done through bus arbitration. On the NCDI bus, a device requests the bus by asserting a $\overline{BREQ}$ signal and is granted the bus by a $\overline{BGRANT}$ signal. There are four external $\overline{BREQ}$ and $\overline{BGRANT}$ signals and one internal equivalent for each on the SCENIC, making a total of five possible bus masters when using the SCENIC as the Bus Arbiter. The SCENIC can be configured to operate as the active Bus Arbiter by setting the Active Bus Arbiter configuration bit in the boot EEPROM. In systems with only one SCENIC, this would be the default. In systems with multiple SCENICs, one, and only one, SCENIC should have its Active Bus Arbiter configuration bit enabled.

The SCENIC provides a user-programmable priority arbitration mechanism. Within a single bus cycle, the arbiter attempts to determine who the next bus owner will be first from a user-programmed register and then, if a clear "winner" is not found, from a second level default.

The arbitration scheme used by the SCENIC is a two level, single dead cycle implementation. The user is allowed to program the priority of each bus master through a user-accessible register. A 3-bit priority scheme is used, thus allowing a total of 8 priority settings per bus master. A convention of 7 hex (3 one's) equals the lowest priority.

Figure 16:
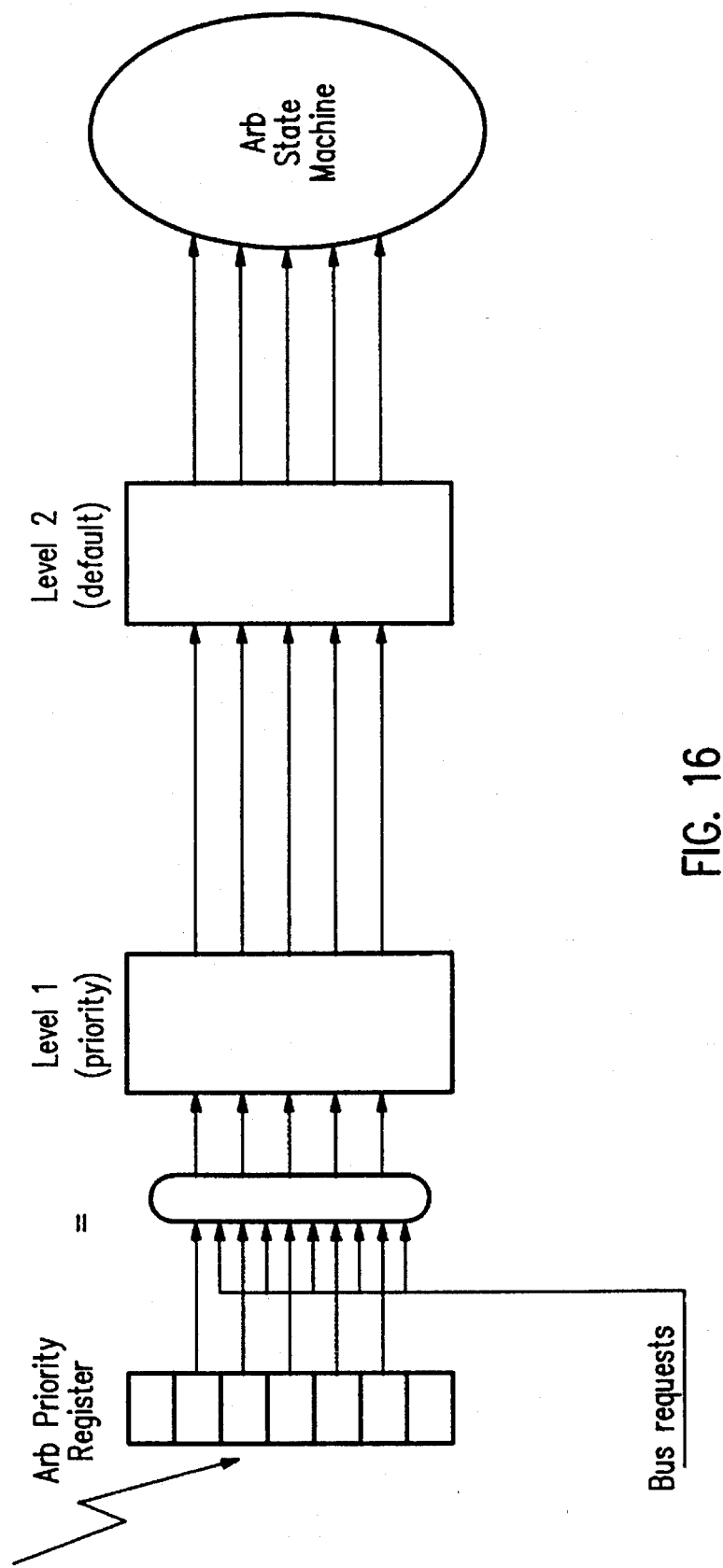
FIG. 16 is a block diagram illustrating the arbitration flow of the SCENIC's user programmable, low level priority arbitration system.

As stated above, and as shown in FIG. 16, there are two levels of arbitration used to determine "the winner":

level1 (L1)—a set of comparators sufficient in number to handle all inputs.

level2 (L2)—a priority decoder that takes the inputs from L1 and yields a single output. It is this output that represents the next owner of the bus.

Whenever a bus request is made by a bus master, the logic will inject the user-programmed priority settings into the level1 comparators. If there is no bus request pending, then the "lowest priority" (7 hex) will be sent instead. This means that if there are no bus requests present, each bus master priority input is being continuously sent the lowest setting of 7 hex. If a bus request shows up, the comparators compare the injected priority from the request, to whatever priorities are currently sitting at the inputs to the L1 logic (comparators).

The results of level1 are sent to level2 whether a winner has been determined or not. The level2 decision-making logic bases its decisions off of the connectivity to the bus request inputs to the chip. Because of this, the level2 logic represents the "default settings" of the arbiter. The level2 priority decoder guarantees that only one output will be asserted at a time. This is a necessary step in order to guarantee that only one bus master can own the bus at a time. The decision from this block on which bust master should get the bus, goes to a finite state machine so that a bus grant may be awarded to the master synchronously.

As stated above, the round trip for this arbitration takes one clock cycle to complete.

Bus Arbiter Function

There are four bus request input signals. $\overline{BREQ<3:0>}$ and four bus grant signals, $\overline{BGRANT<3:0>}$. When the SCENIC becomes the active Bus Arbiter, all $\overline{BREQ}$ signals become inputs and all $\overline{BGRANT}$ signals become outputs. For the other SCENICs on the bus, $\overline{BREQ0}$ becomes an output, $\overline{BGRANT0}$ becomes an input and $\overline{BREQ<3:1>}$ and $\overline{BGRANT<3:1>}$ are at a high impedance. There are up to five NCDI Bus Masters supported by the active Bus Arbiter. This includes four external masters and the internal logic in the active Bus Arbiter itself.

The Bus Arbiter controls the bus using a 5 level priority, fairness option, bus preemption, and a bus preempt counter. Each of these features are described below.

Bus Mater Priority and Preemption

Each possible bus master can be given its own priority with respect to the others. Bus masters can also be given the same priority. The priority of each bus master is set on a per master basis using a 3 bit priority level in the Bus Master Priority Configuration Register.

Each bus master is allowed to own the bus for as long as it needs the bus or until it is preempted by the Bus Arbiter. Bus preemption is accomplished by the Bus Arbiter de-asserting the $\overline{BGRANT}$ signal to the current bus master. A bus master determines how long it needs the bus based on its FIFO thresholds and command transfer needs. If given the opportunity, a bus master can keep the bus indefinitely. However, if any other device requests the bus, the then Bus Arbiter will start a configurable bus time-out counter that, when it reaches zero, will preempt the current master off the bus by de-asserting that master's $\overline{BGRANT}$ signal. This timeout counter is programmed by the Bus Preempt Counter Register.

If Fairness is disabled, then the highest priority device will always be given the bus first, even if the highest priority device was the last device to request the bus. If there are multiple bus masters with the same priority, then an inherent priority will take over, and the highest priority device based on the inherent priority will be given the bus. Note that it generally does no good to set several devices to the same priority because of this, in the case where two or more requests are made at the same time, the devices will be given the bus first based on the inherent priority. This priority is as follows: Bus Arbiter, $\overline{BREQ0}$, $\overline{BREQ1}$, $\overline{BREQ3}$, $\overline{BREQ3}$.

If a bus master gives up the bus and requests it again immediately (perhaps due to preemption), it will not get the bus until after the next lowest priority device has gone first. Hence, it is not possible for the highest priority device to own the bus forever since it must yield at least every other ownership to a lower priority device. If there is one bus master at priority 0 and two masters at priority 1, then when the priority 0 device gives up the bus and requests immediately, it will only lose control of the bus to one of the priority 1 devices. After one of the priority 1 devices gives up the bus, the priority 0 device will be given the bus again. After the priority 0 device is done, the second priority 1 device will be given the bus.

Bus Master Fairness

With Fairness enabled, priority has no meaning as programmed in the Bus Master Priority Configuration Register. Any device that is granted the bus will not be allowed to use the bus again until after all other pending bus requests have been serviced. This means that the Bus Arbiter will ignore the BREQ line from a bus master that has already had the bus until all other BREQ lines are either de-asserted, or being ignored themselves. (Note that the internal BREQ line that comes from the Bus Arbiter itself is counted in this.)

Bus Preempt Counter

The Bus Preempt Counter is used by the Bus Arbiter to time how long a bus master is allowed to continue using the bus after another bus request has occurred. When a new bus request occurs while another master already has the bus, the Bus Arbiter starts the Bus Preempt Counter, which counts down to 0. The counter decrements once each BSCK cycle. When the counter reaches 0, the Bus Arbiter will preempt the current bus master off the bus by de-asserting the masters BGRANT signal.

The counter can be loaded with any desired value, but is defaults to 40 BSCKs. This gives all bus masters about 40 transfers on the bus before being kicked off. It is not recommended to set this counter below 2 BSCK's.

Bus Arbitration Cycles

Figure 17:
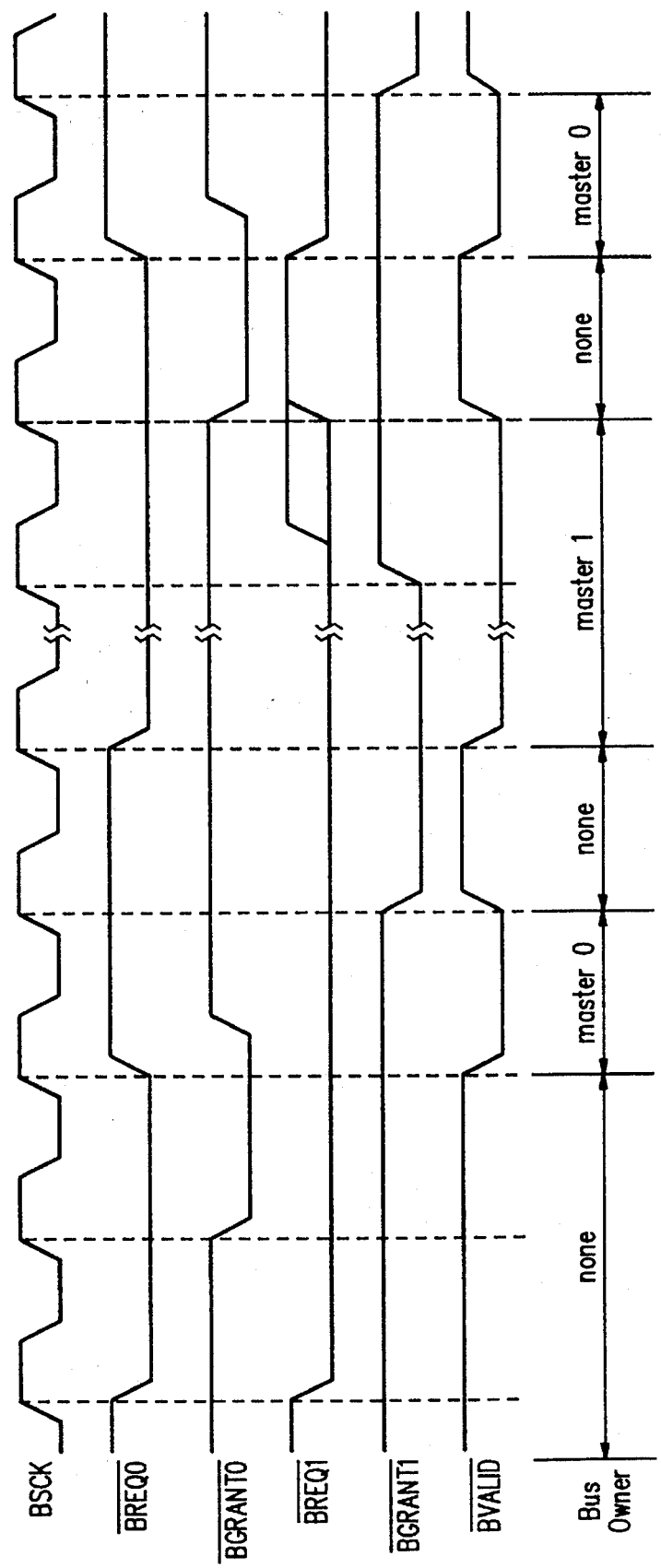
FIG. 17 is a timing diagram illustrating bus arbitration between two bus masters in a system utilizing a configurable network interface controller in accordance with the present invention.

In all bus requests, the requesting bus master drives BREQ to the Bus Arbiter. The Bus Arbiter samples BREQ and will drive BGRANT at the start of the next BSCK. This is shown in FIG. 17 where there are two bus masters trying to use the bus. In the example, BREQ0 is a higher priority than BREQ1 either due to the priority actually being set in the Bus Master Priority Configuration Register or because by default, in a tie, BREQ0 wins over BREQ1, given everything else being the same (i.e., fairness mode is enabled).

Once a master owns the bus, it may use the bus for as long as it needs it or until it is preempted off the bus by the removal of the BGRANT signal. As the master uses the bus, it will continue to hold BREQ low to show that it intends to continue using the bus. When the master is finished with the bus, it will de-assert BREQ on the rising edge of the last transfer cycle. The Bus Arbiter will notice this immediately and de-assert BGRANT. At that point, the bus master is only allowed to complete its current transfer. If that transfer only takes one BSCK (there are no wait states), then the Bus Arbiter will drive BGRANT low for the next bus master off the rising edge of the end of the last transfer cycle. This tells the next bus master that it may occupy the bus at the start of the next cycle (the next rising edge after the Bus Arbiter asserted BGRANT). If there are wait states involved in the last transfer, then the bus arbiter will wait for BUSY to be de-asserted. The cycle where BUSY is de-asserted becomes the last transfer and the bus arbiter will assert BGRANT to the next master on the rising edge of BSCK after the data was latched in the previous transfer.

In FIG. 17, initially there are no bus masters on the bus. At the same time, BREQ0 and BREQ1 are driven low to request the bus. The Bus Arbiter grants the bus to BREQ0 first by driving BGRANT0 low. In this example, Bus Master 0 only wants to perform a single cycle, so as soon as Master 0 gets the bus, it de-asserts BREQ0 to show that this is its one and only transfer. The Bus Arbiter responds by de-asserting BGRANT.

Since Master 1 is still requesting the bus, the Bus Arbiter will grant the bus to Master 1 by driving BGRANT1 low just after the rising edge of the end of master 0's last transfer. This tells Master 1 that it may occupy the bus after the next rising edge. Notice that there is a single dead cycle between each bus ownership. This dead cycle allows for one bus master to high impedance its drivers in plenty of time so as to not conflict with the next bus master.

Master 1 hangs on to the bus for several transfers, but eventually must be preempted off the bus since Master 0 has made another bus request. FIG. 17 shows BGRANT1 being driven high off the rising edge of BSCK one cycle before the end of master 1's last transfer. Master 1 responds by de-asserting BREQ1 no later than just after the rising edge of the dead cycle. If Master 1 wants to request the bus again, it would do so by driving BREQ1 low on the rising edge of BSCK at the end of the dead cycle. After Master 1 is off the bus, the Bus Arbiter grants the bus to master 0 again.

If a wait state occurs in the last transfer for a bus master, the bus arbiter will not grant the bus to any other masters until the wait states have passed. In other words, the Bus Arbiter will only grant the bus to another bus master on the rising edge at the end of the last transfer, which is the same as the rising edge of the dead cycle.

SCENIC and Interrupts

The SCENIC has the ability to pass interrupts to the BI chip. This is done by the SCENIC acquiring the bus and writing the interrupt bits into an interrupt status register on the BI. There is no interrupt signal from the SCENIC to the BI because there is not a critical need for these interrupts to reach the BI immediately. It is expected, however, that the BI would attempt to notify the main system or act upon the interrupt immediately upon receiving the interrupt status.

The interrupt status given to the BI matches that found in the Interrupt Status register on the SCENIC. The contents of this register are written directly to the BI chip. Note that the bit pattern of the interrupt status register is provided for information only. There would not normally be a need to directly read or write to this register on the SCENIC.

The interrupt status register on the BI should be designed to be a "set" only register from the NCDI bus. This means that the SCENIC can only set bits in this register by writing 1's to the register, but cannot reset bits in the register by writing 0's. It is the responsibility of the BI or the system software to clear interrupt bits in the BI's interrupt status register. Once the SCENIC writes an interrupt to the BI, it will clear the interrupt in its own Interrupt Status Register. Hence, there is only one indication of an interrupt occurring.

Even though there is no interrupt signal between the SCENIC and the BI, interrupts will be delivered to the BI in a timely manner since interrupts are the highest priority bus access the SCENIC can do. If a interrupt occurs in the SCENIC's Interrupt Status Register (ISR), the SCENIC will give highest priority to writing the ISR into the BI's interrupt register. Because of latency on the bus, however, interrupts will generally not be delivered to the BI immediately. This is not a problem because the interrupts the SCENIC uses are not critical interrupts.

Whenever an interrupt occurs, the bit in the ISR is set that corresponds to that interrupt. The only time this will cause the SCENIC to write the ISR to the BI is if the mask bit in the Interrupt Mask Register (IMR) corresponding to that interrupt is not set. In other words, if the interrupt is masked, then when it is set in the ISR, it will not be written to the BI. Hence, the mask bits do not prevent the bit from being set in the ISR, they only prevent the SCENIC from writing the ISR to the BI specifically due to the interrupt that has been masked.

If the bit is not masked, then the SCENIC will write the entire ISR to the BI, including any bits that were masked. Upon doing so, all bits in the ISR will be cleared and the BI must take responsibility of acting upon the interrupts. Note that if it is designed to mask a bit that was written by the SCENIC so that the bit is not written to the BI, it must be done on the BI since the SCENIC will write the entire ISR, including bits that have been masked on the BI.

C. SCENIC Initialization

Upon receiving the $\overline{\text{RESET}}$ pulse, the SCENIC begins its initialization procedure. The process involves reading the EEPROM's configuration register and Ethernet physical address and loading them into the EEPROM Configuration register and the CAM.

As a diagnostic feature, the SCENIC has two registers that can be used to access the EEPROM directly, the Boot EEPROM Command Register (BECR) and the Boot EEPROM Data Register (BEDR). BECR is used to write commands out to the EEPROM and BEDR is used to hold data that is read or written to and from the EEPROM. These registers would generally be used to verify the contents of the EEPROM, but it is possible to program the EEPROM through these registers. Because of the limitation of reading data through a 16 bit register, complete, EEPROM reads and writes are not possible. Also, there are safety measures to ensure that accidental erasure or overwriting of data does not occur. This interface will always be active, even if the chip has not booted up correctly for some reason. This is the case since, if the chip does not correctly come up, it may be necessary to fix the EEPROM to get the chip working.

Initialization EEPROM Specification

The EEPROM supported by the SCENIC is a NM93C06 256 Bit Electrically Erasable Programmable Memory available from National Semiconductor Corp. Other devices of a larger capacity or with different features can be used if needed, but the NM93C06 is all that is required to fulfill the SCENIC's requirements. The NM93C06 is a CMOS EEPROM which is divided into 16 registers of 16 bits each. This memory features a serial interface with the instruction, address, and write data input on the Data-In (DI) pin. All read data and device status is output on the Data-Out (DO) pin. A low to high transition on the shift clock (SK) shifts all data in and out.

There are 7 instructions. They are listed in FIG. 18. Each instruction to the NM93C06 is sent serially to through the DI pin on the NM93C06. Each instruction begins with a start bit (always 1) followed by the Op Code. The Op Code is followed by an address to a particular register, or by an addition of the Op Code. Finally, if it applies, the data to be written is sent.

There are four interface signals on the SCENIC used to access the NM93C06 EEPROM. They are PROMDI, for sending a serial bit stream to the EEPROM, PROMDO, for receiving a serial bit stream from the EEPROM, PROMSK, the clock used by the EEPROM and PROMCS, the chip select for the EEPROM.

The NM94C06 has a maximum SK Clock Frequency of 1 MHz. Because of this, the NCDI Clock is divided by 20. This will create a 500 KHz clock when the NCDI bus is operating at 10 MHz. Hence, at 12.5 MHz, the SK clock will be 625 KHz and at 16.5 MHz, the SK clock will be 825 KHz.

Reading of the EEPROM begins immediately after hardware reset is de-asserted. The total time needed to complete the initialization is based on the SK clock frequency. This time is the time required to send a 9 bit command (the start bit plus the 8 bit command) four times to read four 16 bit registers. This is a total of 64 SK clocks for register data and 36 SK clocks for the commands. At 10 MHz, this time will be approximately 200 μsec.

Note that depending on the design, it may not be necessary to use a NM93C06. All that is required is that the correct information be provided to the SCENIC through its EEPROM interface when the SCENIC starts up. There are many ways to accomplish this which include using a different kind of EEPROM or combinatorial logic. The simplest interface is to use a pullup resistor to pull PROMDO high. This guarantees the SCENIC will be configured as the bus arbiter with an ID code of 1111 (Fh).

Initialization EEPROM Contents

At minimum, the EEPROM will contain a 16 bit configuration register and the 48 bit physical ethernet address for the SCENIC interface. The 16 bit configuration register is found in the first register in the EEPROM, register 0 (A5–A0=0). The 48 bit physical network address is found in registers 1, 2 and 3. (A5–A2=0, A1–A0=01, 10 and 11).

Initialization Procedure

As soon as $\overline{\text{RESET}}$ is de-asserted, the boot logic takes control of the SCENIC. It does this by asserting BOOTLOCAL to isolate the SCENIC from the NCDI bus. After doing this, the SCENIC will read the configuration register (register 0) from the EEPROM. The contents of this register will be loaded into the EEPROM Configuration Register.

After configuration of the system based on the information in the configuration register, the SCENIC will read the three network address registers, 1, 2, and 3. Each register value will be loaded into the CAM Address Port (CAP) register in the CAM, EEPROM register 1 will be placed in CAP0, register 2 will be placed in CAP1 and register 3 will be placed in CAP2.

Notice that is important to load the EEPROM correctly. For Ethernet, addresses are assigned as a series of 6 bytes by the IEEE. An example is given below in hexadecimal numbers.

12 34 56 78 9A BC

When this address is transmitted on the network, the 12h will be transmitted first. In fact, the least significant bit of 12h will be transmitted first. Hence, given the example above, the bit pattern seen on the network would be as shown in FIG. 19.

When loading the CAM, CAP2 would be loaded with BC9A, CAP1 would be loaded with 7856 and CAP0 would be loaded with 3412. Hence, register 1 would be loaded with 3412, register 2 would be loaded with 7856 and register 3 would be loaded with BC9A.

D. The Packet Transfer Protocol (PTP)

The Packet Transfer Protocol (PTP) is the main protocol used to transmit and receive packets on the SCENIC. The PTP is made up of a few simple commands used to initiate and control packet transmission and reception. They are split up into Transmit PIP commands and Receive PTP commands.

A PTP command is made up of a 16 bit word. Bits 14-12 make up the 3 bit PTP command opcode and bits 11-0 make up an optional data or attribute field for the opcode. Bit 15 is a reserved bit and should always be set to 0.

PTP commands can be generated by both the SCENIC and the supporting BI chip for both the receive and transmit paths. The SCENIC has two command and data ports, the Transmit Network Port (TXNP) and the Receive Network Port (RXNP). It is necessary for the BI chip to have a similar pair of registers. For this document, these BI registers will be called the Transmit Network BI Port and Receive Network BI Port.

The BI chip writes commands into the SCENIC Transmit Network Port to transmit packets or control the transmit process. The SCENIC would also write commands to the BI Transmit Network Port. There is no need for the SCENIC to write data to the Transmit Network BI Port. The SCENIC would only write command, or read commands and transmit data from the BI Transmit Network Port.

For reception, the SCENIC would write commands and data to the BI Receive Network Port, and the BI chip would write only commands to the Receive Network NCDI Port.

In all cases, the BI or SCENIC distinguish between a command word and a data word by using the D/$\overline{C}$ signal. When D/$\overline{C}$ is asserted high, the word is data. When D/$\overline{C}$ is asserted low, the word is a command.

Each of these protocols and the packet transfer process is described in the following sections.

Transmit PTP and Packet Transmission

The Transmit PIP commands are listed in FIG. 20. The SOF command is the only Transmit PTP command with data in the attribute field. Before these attributes can be discussed, however, an understanding of the transmit process is necessary.

The Transmit Process

When the BI chip needs to transmit a packet, it notifies the SCENIC by writing an SOF command to the SCENIC Transmit Network Port (TXNP). This causes the SCENIC to start reading data from the Transmit Network Port on the BI. Even though the BI starts the transmit, it is the SCENIC's job to get the data that needs to be transmitted. There is approximately a five cycle turn-around time between the SCENIC receiving the SOF command from the BI and the first access of the BI by the SCENIC to read transmit data, assuming that no other bus activity delays this operation.

As soon as the number of bytes in the transmit FIFO is equal to the transmit FIFO threshold, the SCENIC will start transmitting the packet on the network. If an EOF is read from the BI before the number of bytes in the FIFO reaches the threshold, then the SCENIC will start transmitting immediately upon reading the EOF.

The SCENIC will continue reading words from the business interface until an EOF command is read or an error occurs. After reading the EFO, the SCENIC will write the resulting status of the transmit back to the BI's transmit status port. The transmit is completed once this has been done.

In order to make sure the transmit FIFO will not underrun, the SCENIC will not start transmitting to the network until it has filled the transmit FIFO to the transmit FIFO threshold (set by the FIFO Threshold bits in the Data Configuration Register). Transmission begins when the number of bytes in the FIFO threshold value.

As the packet is transmitted, the number of bytes in the FIFO will eventually drop below the transmit FIFO threshold. When this happens, the SCENIC will arbitrate for the bus and pull more packet data out of the BI chip. The number of bytes transferred depends on two things. If the SCENIC is preempted off the bus and the setting of the Block Mode Select (BMS) bit in the Data Configuration Register (DCR).

If Block mode is selected, the SCENIC will transfer a number of bytes equal to its transmit FIFO threshold value. If Empty/Fill mode is selected, the opposite of Block mode, the SCENIC will completely fill the Transmit FIFO before giving up the bus. In either case, if a preemption occurs, the SCENIC will request the bus again immediately if it has not been able to bring the transmit FIFO beyond its threshold.

There is one PTP command that is involved with stopping the transmit process before it is complete, the ABORT command.

ABORT, when written to the SCENIC Transmit Network Port by the BI chip, would be issued for any reason that the BI wants to abort the packet transmission (e.g., FIFO underrun on the BI or a halt transmit from the system the BI connects to). After receiving an ABORT command, the SCENIC will immediately flush its transmit FIFO and halt the transmission. The transmit status will be returned back to the BI indicating that the abort has occurred by setting the TCC bits.

The ABORT command can be used to abort transmission of a packet only if data for the packet is being transferred from the BI chip to the SCENIC. This means that ABORT from the BI is only meaningful when issued between the SOF being given to the SCENIC and the EOF being read from the BI chip.

If ABORT is issued before the SOF is issued, or after the EOF has been read from the BI chip, the SCENIC will ignore the ABORT. Notice that the purpose of ABORT is to tell SCENIC to stop pulling data from the BI chip. It is not meant to be a means of halting the packet transmit process, although it can be used to do this as long as EOF has not been read from the BI chip.

ABORT, when written to the BI's Transmit Network Port by the SCENIC, is meant to tell the BI that an error has occurred, and the SCENIC will not be reading the rest of the current transmit packet. Specifically, the errors that cause SCENIC to write a Transmit ABORT to the BI are a Parity error or a Transmit FIFO underrun. The BI would use this command to flush its own transmit FIFO or, in some other way, dump the remainder of the current transmit packet. Following ABORT, the SCENIC would write status to the BI to indicate why the packet was aborted. Note that there are other fatal transmit errors that may cause the transmit process to be aborted, but do not cause the SCENIC to send a Transmit ABORT to the BI. These fatal errors are Excessive Collision, Excessive Deferral and Un-retransmittable Collisions. Furthermore, disabling the transmitter (or other causes that create a Cancel Accept status in the Transmit Status Register) or a Transmit ABORT command from the BI will not cause the SCENIC to send a transmit ABORT to the BI. In all of these cases, the SCENIC will continue to pull transmit data from the BI until an EOF is found.

ABORT from the SCENIC during a transmit can be disabled by setting the TX ABORT Disable bit in the Transmit Configuration Register (TXCR). When ABORT is disabled, the SCENIC will not send the command to the BI chip. Instead, it will continue to read the packet from the BI until an EOF is reached. Status would then be returned to the BI chip's transmit status port.

The SCENIC's transmit FIFO is designed to handle only one transmit packet at a time. For this reason, it is not possible to queue up multiple SOF commands in the SCENIC. When transmitting multiple packets back to back, as soon as the EOF command has been read from the BI chip, the BI would give the SCENIC another SOF command. The SCENIC will hang on to that SOF until the previous packet is completely out of the FIFO. At that time, status will be written back to the BI and the new SOF will be acted upon by the SCENIC.

Transmit Command Options

The transmit SOF command has a few options for packet transmission that allow different kinds of transmit configurations to be changed on a per packet basis. The bit configurations are listed in FIG. 20. Each configuration option is explained in more detail below.

CRC Inhibit (CRC): The SCENIC's Media Access Controller (MAC) normally calculates the CRC of an outgoing packet so that it can append that value as the last 4 bytes (the FCS field) of the packet. The CRCI option causes the 4 byte FCS field not to be appended. This is useful for transmitting packets that may already have a CRC value appended.

Automatic Transmit Padding (ATP): In order to save bandwidth on the bus, the ATP option can be used to cause the SCENIC to automatically paid runt packets out to 64 bytes in length. If CRCi is enabled, then the packet will be padded out to 64 bytes in length. If CRCI is not enabled, then padding will stop at 60 bytes so that the CRC generated by the MAC will fill in the last 4 bytes. The padding operation occurs in the MAC, so no FIFO space is taken up to accomplish this function.

Program "Out of Window Collision" Timer (POWC): An out of window collision is a collision that occurs one slot time, or 51.2 µs, after the "beginning of the packet." POWC is used to determine when the slot time begins. It can be set to either the start of SFD, or the start of preamble.

Excessive Deferral Time Disable (EXDIS): When the SCENIC cannot transmit on the network due to excessively long network activity, the Excessive Deferral Timer can be used to cause the SCENIC to give up on the transmit. When the timer is enabled, the SCENIC will wait 1.6 ms before the timer times out. When EXDIS is set, the SCENIC will keep trying forever to transmit the packet.

Loopbask Control (LB1,LB0): There are three loopback modes on the SCNIC: MAC, ENDEC and Transceiver loopback. In all loopback modes, the receiver is allowed to receive the packet that is transmitted. Hence, receive and transmit activity is occurring at the same time.

For MAC loopback, data is not sent from the MAC to either the internal ENDEC or external ENDEC pins. Even though the internal ENDEC or an external ENDEC is not used in MAC loopback, the transmit clock from the ENDEC (TXC) or from an external source connected to TXC must be provided. Network activity, such as a collision, does not affect MAC loopback. CSMA/CD MAC protocol is not completely followed in MAC loopback.

For ENDEC loopback, if the internal ENDEC is used, data is switched from the transmit section of the ENDEC to the receive section. Data is not transmitted from the chip's AUI or TPI interfaces and external network activity is ignored. The LBK signal from the MAC tells the internal ENDEC to go into ENDEC loopback mode. If an external ENDEC is used, it should operate in loopback mode when the LBK signal is asserted. CSMA/CD MAC protocol is followed even though data is not transmitted from the SCENIC's AUI or TPI ports. The protocol is followed because it is possible for an external ENDEC to transmit loopback data onto a network (i.e., data leaves the chip via the external ENDEC interface, and since the SCENIC has no control over that data, CSMA/CD MAC protocol must be followed).

For Transceiver loopback, the internal transceiver is disconnected from the outside network so that the loopback operation can be performed without interference from the network. Since the transceiver normally loops packet data back to the receiver, no other switching is needed. CSMA/CD MAC protocol is followed even though data does not leave the chip through either the AUI or TPI interfaces.

Although loopback is similar to full duplex mode (enabled by setting the TFI bit in the Network Interface configuration register), the two operations should not be confused as being the same. Full duplex mode causes the transceiver and ENDEC to ignore collisions and not loop the transmitted packet back to the receiver (as all transceivers do). The SCENIC is also not isolated from the network. Loopback mode disconnects the SCENIC from the network and causes all transmitted packets to be looped back to the receiver.

Because of the differences between loopback and traffic ignore, both modes should not be enabled at the same time. If TFI is enabled, then an attempt to perform a loopback transmission will be ignored. The packet will be transmitted normally.

Transmit Error Indications

All transmit errors are indicated in the transmit status that is returned to the BI chip after each transmission. If a packet is transmitted without a fatal error (an error that would otherwise cancel or abort the transmission), this is indicated by the Packet Transmitted OK bit.

It is possible, however, to have a packet be transmitted OK, but still have some errors. These possible errors are:

Out of Window Collision (OWC)
Packet Monitored Bad (PMB)
Carrier Sense Lost (CRSL)
No Carrier Sense (NCRS)
Deferred Transmission (DEF)

These errors do not necessarily mean the packet was transmitted incorrectly, but the status should be looked at to determine if a significant problem did occur.

If a fatal error occurs, then other bits will indicate what the fatal error was. Fatal errors are:

Transmit Parity Error (TXPE)
Transmit FIFO Underrun (FU)
Excessive Deferral (EXD)
Excessive Collision (EXC)
Un-Retransmittable Collision (URC)
Cancel Accept (due to disabling the transmitter)
Transmit PTP ABORT Command Notice that the last three fatal errors listed are not errors. Instead, they are actually cancel and abort conditions. These conditions are given in the status through the TCC<1:0> bits.

All fatal errors will cause the transmission to be aborted and status to be returned to the BI. If the Transmit ABORT command from SCENIC to the BI is enabled (by the TXAD bit in the Transmit Configuration Register), then the SCENIC will send a Transmit ABORT to the BI, after a fatal error, before sending status to the BI. Otherwise, the SCENIC will continue reading the transmit data from the BI. Otherwise, the SCENIC will continue reading the transmit data from the BI until an EOF is encountered. This data is ignored and the status is sent to the BI after the BI after the EOF is read.

Automatic Retransmit on Collision

The SCENIC's transmit FIFO has been designed to retransmit the beginning of a packet from the FIFO after a collision has occurred. This means that the SCENIC does not have to re-request the start of the packet from the BI after every collision. This is accomplished by not allowing the start of the packet (the SOF) in the FIFO to be overwritten by new transmit data until after a certain number of bytes have been successfully transmitted on the network. The number of bytes that have to be transmitted on the network before the SOF can be erased from the FIFO is determined by the Transmit FIFO Threshold and the F64R bit in the Transmit Configuration Register.

Normally it is suggested that the Transmit FIFO Threshold be set to 64 bytes (splitting the FIFO in half). In this situation, the SCENIC will not overwrite the SOF in the FIFO until 64 bytes have been transmitted on the network. This makes it possible to retransmit the packet, after all collisions that occur during the first 64 bytes of the packet from the BI again.

If the Transmit FIFO Threshold is changed, then the number of bytes that the SCENIC can retransmit from the FIFO changes. The number of bytes that can be retransmitted is equal to:

128–(Transmit FIFO Threshold).

As the Transmit FIFO Threshold increases, the number of bytes the SCENIC can transmit before it will allow the SOF to be overwritten decreases. This is shown in FIG. 21 by the two examples of a 64 byte threshold with a 64 byte retransmit size, and the 80 byte threshold with a 48 byte retransmit size.

The reason for the relationship give above is because the latency of the FIFO must always be guaranteed. As shown in FIG. 21, if the Transmit FIFO Threshold is set to 80 bytes, then a latency of 80 bytes must be guaranteed. This can only be done if the SOF is allowed to be overwritten after 48 bytes have been transmitted on the network.

It is possible to retain the 64 byte retransmittable packet size even when the FIFO threshold is greater than 64 bytes. This is accomplished by setting the F64R bit in the Transmit Configuration Register. FIG. 21 shows this by the line marked "Forced 64 Byte Mode." When the threshold is below 64 bytes, the number of bytes retransmitted from the FIFO will be from 64 to 128 bytes. If the threshold is above 64 bytes, then the bytes retransmitted from the FIFO will always be 64.

This mode provides the advantage of a 64 byte retransmittable packet, but at the disadvantage of a momentary reduction of the latency in the transmit FIFO. This momentary reduction will occur once for the first 64 bytes of every transmit packet.

The purpose of the ability to automatically retransmit from the FIFO on a collision is to reduce bandwidth on both the NCDI bus and the external system bus. Most collisions occur within the first 64 bytes of the packet. Since the SCENIC can retransmit the packet after these collisions without using up bus bandwidth a significant savings can be seen in bus utilization.

The side affect of this is that when a collision occurs that cannot be retransmitted, because the SOF has been overwritten in the FIFO, the collision becomes an Un-Retransmittable Collision (URC). In order for a packet to be retransmitted due to a collision in such a case, the system software or BI must look at the status returned by the SCENIC and notice that the URC condition is set. Upon seeing this condition, the BI must re-issue an SOF to the SCENIC to re-transmit the packet from the start.

The SCENIC provides for automatic retransmission of collided Ethernet frames from a local RAM while observing two modes of operation: (1) retransmission of as much of the frame as possible without violating latency requirements and (2) first guaranteeing the safe retransmission of the first 64 bytes and then returning to observation of the latency requirements.

Because CSMA/CD is a contention based protocol, collisions become a fact of life. The IEEE 802.3 specification states that a legal collision may occur within the first 64 bytes of a frame, and that it may be retried a maximum of 16 times. In order to retransmit a particular portion of a frame, a copy of that frame's data must be kept somewhere. There are two possibilities:

(1) The system can store the data (RAM), or (2) The controller can store the data local to the chip (FIFO)

If the packet is stored in memory, then the protocol chip must acquire the bus and retrieve the data from memory. This is a disadvantage should the expansion bus already be heavily loaded. The last thing a system designer needs is to have a bus master use up bandwidth to retrieve the same data over and over.

The second option, although better for the board level designer, may increase the cost of the part due to the die size needed to accommodate an on-board RAM.

In order for the system designer to make good use of a prospective bus master, that master must bring its own latency into the system. This is typically implemented using a FIFO (on-board RAM with queueing logic). If the system designer needs 32 bytes of latency, and the bus master has the ability to provide 128 bytes, the extra 96 bytes of latency could be used as memory and provide a storage space for the first 64 bytes of an Ethernet frame. In other words, if the bus requires a relatively low amount of latency, then it becomes possible to use any remaining FIFO space as a local RAM. It follows then, that in a low latency system, a deep FIFO (128 bytes or greater) could satisfy the needs of both the system designer (no overruns or underruns) and the network (retrying a collision within the first 64 bytes of a frame).

Using this method to handle the automatic retransmission is common place in the market today. However, what is not so standard is the means to handle the worst case scenario; a high latency system.

As stated above, SCENIC has two different modes of operation for handling such a situation. A fixed 128 byte FIFO depth is assumed in this discussion.

In the SCENIC, if the latency of the system is high and the designer is unwilling to increase the size of the FIFOs, the board designer will have a choice: should the bus master obey the latency requirements of the system at all costs, or should it guarantee the retransmission of the first 64 bytes of a frame. This choice is made through a mode setting. In Latency Mode, the bus master will give top priority to maintaining the latency requirements of the system. That is, for a 128 byte FIFO, if the board designer needs at least 32 bytes of latency, then the bus master would be able to retransmit the first 128−32=96 bytes of an Ethernet frame, should a collision occur. The problem with operating in this mode is when a board designer needs, say 100 bytes of latency. In this case, the bus master would only be able to retransmit the first 128−100=28 bytes of a frame. Thus by selecting the mode where bus latency requirements must always be met, the board designer may have to sacrifice the ability to retransmit all frames with legal collisions. FIG. 21 shows the relationship between the FIFO thresholds chosen and the resulting ability to retry a collided frame.

The second mode of operation attempts to meet the needs of both the network and the bus. This mode will guarantee the safe retransmission of the first 64 bytes of a frame. In addition, after these 64 bytes have been transmitted, the controller will then go back to the Latency mode of operation mentioned above. FIG. 21 shows the "retransmittable versus unretransmittable" boundaries. The graph shows that while operating in this mode, the bus master will be able to retransmit at least the first 64 bytes of a frame, should a collision occur. The disadvantage of this choice is seen in the high latency system. If the designer needs 100 bytes of latency in order to guarantee that the controller will not overrun or underrun, and the bus master is keeping a copy of the finest 64 bytes of a frame, it becomes clear that the latency requirements during this first 64 bytes cannot be met. When considering the worst case scenarios, the designer must be prepared for a loss of data to occur during this time period (due to overrun or underrun). Realize that as soon as the first 64 have gone out, the bus master can offer its entire FIFO in order to hit the system's latency requirements.

Receive PTP and Packet Reception

The Receive PTP commands are listed in FIG. 22. Only the EOF command has data in its attribute field. This data is a subset of the normal status that is given to the BI chip's receive status port after a packet has been received.

The Receive Process

When a packet starts coming in off the network, the SCENIC will start filling its receive FIFO with data. As the FIFO fills, it will eventually pass the receive FIFO threshold. The receive FIFO threshold is very similar to the transmit FIFO threshold except that it is opposite. When the receive FIFO has more than the threshold number of bytes in it, the SCENIC will request the bus and start transferring data to the BI chip. The first word that is transferred is an SOF command. The SOF is followed by the packet data.

Each time the SCENIC gets on the bus to transfer data from the receive FIFO, it will transfer either a number of bytes equal in the receive threshold, when Block Mode is set, or it will completely empty the FIFO, if Empty/Fill mode is set (see Block Mode Select in the Data Configuration Register).

If the SCENIC is preempted off the bus, then it will immediately request the bus again if the receive FIFO still has a greater number of bytes in it than the receive FIFO threshold.

If an ABORT command is received by the SCENIC from the BI while the SCENIC is writing received data the BI, then the SCENIC will stop sending data from the current packet to the BI chip immediately. The rest of the packet will be dropped from the FIFO. An EOF command and status will be written to the BI. The status will indicate that the packet was aborted.

Unlike the transmit FIFO, the receive FIFO is designed to handle multiple packets or packet fragments at the same time. Hence, it is possible for the end of one packet, a second small packet, and the beginning of a third packet to all reside in the FIFO for example. If an ABORT command is issued by the BI to abort the current packet being written to the BI, the receive FIFO will look through the FIFO until it sees the next SOF command. At that time, it will start sending data from the new receive packet to the BI. Note that an EOF and status will be sent to the BI first.

As the SCENIC passes a received packet to the BI, it will start with the SOF command followed by several words of data. Eventually, an SOFCS command will be sent to indicate the start of the FCS field. This command would be followed by two more words and an EOF. Status would then be written into the BI's Receive Status Register.

If the SCENIC has been configured to pass runt packets and packets with CRC errors, it is possible that very small packets will be passed. The smallest packet the SCENIC can receive is 2 bytes. In such a case, the data sent to the BI would be an SOF command followed by a word, followed by an EOF command (three transfers). Since not enough bytes were received to do a CRC check, the SOFCS command is not sent. This kind of packet transfer can be depicted as follows:

| 2 bytes | SOF, W, EOF |
|---------|-------------|

Where SOF is an SOF command, W is a word of data and EOF is an EOF command. Following this nomenclature, packets of length 3 to 8 bytes would be transferred as follows (where SOFCS is an SOFCS command and B is a single byte):

| 3 bytes | SOF, W, B, EOF |
|---------|----------------|
| 4 bytes | SOF, SOFCS, W, W, EOF |
| 5 bytes | SOF, B, SOFCS, W, W, EOF |
| 6 bytes | SOF, W, SOFCS, W, W, EOF |
| 7 bytes | SOF, W, B, SOFCS, W, W, EOF |
| 8 bytes | SOF, W, W, SOFCS, W, W, EOF |

This pattern would continue with W and W, B being added between SOF and SOFCS.

Receive Error Indications

All receive errors are indicated in the receive status that is written to the BI's receive status register at the end of each packet. The receive status is stored in the Receive Network Status Register, although reading this register is not recommended since these bits may change at any time. At the end of the reception of each packet, the SCENIC will give status for that packet to the BI by writing the status to the BI's Receive Network Status Port.

Automatic Waiting for a Good Packet

The receive FIFO has been designed to hold the packet that was received from the network, for a selected number of bytes, before sending it to the BI. This feature has been added for the same reason as the Automatic Retransmission on collision feature, namely to reduce bus bandwidth utilization. This feature is optional, depending on the setting of bit 14 in the Receive Configuration Register. If the SCENIC is configured to pass on all received runt packets by setting bit 14 of the RXCR register to a "1", then the Automatic Waiting for a Good Packet feature is no longer applicable.

The number of bytes that will be held before being sent to the BI is equal to the Receive FIFO threshold, which is selected in the Data Configuration Register. For example, if the Receive FIFO threshold is set at 64 bytes, then the SCENIC will wait until 64 bytes have been received before sending the packet to the BI. If packet reception has ended and less than 64 bytes were received, then the BI will never see the activity and the management counters will be updated. If packet reception has not ended and the receive threshold is exceeded, the packet will be sent to the BI so that the latency of the receive FIFO is guaranteed.

E. The Transmit and Receive FIFOs

The SCENIC has separate receive and transmit FIFOs which are 128 bytes in length. This section will explain the FIFOs in detail.

There are several options that can be used to control the FIFOs. These options are FIFO thresholds, Block Mode vs. Empty/Fill Mode, bus preemption and the Bus Retry signal (BRT) and the forced 64 byte retransmit from the FIFO. Each of these are described below.

FIFO Thresholds

The FIFO threshold is the most important part of controlling the FIFO. The threshold controls when the SCENIC requests the bus to empty or fill the FIFO during transmit and receive operations.

The FIFO threshold is programmed in the Data Configuration Register by setting the FT<3:0> bits. These 4 bits program both the receive and transmit thresholds which are opposite of each other. The Receive threshold can be in a range from 2 to 120 bytes and the transmit threshold can be in a range from 8 to 126 bytes. If the receive threshold is increased, then the transmit threshold is decreased.

The main purpose of the FIFO threshold is to set the latency needed by the SCENIC. The required latency is the maximum amount of time the SCENIC FIFO can wait before the FIFO underruns or overruns. This is from the time the FIFO threshold is "crossed" to the time the SCENIC is allowed to start transferring data to or from the FIFO.

Latency time is based on how quickly the network fills or empties the FIFO. With the default setting of 64 bytes, the SCENIC's FIFOs have a maximum latency of 64 bytes times the network speed of 800 ns per byte. This calculates to be 51.2 µs.

Figure 23:
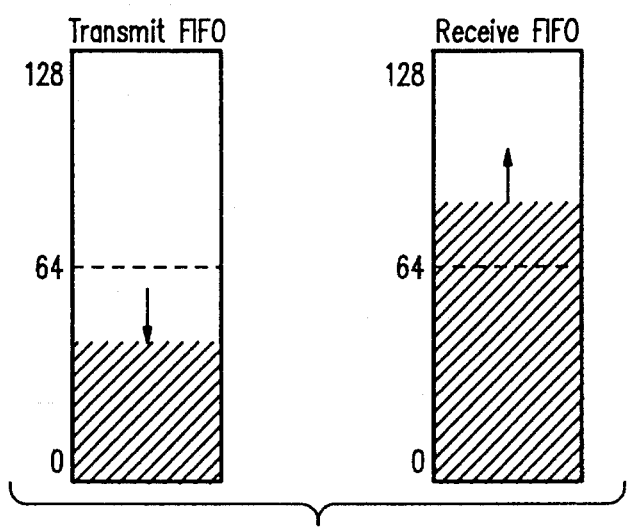
FIG. 23 is graphic representation of a FIFO example with 64 byte threshold.

FIG. 23 shows an example of the receive and transmit FIFOs with the threshold set to 64 bytes. The FIFOs are shown as buckets either filling or emptying with data as if the date were water. The arrows show that the date is leaving the transmit FIFO to be transmitted or entering the receive FIFO as it is received. In both cases, the FIFO threshold of 64 bytes has been "crossed." Notice that for the transmit FIFO, the threshold has been crossed when the number of bytes in the FIFO is less than the threshold. For the receive FIFO, the threshold has been crossed when the number of bytes in the FIFO is greater than the threshold.

When the threshold is crossed, the SCENIC will request the bus to either fill the transmit FIFO or empty the receive FIFO. With a 64 byte threshold, if the time between the threshold being crossed to when the SCENIC starts transferring data is greater than 51.2 µs, then the FIFO will overrun or underrun.

If more latency is needed, then the threshold needs to be changed. If, for example, the threshold is changed to 48 bytes for the receive FIFO, which is an 80 byte threshold for the transmit FIFO, then the FIFOs would look as they do in FIG. 24. In such a case the latency is 64 µs.

Figure 24:
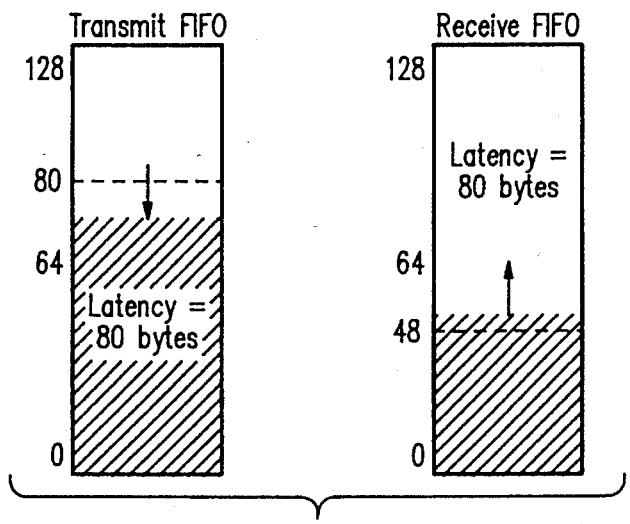
FIG. 24 is a graphic representation of FIFO latency examples.

Notice in FIG. 24 that, even though the receive FIFO threshold is 48, the latency is still 80 bytes for both the receive and transmit FIFOs. The transmit FIFO threshold is always 128 minus the receive threshold. The latency is always equal to the transmit threshold and is the same for both FIFOs. It is desired that the transmit FIFO constantly be full and the receive FIFO constantly be empty. With a latency of 80 bytes, the SCENIC will always attempt to keep greater than 80 bytes in the transmit FIFO, or less than 48 bytes in the receive FIFO. This guarantees that the transmit FIFO will not underrun unless more than 80 bytes are transmitted, or the receive FIFO will not overrun unless more than 80 bytes are received from the time the respective threshold is crossed to the time the SCENIC starts transferring data across the NCDI bus.

Note that in the discussion above, the threshold was referred to as being "crossed." For the transmit FIFO, being crossed means when the number of bytes in the FIFO is less than the threshold. For the receive FIFO, being crossed means when the number of bytes in the FIFO is greater than or equal to the threshold.

In all explanations of the transmit FIFO, it is said to be 127 bytes in length. There is a 2 byte holding register between the FIFO and the NCDI BI logic that effectively makes the Transmit FIFO 130 bytes in length. This means that the transmit FIFO actually has 68 bates of latency instead of 64 bytes, when the transmit threshold is set to 64. The extra two bytes of latency, however, are canceled out by the 2 bytes used to hold the transmit SOF command, so the end result is the same (i.e., it takes 68 bytes of data in the FIFO, which includes an SOF and 64 bytes of packet data, to transmit 64 bytes of data on the network). For this reason, and for ease of explanation, all the discussions on the transmit FIFO assume that it is only 128 bytes. The extra 2 bytes should, however, be taken into consideration when doing critical latency calculations.

Block Mode v. Empty/Fill Mode

When the Block Mode Select (BMS) bit in the Data Configuration register is set to Empty/Fill mode, then whenever the SCENIC transfers data into the transmit FIFO or out of the receive FIFO, it will completely fill or empty the FIFO in one bus ownership if allowed to (i.e., the SCENIC is not preempted off the bus). This is the default mode of the SCENIC.

When Block mode is set, the SCENIC will always transfer a number of bytes into or out of the FIFO that is equal to the receive threshold (or 128 minus the transmit threshold). Block mode is based on the idea that if the SCENIC gained ownership of the bus immediately upon crossing a threshold, and it could transfer data instantly, it would only need to transfer a number of bytes equal to the receive threshold, or 128 minus the transmit threshold, to completely empty the receive FIFO or completely fill the transmit FIFO. In the case shown in FIG. 23, 48 bytes are all that is needed to "top off" the transmit FIFO, or empty out the receive FIFO from the dotted threshold line shown. This is why the block size for FIG. 23 is 48 bytes.

Obviously, the SCENIC does not gain access to the bus immediately. Also, since it takes time to transfer data on the bus, the transmit FIFO will continue to loose data to the network while it is being filled from the bus. The same is true for the receive FIFO, except that it will gain data from the network as it is emptied to the bus.

Block mode is provided as a means of regulating the time the SCENIC spends on the bus.

Bus Preemption and Bus Retry

When the NCDI bus is active, it may be unlikely that the SCENIC will be allowed to transfer a complete block size or to completely fill or empty the FIFO. The SCENIC will often be preempted off the bus first (depending on the value programmed in the Bus Preempt Counter).

Along with bus preemption, it is also possible that the SCENIC will not be able to complete a block transfer due to a bus retry occurring.

Both of these situations affect the latency of the NCDI bus and must be considered when configuring the SCENIC or designing a BI to the NCDI bus.

If the Bus Preempt Counter is set to a byte count that is less than the block size set by the FIFO threshold, then the SCENIC may have to acquire the bus two or more times to bring a transmit FIFO to a point above it threshold or a receive FIFO to a point below its threshold.

The latency does not change much, but it does increase by the extra overhead involved in changing the bus masters. This means extra dead cycles.

A bus retry is not as easy to control since usually a bus retry is a result of the BI's inability to provide or accept data. When a bus retry occurs, the device that received the bus retry signal may have to wait a full period of maximum latency before it can attempt to transfer data again. Because of this, it is suggested that bus retry only be used to prevent a FIFO overrun or underrun in the BI. If the BI is going to loose data due to a FIFO problem, it won't hurt to try to save that data by asking the SCENIC for a little more time. Sometimes, the SCENIC will loose the data instead. Often, however, the packet will be saved.

Forced 64 Byte Retransmit from the FIFO

This mode is programmed by the F64R bit in the Transmit Configuration Register. Setting this mode has a significant affect on the maximum latency the SCENIC can handle.

Referring back to FIG. 21, normally, if the transmit threshold is increased, the maximum latency the transmit FIFO can handle is also increased. For the 80 byte threshold example shown, the latency is 64 µs. This latency is created because the SCENIC will always try to keep 80 bytes in the transmit FIFO. Whenever the number of bytes in the FIFO drops below 80 bytes, the SCENIC has 64 µs to put more data in the FIFO or an underrun will occur.

When the forced 64 byte mode is enabled, it is impossible for the SCENIC to guarantee that there will always be 80 bytes in the FIFO waiting to be transmitted because 64 of the bytes in the FIFO cannot be erased until after they have been transmitted. This means that for the first 64 bytes of every transmit packet, the latency is 51.2 µs, not 64 µs.

If the full 64 µs are needed every time the transmit threshold is crossed, then it is not a good idea to use the forced 64 byte mode since many transmit packets will end in a FIFO underrun. If there is some latency variability, or occasional lost transmit packets can be tolerated, then the forced 64 byte mode will prove to be very useful.

The SCENIC also provides a mechanism for removing unwanted data from a FIFO once it has been determined that the data is no longer wanted.

One problem with a FIFO is that if you get good data enters into the FIFO followed by bad data, and a FIFO reset is normally used to clear the FIFO of bad data, then a FIFO reset cannot be performed on the bad data until the good data has left the FIFO. Often, before this happens, more good data enters the FIFO following the bad data. Hence, a FIFO reset still cannot be performed. It now becomes necessary to get rid of the bad data in another way, which usually takes up clock cycles while the logic looks through the bad data to find the start of good data.

In some conventional interface controllers, the tail end of a good packet would be in the FIFO. This tail end would be followed by a short packet that was not wanted. Normally, when these unwanted packets enter the FIFO, the FIFO is simply reset to get rid of them. In the case where the tail end of a good packet is in the FIFO, the FIFO can't be reset until the tail end of the good packet is gone from the FIFO. At that time, it would be ok to reset the FIFO. Sometimes, however, before the tail end of the good packet left the FIFO, the start of another good packet would enter the FIFO. At this point, it is not possible to reset the FIFO because the beginning of a desirable packet would be lost.

Figure 25:
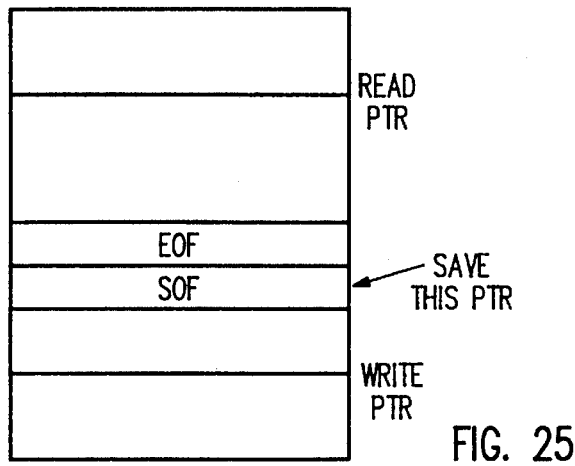
FIG. 25 is a graphic representation of the SCENIC's FIFO backup operation.

A solution to the problem described above is to do a "FIFO Back." This means that when a block of data starts in a FIFO, the starting position of that data is kept in a holding register. FIG. 25 shows this as an arrow pointing to "SOF" and the note saying "Save this PTR." Notice that the "Read PTR" is where the FIFO is being read (emptied) and the "write PTR" is where data is being written into the FIFO. The text "EOF" represents the end of the data being read from the FIFO. This is good data. The "SOF" represents the beginning of data being written to the FIFO. The holding register that saves the location of the "SOF" is kept until the data being written to the FIFO is considered to be good (or rather until the next block of data starts to come in).

If, during the process of loading this block of data into the FIFO, it is discovered that the data is bad, then the FIFO Back operation is performed. The FIFO write pointer is set equal the value of the holding register (which points to the "SOF"). This is the beginning of the bad data block. This operation effectively removes the bad data from the FIFO. After the write pointer is changed, writing the FIFO stops until a new set of data arrives. Note that in this case, the data is made up of specific packets of network data, where one packet may be rejected for one reason or another. Waiting for new data means to wait for the next packet to be received.

The problems described above with the older method of implementing a FIFO are solved because the write pointer has been backed up to where it started for the current set of data. This has made it possible to flush the bad data out of the FIFO without having to do a FIFO reset.

If the start of the bad block of data has already left the FIFO, then it is ok to do a FIFO reset. Instead of doing a FIFO reset, FIFO Back can still be used as long as the holding register is moved with the read pointer. Whenever the SOF is read from the FIFO, the holding register and the read pointer will be equal. When this happens, the holding register would start to move with the read pointer. Or, said another way, a flag would be set to indicate that the holding register is no longer valid because the SOF has left the FIFO. The flag indicates that it is ok to do a FIFO reset, or if a FIFO Back operation is performed, the write pointer must be equal to the read pointer, not the holding register.

Note that SOF and EOF are not a part of the FIFO Back function. They are used on the SCENIC, but are not necessary for the FIFO Back operation to work. It is only necessary that the holding register point to the first FIFO row that contains the beginning of a block of distinct data that might be removed from the FIFO. In the case of the SCENIC, the distinct blocks of data are network receive packets, and each receive packet is preceded by an SOF and followed by an EOF.

F. Network Statistics Counters

The SCENIC is capable of supporting both the IEEE 802.3 Layer Management Enhancement (LME) statistics as required in ANSI/EEE Std. 802.3, Section 5.0, Layer Management and the specifications required by "Management Information Base for Network Management of TCP/IP-based internets: MIB-11" (MIB) as defined in RFC1213, and "Remote Networking Monitoring Management Information Base" (RMON) as defined in RFC1271. Both MIB and RMON are a part of the Simple Network Management Protocol or SNMP.

Because of the various differences between the IEEE LME statistics, MIB and RMON, a subset of statistics are available from the SCENIC which can be combined in order to be compliant to these standards.

This document is not meant to be a tutorial on IEEE LMB, MIB or RMON specifications. Where necessary, explanations of the statistics needed for each of these standards are given. Refer to the appropriate IEEE and RFC documents to understand these standards completely. Also, since MIB and RMON are still in flux, it is not guaranteed that the SCENIC will be fully compliant with future revisions of MIB (beyond MIB-11 and RMON as explained in RFC1271 and RFC1213). Minor changes to these standards, however, should be supported by the SCENIC's subset of statistics.

Accessing the Network Statistics Registers

The network statistics counters are all greater than 16 bits wide. They are accessed by reading registers. Because of the size of the counters, they must be read by reading two 16 bit registers consecutively.

Each statistics counter takes up the space of a 32 bit register. This means that they take up two 16 bit address locations. Hence, two 16 bit register reads are required to read the contents of a single statistics counter. The pair of addresses for each counter are listed in the counter's description.

There are two ways to read the counters. The first method is to simply read them. In either method, when the counters are read, they are automatically cleared after they are read.

It is suggested that the lower word of the counter be read first, followed by the upper word. This is because the lower and upper words of the counter are cleared on a word basis, when they are individually read, not when both words have been read.

The second method for reading the statistics counters takes a snapshot of all the counters at the same time and will cause them to be automatically cleared after they are read. This method involves freezing the counters using the Receive PTP command STATS with the Freeze attribute, reading the counters, and then unfreezing them using the Receive PTP command STATS with the Unfreeze attribute. Alternatively, the Freeze Statistics bit in the Data Configuration Register can be used to freeze and unfreeze the counters. Freezing the counters prevents them from incrementing which prevents them from counting network events.

After all the counters have been read (that need to be read), it would be necessary to unfreeze the counters in order to start collecting network statistics again. Unfreezing the counters will clear all counters, even the ones that have not been read. Therefore, if the user does not want any information to be lost on any particular counter and the counters have been frozen, the user must read that particular counter before unfreezing the counters.

The main difference between freezing the counters and not is that freezing them allows a snapshot of all the counters to be taken at the same time. Each counter is frozen at the same time, and hence, the counters stopped incrementing at the same time. This allows time sensitive statistics gathering to be done and makes it possible to combine different statistic counters to obtain different information with 100% accuracy. This accuracy is, however, at the expense of losing information while the counters are frozen. Freezing the counters is really meant for a stop watch type of network statistic gathering where it is desired to gather 100% accurate statistics during a given period of time.

When the counters are read without freezing them, it is not possible to gain 100% accuracy when combining the information from one counter to another because between reading the two counters, one or both of them may have incremented. If this happens, then the combination of the two counters is in error by a single event.

It is not possible change any of the counters by writing to them. Hence, they cannot be loaded with a specific value and the only way to clear them, aside from software or hardware reset, is to unfreeze them or read them while unfrozen.

Receive Network Statistics Counters

The Receive Network Statistics Counters collect all statistics that pertain to network data. Before the receive statistics counters can be explained, some clarification of the meaning of certain network occurrences must be made.

Error Conditions and Packet Rejection

There are several situations that can cause an error, or rejection of a packet being received from the network. These errors are listed below with a definition of the error and how it applies to the SCENIC.

Runt—A packet that is received with a length less than 64 bytes. This includes all bytes received after the Start of Frame Delimiter is received. The SCENIC can be configured to reject or accept run packets. In any case, if at least one byte is not received (8 bits), the packet will always be rejected.

Collision—Any packet that is received in which a collision has occurred. Collisions commonly cause run packets and CRC (CRCE) or Frame Alignment (FAE) errors (see below). The SCENIC can be configured to accept packets with a collision accepting packets with CRCE and FAE.

Frame Check Sequence Error (CRCE)—A Frame Check Sequence Error, or CRC Error, occurs whenever the FCS field of the received packet does not match the CRC value calculated by the SCENIC. Regardless of whether an FCS field was received, the last 4 bytes received will be considered to be the FCS field for the sake of checking for this error. The SCENIC can be configured to accept packets with a CRCE.

Frame Alignment Error (FAE)—A FAE is a CRCE, but only when the total number of bits received is not on an 8 bit boundary. A Frame Alignment error overrides a CRC error. In other words, if a FAE occurs, no CRCE indication is given because an FAE is a CRCE. If packets with CRC errors are being accepted, the packets with Frame Alignment errors will also be accepted, the packets with Frame Alignment errors will also be accepted. In all cases of the LME, MIB and RMON statistics, if a FAE is counted, a CRCE is not counted.

Jabber—Jabber packets are packets received that exceed a length of 1518 bytes. These packets can be rejected automatically by the SCENIC, or passed to be buffered.

CAM Reject—This is not actually an error, but a condition of the packet. Depending on what modes are enabled in the CAM, a packet can be rejected or accepted based on its destination address. The destination address can be a physical (or individual) address, a multicast or a broadcast address. All three of these conditions can be rejected or accepted individually. It is important to note if the CAM is enabled to reject any kind of packet, the statistics counters will only gather information on the packets that are not rejected. For these counters, if it is desired to collect statistics on all packets received, it will be necessary to disable all rejects by the CAM. Status bits in the receive status register, however, will still allow the software to reject packets based on the destination address without the driver software matching the 48 bit destination address.

Invalid Length Field—This is not actually an error, but a situation that may occur often depending on the particular network protocol being used (i.e., TCP/IP, IPX, Appletalk, etc.). The Two byte field just following the source address of a packet is called the Type/Length field. When used as a Type field, this 2 byte quantity represents the type of protocol the packet is following. When used as a Length field, the total length of the Data field of the packet (excluding padding) is shown by this 2 byte quantity. There are two optional IEEE LME statistics that deal with an invalid Length Field. The SCENIC performs no action based on the Length field. It is listed here because an Invalid Length Field does have an affect on the IEEE LME statistics.

IEEE LME Statistics vs. MIB and RMON Statistics

The seven different error conditions listed in the previous section can be broken down into four different kinds of errors.

1) Packet Length errors which include Runt and Jabber packets.

2) Frame Check Sequence errors which include CRCE, FAE and Collision errors.

3) CAM errors or simply CAM mismatches.

4) Invalid Length Field errors.

All receive IEEE LME statistics are incremented based on a packet that is at least 64 bytes in length and that has not been rejected by the CAM. This is because according to the IEEE Layer Management specification for receptions, if a collision occurs during the first 64 bytes (following the Start of Frame Delimiter), the packet will be a runt packet and all runt packets are automatically rejected. Hence, a runt packet conditions supersedes all other LME statistics and is not recorded by any IEE LME counter. The same is true for any packet that is rejected for not meeting the necessary SCENIC rejects due to a CAM mismatch. Note that this means that if the SCENIC is set up to receive all packets (the CAM is disabled), then the IEEE LME statistics will be taken with respect to all packets that are not runt, regardless of the destination address.

The MIB and RMON statistics deal with errors in a different way than the IEEE LME statistics do. All of the MIB and RMON statistics are broken down into packets with errors and packets without errors where errors means Frame Check Sequence errors as listed above. Secondly, MIB and RMON deal with statistics in terms of packet length. This means run, jabber and legal sized packets. MIB and RMON do not deal specifically with CAM matching or invalid Length Field errors in terms of receive statistics and errors. Hence, MIB and RMON are merely concerned with Frame Check Sequence errors and Packet Length errors.

Because IEEE LME says that statistics are not gathered on packets that are rejected due to the CAM and because the MIB specification does not specify if the CAM plays a part in the receive statistics or not, all statistics gathered will be on packets that have not been rejected by the CAM. Hence, if it is desired to gather statistics on all packets on the network, it will be necessary to enable reception of all physical, broadcast and multicast packets. this will also be necessary because the SCENIC does not collect all the statistics required by IEEE LME, MIB and RMON. The SCENIC only collects statistics on packets that, generally, have errors. All other "good" packets and/or their status are passed up to the driver software or the BI and it is expected that the statistics for "good" packets can be derived from the packet data or the returned status.

Since the receive statistics returned with each packet includes CAM matching information, it will still be possible to enable reception of all packet address types and still reject certain packets (packets that would have not matched the CAM) by looking at the status instead of matching a 48 bit address.

Transmit Network Statistics Counters

IEEE LME and MIB have statistics which deal with both transmit and receive packets. RMON does not, however, normally deal with transmit packets since RMON is based on a network monitor which would not normally transmit packets. Since the SCENIC is likely to be used in designs where it is not only monitoring the network, but participating in transmissions, it will become necessary to collect transmit statistics for RMON. When these transmit statistics are collected, they must be treated as if they were a receive statistic though. This is because RMON deals with what it sees on the network, not what it did to the network.

The transmit statistics collected by the SCENIC are similar to the receive statistics collected. This means that anytime an event occurs that cannot be passed back to the system software or the BI by transmit status, that event must be counted in a counter.

For the case of IEEE LME and MIB, there are specific transmit statistics counters supplied to allow the SCENIC to be compliant with these specifications. For the case of RMON, the transmit counters, when added to the information obtained in the receive counters will allow the SCENIC to be compliant also.

Subjects of counters are used by the SCENIC to obtain full LME, RMON and MIB II statistics. By reading the counters, and combining the real values with information obtained from the SCENIC's transmit and receive status, the IEEE LME Statistics Group and the MIB II Interface Group statistics can all be created. Hence, a small subset of the I/ME, MIB and RMON counters is designed in hardware and allows the entire LME, MIB and RMON standards to be supported. This saves silicon space on the SCENIC die.

BUS INTERFACE CHIP REQUIREMENTS

One main purpose of the NCDI bus is to allow multiple network controllers to be interfaced to a common or proprietary system bus using a BI chip. The function of the BI chip is two fold. First, it makes the necessary conversion from the NCDI bus to the system bus and second, the BI represents the means by which network data is moved to and from the system bus for the sake of the NCDI bus. This second function can be accomplished in many ways and the actual method used does not depend on the SCENIC. The method used can be as complicated as a full bus master interface where the BI reads and writes directly to system RAM, or as simple as a data port scheme where the system processor, through software or a remote DMA request, reads or writes the data to and from a register port (similar to how the SCENIC works).

The requirements of the BI chip with respect to the SCENIC are that it must support the NCDI bus, it must understand and support the NCDI PTP command structure, it must supply certain registers that the SCENIC will need to read and write and it must support a memory or FIFO structure to take network data from and give network data to the SCENIC. Each of these requirements are discussed below.

A. BI NCDI BUS Support

Aside from supporting functional equivalents of the SCENIC signals, there are a few NCDI Bus support issues that the BI must handle differently.

All the NCDI bus signals described in the SCENIC pin description must be supported. This includes the Data and parity signals, NCDI control signals such as D/C and BVALID and bus request signals. The function of some of these signals are different, however, for the BI.

The NCDI Device Identifier pins, ID<3:0>, for the SCENIC are driven by the SCENIC to tell the BI which SCENIC is accessing the BI. The BI uses ID<3:0> as a chip select, however, to select the particular SCENIC that it would like to communicate with. The $\overline{CS}$ signal is used by the SCENIC to chip select the BI.

The $\overline{RESET}$ signal on the NCDI bus can come directly from the main system bus hardware reset signal, or it can be a secondary reset signal that is controlled by the BI.

Since the SCENIC is most often either pulling data out of the BI, or writing data to the BI, the BI may need to support the $\overline{BAT}$ signal. This signal will allow the BI to have a little more control over when the SCENIC attempts to access it.

B. Register Requirements of the BI

The BI will most likely have two sets of registers. Those registers that are accessible by the system bus and those that are accessible by the NCDI bus. Some will be accessible by both busses. It does not mater if all the BI registers are accessible by both busses, but it is important that a few registers in the BI be accessible at certain addresses on the NCDI bus.

The registers that are required in the BI and the necessary addresses for these registers are listed below. Only a quick list of the registers is given. For a complete understanding of the purpose of these registers, see the equivalent SCENIC register or the section of this document that describes that function.

BI Interrupt Status Register

The lower 8 bit address of this BI register should be programmed in the Bus Interface Register Offset (BIIRO) register on the SCENIC. The default for this register is 0008h.

This is a register that will be written to by the SCENIC whenever an interrupt occurs in the SCENIC interrupt Status Register. If the interrupt is not masked in the SCENIC Interrupt Mask Register, then the SCENIC will acquire the bus and write the entire interrupt Status Register into the BI Interrupt Status Register. Note that the BI's Interrupt Status Register should only allow the SCENIC to write 1's to it. When the SCENIC writes a 0 to this register, it should have no effect. It is the job of the BI to clear the interrupt (set to 0) in its own register after the interrupt condition has been dealt with.

BI Transmit Network Pork

The lower 8 bit address of this BI register should be programmed to the Bus Interrupt Transmit Network Port Offset (TXNPO) register on the SCENIC. The default for this register is 0000h.

This register is the counterpart to the SCENIC transmit Network Port (TXNP). All transmit data will be read from the BI by the SCENIC, after receiving a SOF PTP command from the BI at this register port. Any Transmit PTP commands from the SCENIC to the BI will be written to this port also.

BI Transmit Status Register

The lower 8 bit address of this BI register should be 2h greater than the address of the BI Transmit Network Port. This address would be equal to TXNPO+2h. Hence, the default for this register is 0002h.

This is the status register that the SCENIC will write transmit status into after a transmit has been completed. The status that is written into this register is the same bit pattern as in the SCENIC transmit Status Register (TXSR).

BI Receive Network Port

The lower 8 bit address of this BI register should be programmed in the Bus Interface Receive Network Port Offset (RXNPO) register on the SCENIC. The default for this register is 0004h.

This register is the counterpart to the SCENIC Receive Network Port (RXNP). All received network data from the SCENIC will be written into this port. ANy receive PRP commands from SCENIC will be written into this port also.

BI Receive Status Register

The lower 8 bit address of this BI register should be 2h greater than the address of the BI Receive Network Port. This address would be equal to RXNPO+2h. Hence, the default for this register is 0006h.

This is the status register that the SCENIC will write receive status into after a reception has been completed. The status that is written into this register is the same bit pattern as in the SCENIC Receive Status Register (RXSR).

C. BI Support of the PTP

The BI chip uses the SCENIC Transmit Network Port and the Receive Network port to send PTP commands to the SCENIC. These ports work the same as the BI Transmit Network Port and the BI Receive Network Port, as described above. The SCENIC uses the BI Transmit Network Port and the BI Receive Network Port to send PTP commands to the BI. FIGS. 20 and 22 explain the PTP commands and how the BI and SCENIC uses each PTP command.

Since all network data is either read from the BI Transmit Network Port or written to the BI Receive Network Port, the only data that the BI will write to the SCENIC's Transmit and Receive Network Ports are PTP commands.

D. BI FIFOs and Support for Multiple SCENICs

Since the BI chip will have to receive and send network data from and to the SCENIC, it follows that the BI will need to have some kind of FIFO or memory system to temporarily hold that data while it is being moved to and from the main system memory. More specifically, it will be necessary to have separate FIFOs or memory systems for each SCENIC supported by the BI. This is one of the main purposes for the ID<3:0> signals on the NCDI bus. These signals inform the BI which FIFO to use when a SCENIC is accessing the BI to transfer network data or PTP commands.

The size or structure of the BI FIFOs is implementation specific, but the main design goal of the FIFOs should be to make sure that the SCENIC FIFOs never overflow or underflow. The BI FIFOs must be able to soak up the needs of the SCENIC. It may not be necessary to use FIFOs in the BI as long as this basic requirement is met or if it is decided that the requirement is not important. Note, however, that not meeting this requirement will significantly affect the SCENIC's performance since the SCENIC is optimized for a situation where its FIFOs should never overflow or underflow.

How the FIFOs are accessed by the main system bus is implementation specific, but for the NCDI bus, the receive and transmit FIFOs on the BI are accessed through the BI Transmit Network Port and the BI Receive Network Port. The SCENIC only requires that it may read consecutive words from the BI's transmit FIFO by reading the BI Transmit Network Port and write consecutive words to the BI's receive FIFO by writing the BI Receive Network Port.

Because of the need for one set of BI FIFOs for each SCENIC on the NCDI bus, it follows that the BI Transmit Network Port and the BI Receive Network Port must be able to mux data to and from the correct FIFO depending on which SCENIC is accessing the BI. This muxing is done by using the NCDI Device Identifier signals, ID<3:0>, to determine which SCENIC is currently accessing the BI.

It will also be necessary to keep the returned status from different SCENIC separate. Again the ID<3:0> signals would be monitored whenever a SCENIC is writing to the BI Transmit Status Register or the BI Receive Status Register. The signals can be used to mux the status into some form of holding register, or they could be used to address physically different status registers. How this is done is an architectural issue and does not matter the SCENIC.

Finally, it will be necessary to use the ID<3:0> signals to separate the interrupt status form each SCENIC when it is written into the BI Interrupt Status Register. Again, muxing could be used, or physically separate registers could be used.

Effectively, the ID<3:0> signals create up to 16 separate NCDI address spaces such that each SCENIC or other NCDI bus master can access the same register addresses, but only need to drive different identifier number on ID<3:0>.

NETWORK INTERFACING

The TEMPL block consists of an Encoder/Decoder (ENDEC) and Twisted Par Interface (TPI) function. TEMPL connects between the MAC block and the outside network. The network connections provided are twisted pair and AUI. The AUI interface can be attached to any IEEE compliant Medium Attachment Unit (MAU) such as 10BASE2, 10BASE5, 10BASE-T, and 10BASE-F transceivers. The internal Encoder/Decoder (ENDEC) provides the interface between the MAC unit and either the TPI module or the AUI interface. The internal ENDEC can be disabled by the user by setting bit 15 in the Network Interface Configuration Register, so that an external ENDEC can be connected to the SCENIC through the external ENDEC pins described in section 2.0.

Additional information regarding the TEMP block may be obtained by reference to the following five co-pending applications, each of which is commonly assigned herewith to National Semiconductor Corporation:

U.S. Ser. No. 08/113,382, filed Aug. 27, 1993, by Prasun K. Paul;

U.S. Ser. No. 07/995,193, filed Dec. 22, 1992, by Pava K. Segaram et al;

U.S. Ser. No. 07/994,660, filed Dec. 22, 1992, by Pava K. Segaram;

U.S. Ser. No. 07/995,598, filed Dec. 22, 1992, by Prasun K. Paul; and

U.S. Ser. No. 08/133,900, filed Oct. 7, 1993, by Pava K. Segaram.

Each of these applications is hereby incorporated by reference to provide additional background information regarding the present invention.

A. ENDEC/AUI Functional Description

An external oscillator module is needed to generate the 10 MHz transmit Clock. A 20 MHz oscillator must be used. A clock oscillator module with the following specification is recommended to be used with the SCENIC.

Figure 26:
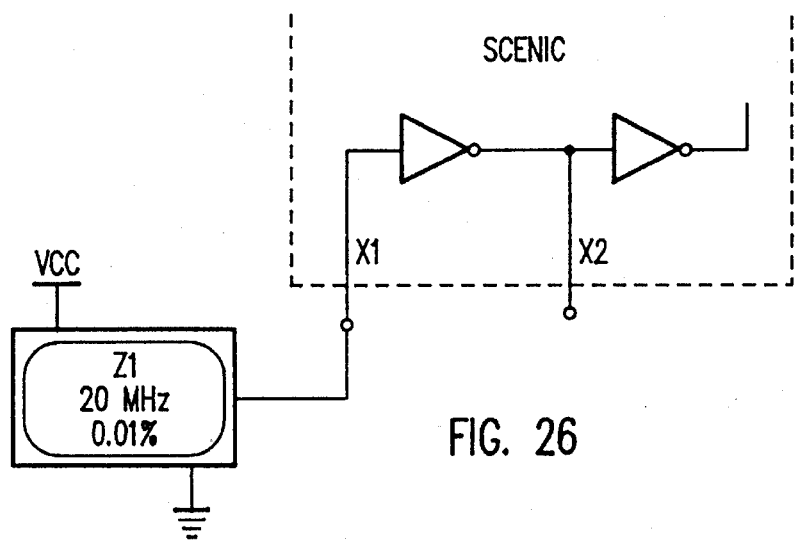
FIG. 26 is a block diagram illustrating a connection for an oscillator module.

1) TTL or CMOS output with a 0.01% frequency tolerance
2) 40–60% duty cycle
3) $\geq 2$ TTL load output drive The oscillator clock module would be connected to the ID<3:0> as shown in FIG. 26. Note that additional output drive may be necessary if the oscillator must also drive other components. When using a clock oscillator it is recommended that the designer connect the oscillator output to the X1 pin and leave X2 pin floating.

Manchester Encoder And Oscillator Module

Figure 27:
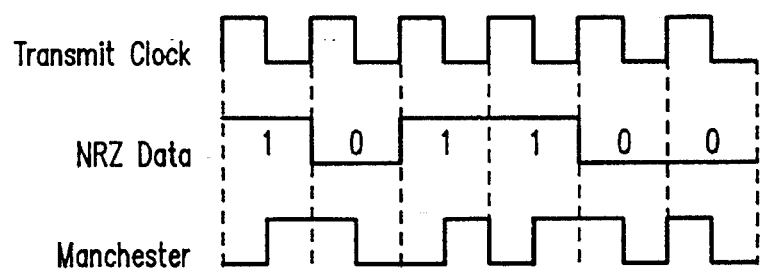
FIG. 27 is a timing diagram illustrating a Manchester encoded data stream.

The ENDEC unit's encoder begins operation when the MAC section begins sending the serial data stream. It converts NRZ data from the MAC section to MAnchester data for the differential drivers (TX+/−). In Manchester encoding, the first half of the bit cell contains the complementary data and the second half contains the true data (FIG. 27). A transition always occurs at the middle of the bit cell. As long as the MAC continues sending data, the ENDEC section remains in operation. At the end of transmission, the last transition is always positive, occurring at the center of the bit cell if the last bit is a one, or at the end of the bit cell if the last bit is a zero.

The differential transmit pair can drive up to 50 meters of twisted pair AUI cable. These outputs are source followers which require two 270Ω pull-down resistors to ground. In addition, an isolation transformer is required between the transmit pair output and the AUI interface.

Manchester Decoder

The decoder consists of a differential receiver and a phase lock loop (PLl) to separate the Manchester encoded data stream into clock signals and NRZ data. The differential input must be externally terminated with two 39Ω resistors connected in series. In addition, an isolation transformer is required between the receive input pair and the AUI interface.

To prevent noise from falsely triggering the decoder, a squelch circuit at the input rejects signals with a magnitude less than −175 mV. Signals more negative than −300 mV are decoded. Once the input exceeds the squelch requirements, Carrier Sense (CRS) is asserted.

The decoder detects the end of a frame when no more mid-bit transitions are detected. Within one and a half bit times after the last bit, carrier sense is de-asserted. Receive clock stays active for five more bit times after CRS goes low to guarantee the receive timings of the controller.

Collision Translator

When the Ethernet transceiver (internal TPI or the DP8392 CTI, for example) detects a collision, it generates a 10 MHz signal to the differential collision inputs (CD+ and CD−) of the SCENIC. When SCENIC detects these inputs active, its Collision translator converts the 10 MHz signal to an active collision signal to the MAC section. This signal causes SCENIC to about its current transmission and reschedule another transmission attempt.

The collision differential inputs are terminated the same way as the differential receive inputs and a pulse transformer is required between the collision input pair and the AUI interface. The squelch circuitry is also similar, rejecting pulses with magnitudes less than −175 mV.

B. Twisted Pair Interface (TPI) Functional Description

The following sections describe the major functions of the integrated TPI transceiver internal to the SCENIC. The TPI transceiver is fully IEEE compliant and includes the receiver, transmitter, collision, heartbeat, loopback, jabber, and link integrity functions, as defined in the standard. There is no need for an external filter on the 10BASE-T interface as mention above, since this is integrated internally.

Smart Squelch

The Smart Squelch is responsible for determining when valid data is present on the differential receive inputs (RXI±). The TIP implements an intelligent receive squelch on the RXI± differential inputs to ensure that impulse noise on the receive inputs will not be mistaken for a validity of data on the twisted pair inputs.

Figure 28:
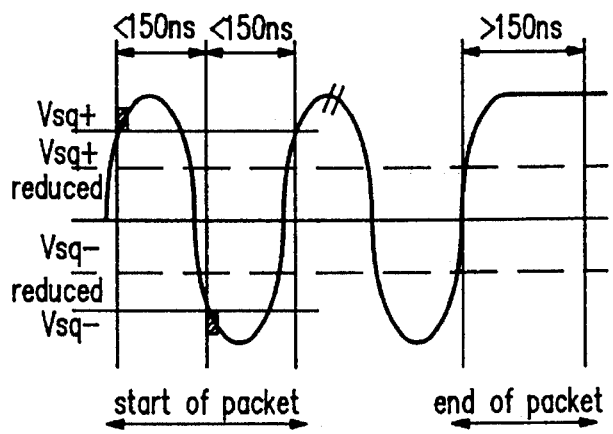
FIG. 28 is a graphic representation of a TPI squelch operation.

FIG. 28 shows the operation of the smart quelch.

The signal at the start of packet is checked by the smart squelch and any pulses not exceeding the squelch level (either positive or negative, depending upon polarity) will be rejected. Once this first squelch level is overcome correctly the opposite squelch level must then be exceeded within 150 ns. Finally the signal must exceed the original squelch level within a further 150 ns to ensure that the input waveform will not be rejected. The checking procedure results in the loss of typically three bits at the beginning of each packet.

Only after all these conditions have been satisfied will a control signal be generated to indicate to the remainder of the circuitry that valid data is present. At this time, the smart squelch circuitry is reset.

Collision

A collision is detected on the TPI cable when the receive and transmit channels are active simultaneously. If the ENDEC is receiving when a collision is detected it is reported to the MAC block immediately (through the COL signal). If, however, the ENDEC is transmitting when a collision is detected the collision is not reported until seven bits have been received while in the collision state. This prevents a collision being reported incorrectly due to noise on the network. The COL signal remains for the duration of the collision.

Approximately 1 μsec after the transmission of each packet a signal called the Signal Quality Error (SQE) consisting of typically 10 cycles of a 10 MHz signal is generated by the TPI transceiver onto the internal AUI CD± signals. This 10 MHz signal, also called the Heartbeat, ensures the continued functioning of the collision circuitry. The SQE signal shows up on the COL signal as a pulse.

Link Detector/Generator

The link generator is a timer circuit that generates a link pulse as defined by the 10 Base-T specification that will be generated by the transmitter section. The pulse which is 100 ns wide is transmitted on the transmit output, every 16 ms, in the absence of transmit data. The pulse is used to check the integrity of the connection to the remote MAU. The link detection circuit checks for valid pulses form the remote MAU and if valid link pulses are not received the link detector will disable the twisted pair transmitter, receiver and collision detection functions.

The LNKLED output can directly drive an LED to show that there is a good twisted pair link. For normal twisted pair operation, the LNKLED will be on. The link integrity function can be disabled. When disabled, the transceiver will operate regardless of the presence of link pulses.

Jabber Time-Out

The Jabber function disables the transmitter if it attempts to transmit a longer than legal sized packet. The jabber timer monitors the transmitter and disables the transmission if the transmitter is active for greater than 26 ms. The transmitter is then disabled for the whole time that the ENDEC module's internal transmit enable is asserted. This signal has to be deserted for approximately 750 ms (the unjab time) before the Jabber re-enables the transmit outputs.

The Jabber function can be enabled or disabled by the JBEN bit.

Transmit Driver

The transmitter consists of four signals, a Manchester encoded data pair for unshielded twisted pair (TXU±) and a Manchester encoded data pair for shielded twisted pair (TXU±).

The UTP/STP pin selects either the unshielded twisted pair or the shielded twisted pair driver. The SCENIC can be designed to work with both types of cable. See the example provided in FIG. 29.

Status Information

Status information is provided by the TPI on the $\overline{\text{TXLED}}$, $\overline{\text{RXLED}}$, $\overline{\text{COLLED}}$, $\overline{\text{POLLED}}$ and $\overline{\text{INKLED}}$ outputs. These outputs are suitable for driving status LEDs. These active low signals are open drain outputs. The LED is connected to the signal using a resistor connected to $V_{cc}$ and the LED connected to the signal.

Automatic Polarity Detection

The $\overline{\text{POLLED}}$ output is normally high, and will be driven low when seven consecutive link pulses or three consecutive receive packets are detected with reversed polarity. A polarity reversal can be caused by a wiring error at either end of the TPI cable. On detection of a polarity reversal the condition is latched and $\overline{\text{POLLED}}$ is asserted. The transceiver corrects for this error internally and will decode received data correctly eliminating the need to correct the wiring error immediately.

Transceiver Loopback Function

When Transceiver loopback is programmed, the TPI redirects its transmitted data back into its receive path. The transit driver and receive input circuitry are disabled in transceiver loopback mode, hence, the transceiver is isolated from the network cable. This allows for diagnostic testing of the data path all the way up to the transceiver without transmitting or being interrupted by the media. This test can be performed regardless of the link status (i.e., a TPI cable does not have to be connected to perform transceiver loopback).

Traffic Ignore Mode

When the Traffic Ignore mode is enabled, the ENDEC and TPI will disable the collision function and allow transmission and reception at the same time through the twisted pair transmit and receive pairs respectively. The normal transceiver loopback function is disabled since it is not used in full duplex mode transmission.

UTP/STP Select Function

Figure 29:
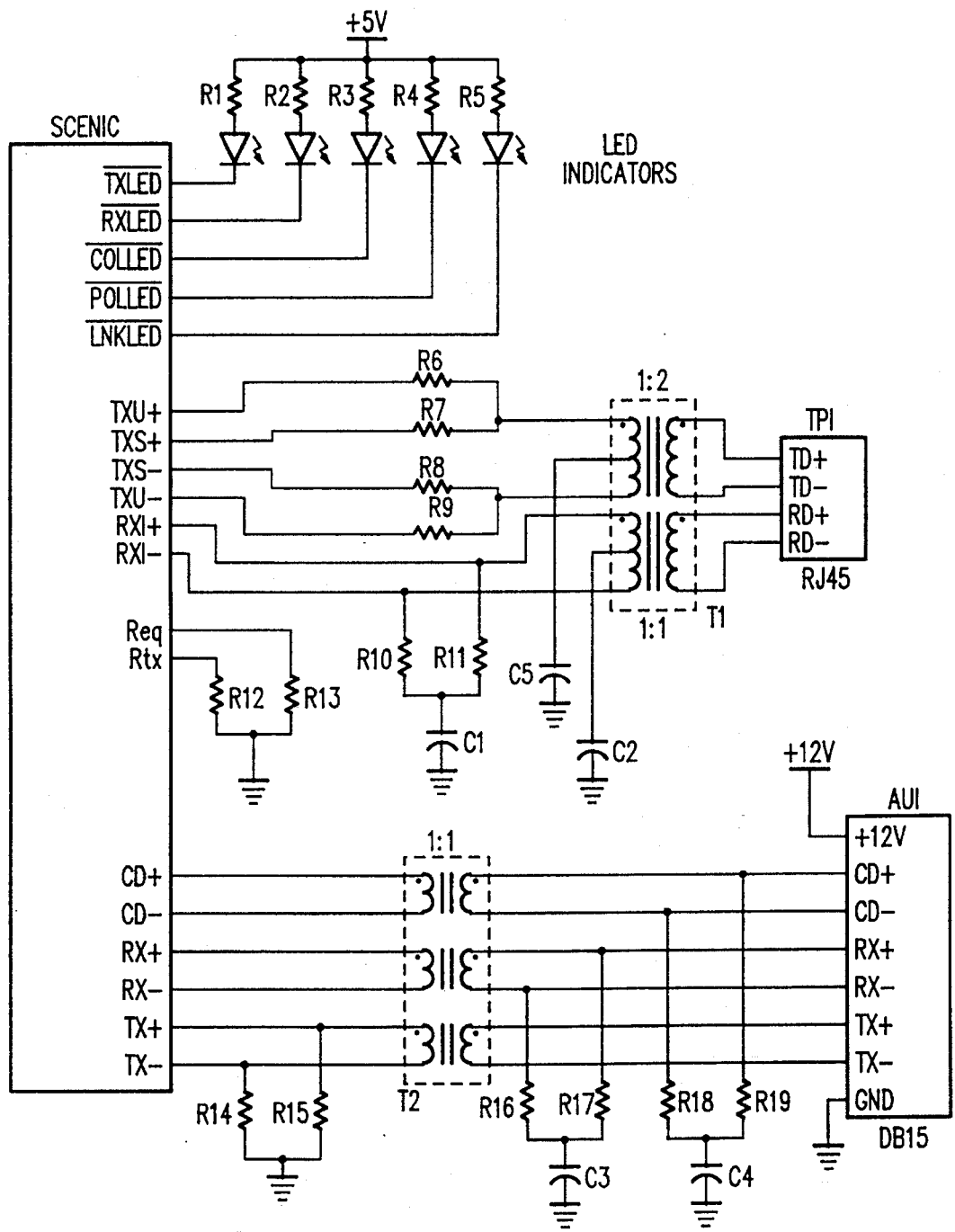
FIG. 29 is a schematic diagram illustrating an example of a network connection diagram for a configurable network interface controller in accordance with the present invention.
Figure 49:
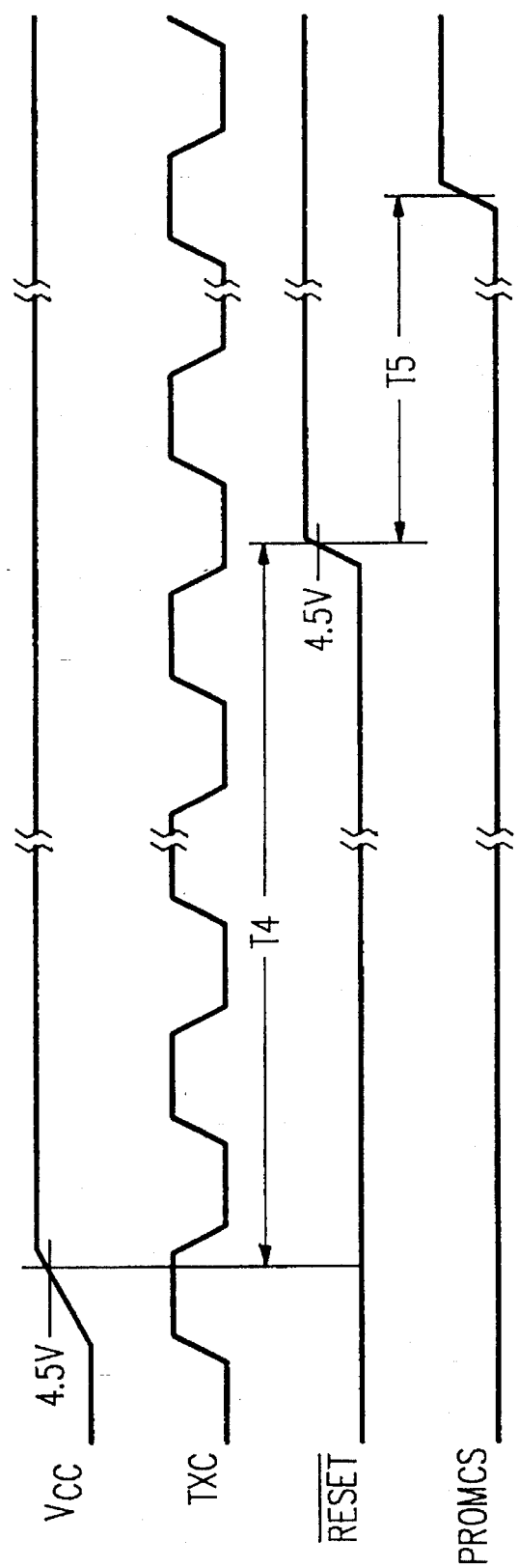
FIG. 49 Is a timing diagram illustrating the power on reset operation for the SCENIC device.
Figure 51A:
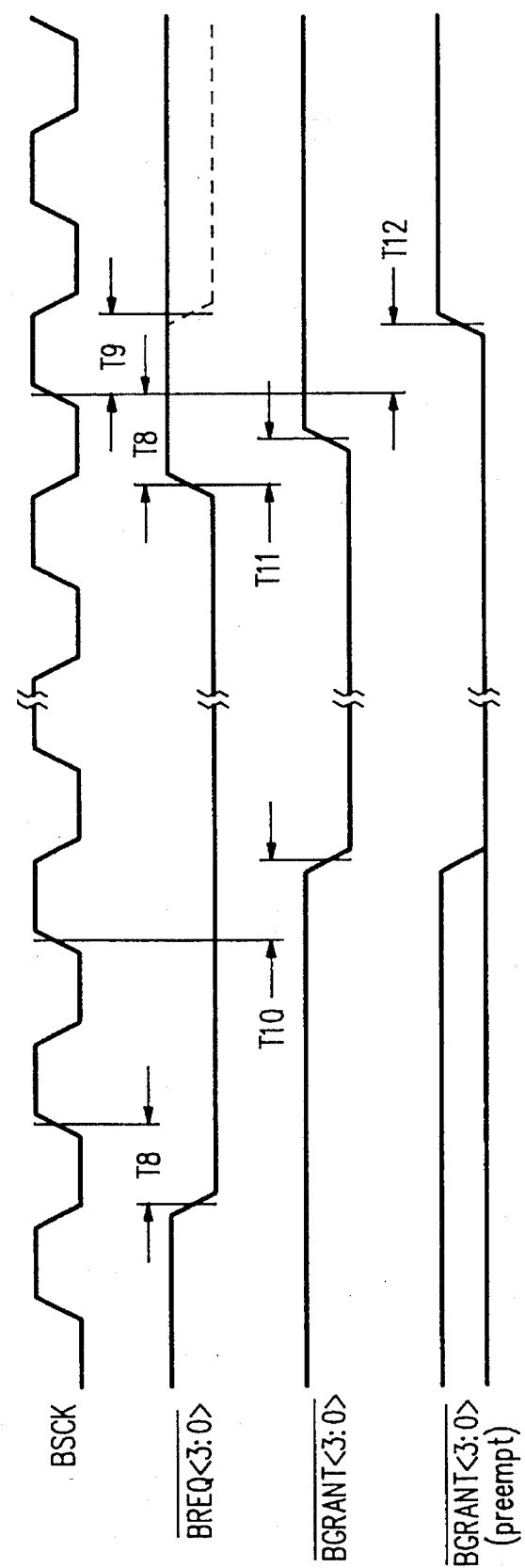
FIG. 51 is a timing diagram illustrating bus arbiter timing for the SCENIC device.
Figure 52A:
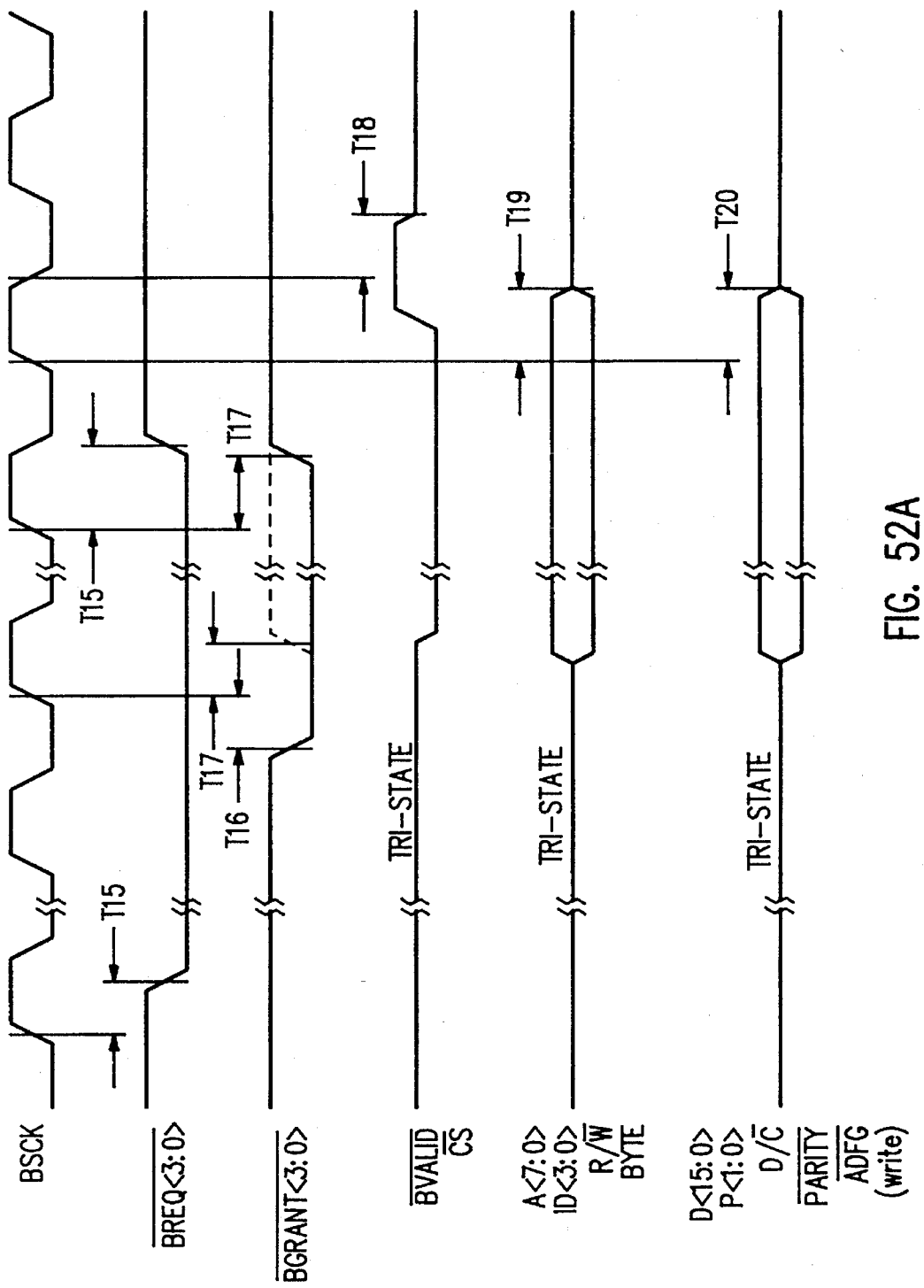
FIG. 52 is a timing diagram illustrating bus request timing for the SCENIC device.
Figure 53A:
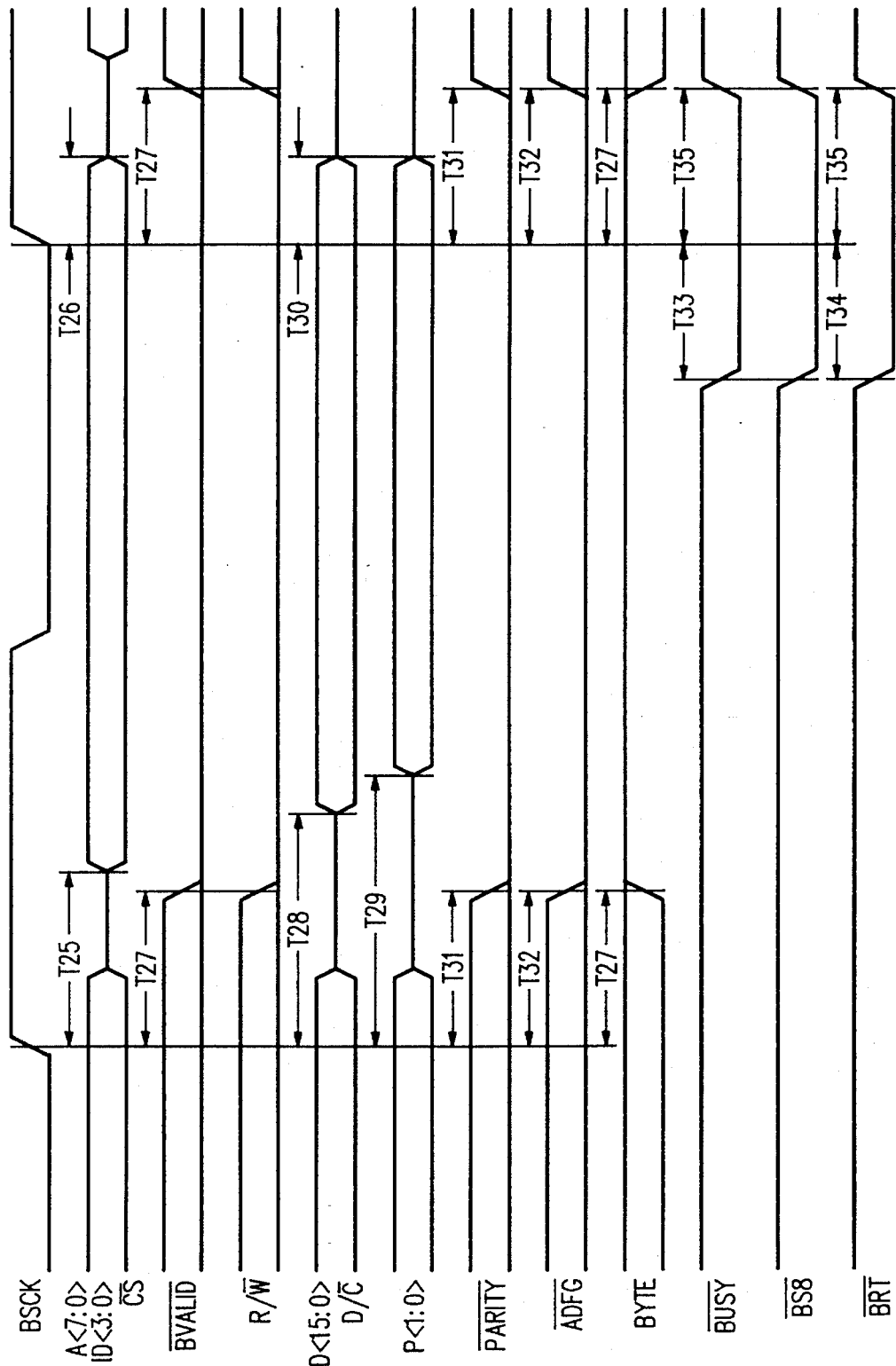
FIG. 53 Is a timing diagram illustrating a bus master write cycle for the SCENIC device.
Figure 54A:
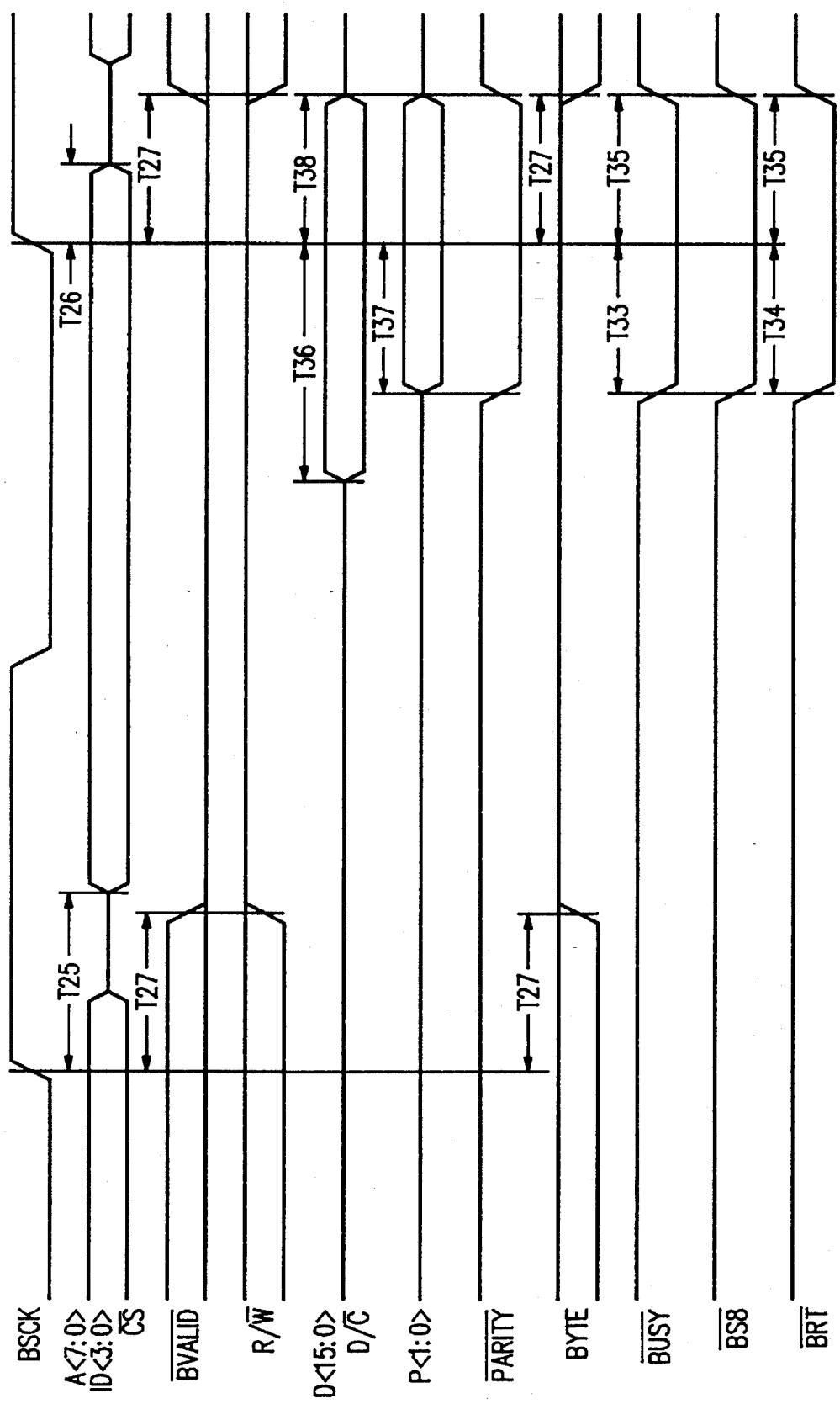
FIG. 54 is a timing diagram illustrating a bus master read cycle for the SCENIC device.
Figure 55A:
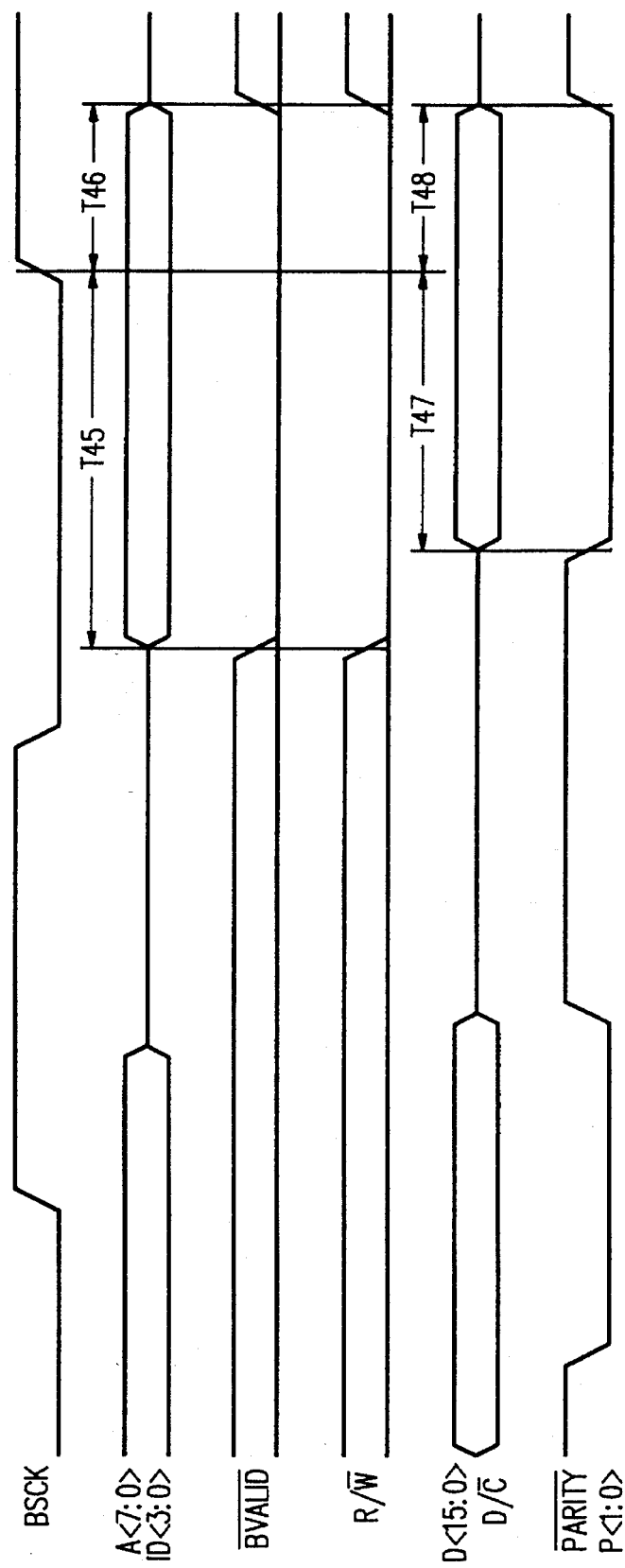
FIG. 55 is a timing diagram illustrating a slave write cycle for the SCENIC device.
Figure 56A:
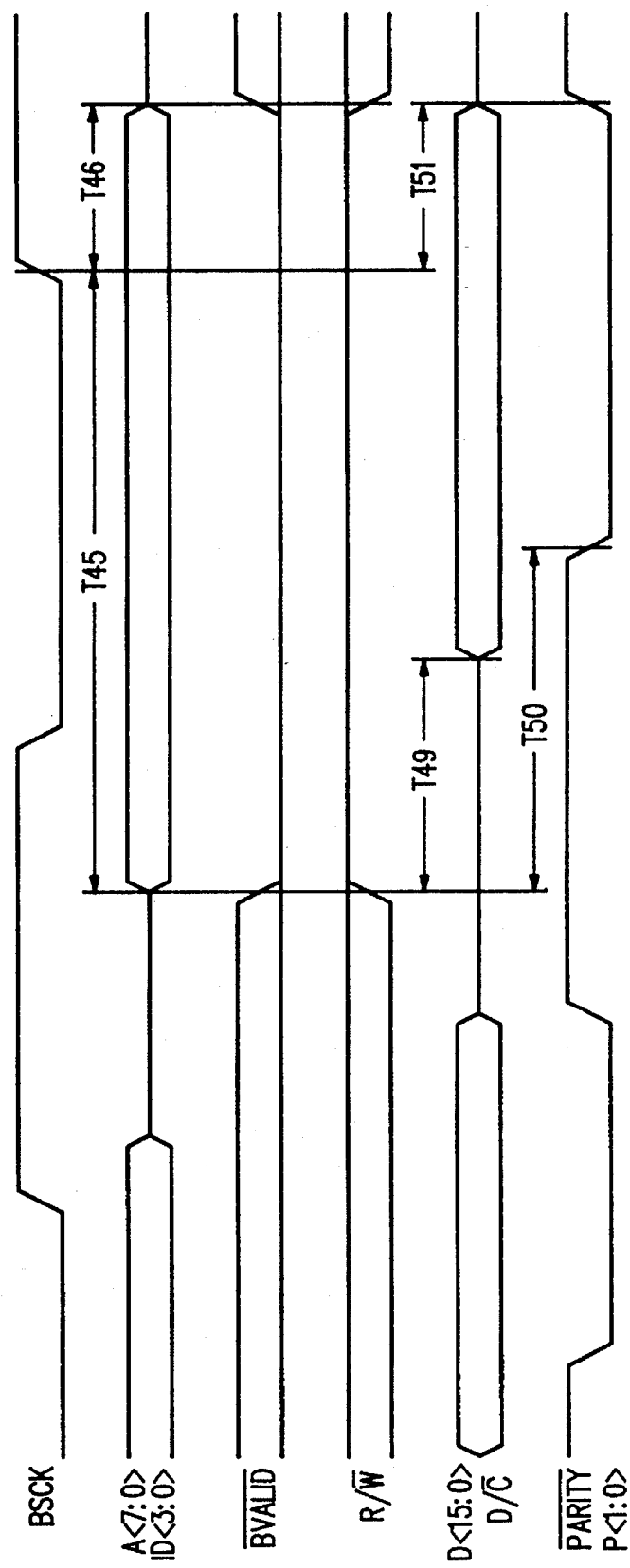
FIG. 56 is a timing diagram illustrating a slave read cycle for the SCENIC device.

The TUP transceiver supports both shielded (150Ω) and unshielded (100Ω) twisted pair cable. The support for each mode is selectable via the Media Select bit. This support is provided by two pair of transmit drivers. The TXU± drivers are for UTP and the TXS± drivers are for STP. Only one pari of drivers are active at one time, but both can be connected using a resistor arrangement as shown in FIG. 29.

Transmit Filter

There is no need for external filters on the TP interface because the filters are integrated into the TPI transceiver. Only an isolation transformer and impedance matching resistors are needed for the transmit and receive twisted pair interface. The transmit filter ensures that all the harmonics in the transmit signal are attenuated by at least 80 cB.

C. Network Interface Connection

An example of the AUI and TP interface is show in FIG. 29. This example represents the case where the AUI Interface is connected to a 15 pin D-Shell connector for an off board transceiver only. If only an on board coaxial interface (CTI) or both the CTI and AUI connections are desired, then the components used may differ. Regardless of the AUI connection configuration, the TPI configuration does not change. Similarly, the TPI configuration does not affect the AUI configuration.

The TP interface shown would be used for both Shielded (STP) and Unshielded (UTP) twisted pair cables. The TXS± signals are used for STP and the TXU± signals are used for UTP. Two pair of impedance matching resistors are shown in FIG. 29. R6 and R9 are used for UT. R7 and R8 are used for STP. The values of these resistors are defined in order to match the impedance of the twisted pari cable (100Ω for UTP, 150Ω for STP). Because of T1, the 1 to isolation transformer, two resistors are needed to match UTP and two resistors are needed to match STP. The selection of UTP or STP is made in the Network Interface configuration register. Once the selection is made, only one of the two pari of transmitting signals and impedance matching resistor are used. In a design where only one medium will be used, it is only necessary to use the resistors and signals for that cable type since the other transmitting pair is inactive.

The twisted pair receive pins, RXI±, are used for both STP and UTP in a design that only supports STP, the receive impedance matching resistors, R5 and R6, should be 75Ω each. For UTP, they should be 50Ω each. If both STP and UTP are to be supported, then a middle value of 60Ω each would be used. This provides a compromise in impedance matching for STP versus UTP.

TEST DESCRIPTION

The SCENIC contains a number of test features which provide a system level "diagnostic" capability that may be useful in diagnosing system level problems in manufactured systems. The diagnostic capability can be used at both the device and system level. The test activities will depend upon the programming of the Test Control Register (TCR) and the test pins: TE and CLKBYP.

There are two (five) main capabilities that are provided. Included in the capabilities is a modified IEEE 1149.1 implementation in that only the IO scan chain and bypass capabilities behave according to a 1149.1 implementation. The test capabilities are the following:

1) IO scan chain with a unique input, output, and test clock
2) Ability to select a "JTAG" like by pas mode instead of the IO scan chain
3) BIST for the internal receive and transmit FIFOs.
4) Boot bypass test mode.

5) Stand alone ENDEC/TPI mode for testing this block of the SCENIC separately from the rest of the chip.

A. IO Scan

The IO scan chain has the ability to do "JTAG-like" or "IEEE 1149.1-like" board level interconnectivity testing. The essence of this capability is the ability to monitor/sample input signals and to be able to force a value on the output pads. There is no upper frequency limitation on this capability, compared with a 6 MHz limit on IEEE 1149.1 operation in more detail, the following capability is provided:

1) The TE signal selects between "sample" (i.e. normal) and shift operation.
2) Clocks, power, GND, test signals, and analog signals are not included as part of the IO scan chain.
3) The control signals for bi-directionality and tri-state operations are provided via dedicated bits form the scan chain.
5) [sic 5)] When the TE pin is non-active, TDO output is in tri-state, regardless of any other operation. When the TE pin is active, normal functional outputs will be in tri-state.
6) The IO scan chain is clocked with TCLK.
7) The elements of the IO scan chain are the "normal" scan flip flops used in the rest of the device.
8) The IO scan chain does not "interact" with the internal logic, unlike IEEE 1149.1 "internal capability".

Connecting of the IO scan chain between IO scan input (TDI pin) and IO scan output (TDO) is done by setting the Enable IO Scan (EIOS) bit in the TCR register. The TE pin, when non-active, will enable parallel load operation. The operation takes place at the rising edge of TCLK and the values in the bits corresponding to the output pads will be put on those pads in this mode. When the TE pin is active, the scan/shift operation is enabled. The output signal pads will be tri-stated and the data shifted at every rising edge of TCLK. FIG. 30 lists the scan operation control.

B. Bypass Mode

The bypass capability has the ability to perform "JTAG-like" or IEEE 1149.1 scan to provide board level bypass testing. The essence of this capability is the ability to bypass the IO chain. In more detail, the following have been provided:

1) The TE signal will select between "sample" (i.e. normal) and shift operation.
2) When the TE pin is non-active, the test data output (TDO) signal will be tri-stated, regardless of any other operation.
3) The bypass register is made up of "normal" scan flip flops, as used in the rest of the device.
4) Output signal pads are tri-stated when shifting.

The bypass capability is invoked by setting the Enable Bypass Scan Chain (EBYPASS) bit in the TCR register, which has the effect of connecting the single bit bypass register between the TDI and TDO pins. The operation takes place at the rising edge of TCLK. When the TE pin is active, the scan/shift operation is enabled. The output signal pads are tri-stated and the data shifted TDI→bypass→TDO, at every rising edge of TCLK, EIOS: Register TCR, Bit 0 EBYPASS: Register TCR, Bit 1.

C. BIST

Built In Self Test (BIST) is provided to enable the testing of the receive and transmit FIFOs within the SCENIC device. The essence of this capability is to determine if there are any faults, or any marginal read/write problems in any of the on chip FIFOs. BIST should NOT be performed during normal operation, since the contents of the FIFOs being tested will be unstable.

D. BOOT Bypass (Comment) Need to add a diagram showing BSCK, ClkBypass, and RESET signal levels in order to implement BOOT Bypass.

When the SCENIC is put in BOOT bypass mode, it will not perform the normal BOOT procedure of reading and loading the EEPROM contents, as described above. The EIOS bit in the TCR will automatically be set, so the user can enable the IO scan features without having to write to the TCR register. In addition, Bit 15 in the NICB register will automatically be set, which will put the SCENIC into stand alone ENDEC/TPI mode (described below). BOOT bypass should only be used for testing purposes and is not intended for normal operation.

To put the SCENIC in this mode the user must assert the CLKBYP pin "high", at least one BSCK cycle prior to the rising edge of/RESET. The TE pin should also be set to the proper state to select the desired scan operation, since the EIOS bit will automatically be set once the SCENIC has been put into BOOT bypass mode. To put the SCENIC back to normal operation, the user should reset the chip with CLKBYP "low" at least one BSCK cycle before the rising edge of/RESET.

E. Stand Alone ENDEC/TPI

This test feature can be enabled by setting bit 15 in the NICR register through a register write, or by purring the SCENIC in BOOT bypass mode as described above. While in the stand alone ENDEC/TPI mode, the SCENIC's other internal blocks are disabled and the SCENIC functions only as an ENDEC/TPI module. TXE and TXD would become input pins. RXC, RXD, CRS, COL, and TXC would be output pins. This feature is meant only for testing purposes and is not intended for normal SCENIC operation.

SCENIC REGISTERS

This section gives complete descriptions of the SCENIC registers. The SCENIC has a 256 address register space. The SCE-NIC's 16 bit wide registers are addressed in this space at even locations. Within this space, there are user registers, test registers and network statistic registers.

A. Packet Transfer Block Register Descriptions

FIGS. 31–34 contain a listing of all the SCENIC registers. Each table lists the register name, title, section number of the register's description, if it is readable or writable and the 8 bit address of register. Note that if the register is readable and writable, there may be certain bits in the register that cannot be written to. Also, some registers are writable, but should be written to since doing so will cause improper SCENIC operation. Refer to the specific register description for more information.

The network statistics counter register table shows two addresses for each counter in the form of UU/LL. The statistics counter registers are greater than 16 bits wide and require 2 reads to get the upper and lower portion of the register. The upper portion is addressed at UU and the lower portion is addressed at LL. In cases where the register is 16 bits or less in size, on the lower address, LL is shown.

Any address not listed in FIGS. 31–34 is a reserved address and should not be written to.

B. General Register Descriptions

This section describes the general registers used in the SC OULC. There are two kinds of registers covered. The first kind are registers that support different functions with different bits. The second kind are registers whose function takes all the bits in that register.

Data Configuration Register (DCR) (A<7:0>=04h)

This register, shown in FIG. 35, contains the basic configuration needed for proper operation of the SCENIC. The most important bit in this register is the RST bit. This is the software reset bit. When set, most of the SCENIC is held in a reset state. Before the SCENIC will function, several registers must be configured. Many of these registers must not be written to unless RST is set to 1 (see the specific register descriptions for more information). After this configuration, RST can be set to 0. Then, to start transmissions and receptions, TXEN and RXEN should be set to 1 below.

When setting RST to 1, any current transmission or reception will immediately be halted and the FIFOs will be cleared. All information about the current reception or transmission will be lost, including status and statistics counter information. If it is desired to retain this information, the it is suggested that TXEN and RXEN be set to 0, and that all status from the current reception or transmission be received before setting RST to 1.

After a hardware reset, this register will be loaded with 0010 0000 0001 1100 (201Ch). After a software reset this register will be loaded with 0001x x000 00xx xx00 where x means unchanged. The BMS, FS and FT<3:0> bits should only be written to when the SCENIC is in software reset mode. A software reset will automatically set RXEN and TXEN to 0, so the only time these bits would be written to is when RST is set to 0. It is ok to set RST and change BMS, FS and FT<3:0> in one write, then clear RST and set RXEN and TXEN in the second write.

Interrupt Mask Register (IMR) (A<7:0>=06h)

This register, shown in FIG. 35 is used to mask the SCENIC from writing the Interrupt Status Register (ISR) to the BI when the corresponding interrupt in the ISR is set. If a mask bit is set to a "1" in this register, then when the associated interrupt in the ISR is set, the SCENIC will request the bus and write the ISR to the BI. If a bit is set to "0" in this register, then if the interrupt is set in the ISR, the SCENIC will not request the bus and will not attempt to write the ISR to the BI.

After a hardware reset, this register will be loaded with 0000h. After a software reset, this register will be unchanged.

Interrupt Status Register (ISR) (A<7:0>=08h, read only)

This register, shown in FIG. 37, will reflect any interrupts which have occurred on the SCENIC. When one of the interrupt conditions described below occurs, that bit will be set. When one or more ISR bits are set, and if the corresponding mask bit is set (indicating the interrupt bit is not to be masked) in the Interrupt Mask Register (IMR), the SCENIC interrupt Handler will request the bus so that the BI chip can be told about the interrupts. When the bus has been granted to the Interrupt Handler, the SCENIC will write the contents of the ISR to the BI's Interrupt Status Register. Once the BI chip learns of the interrupt, responsibility of notifying the system software or acting upon the interrupt rests on the BI chip. All bits in the ISR will be cleared after being written to the BI.

Note that if two bits in the ISR are set, for example, and one of the bits is masked in the IMR, the unmasked bit will cause the SCENIC to write the ISR to the BI. In doing so, both bits will be written, not just the unmasked bit. Hence, masking a bit only prevents the SCENIC from immediately writing that bit to the BI.

After a hardware or software reset, this register will be loaded with 0000h. Because a software reset may cause an interrupt to be lost by the clearing of this register, it is suggested that the receiver and transmitter be disabled, and the current reception or transmission be allowed to complete, including possible changes to this register, before setting the RST bit in the DCR.

EEPROM Configuration Register (EPCR) (A<7:0>=0Ah)

This register, shown in FIG. 38, will contain the first 16 bits pulled out of the BOOT EEPROM. These bits set up certain operational modes of the SCENIC. The main configuration bits are the ID bits and the Arbiter Select bit. These bits are important for multi-device operation on the NCDI bus.

This register was set up such that if an external EEPROM is not used, and the PROMDO pin on the SCENIC is tied high, all bits in this register will be set to 1. This puts the SCENIC in a default mode that will allow it to operate on an NCDI bus by itself with a single BI chip. An affect of this is that all reserved bits must be written as a 1, not a 0, which is the case for all other registers on the SCENIC.

After a hardware reset, but before the EEPROM is read and loaded into this register, this register will be set to FFFFh. After a software reset, this register will be left unchanged. This register should not be changed after an EEPROM load since doing so may render the SCENIC non-functional.

Network Interface Configuration Register (NICR) (A<7:0>=0Ch)

This register, shown in FIG. 39, contains the configuration settings for the internal ENDEC and twisted pair transceiver.

After a hardware reset, this register will be loaded with 0011 0001 0000 0000 (3100h). After a software reset, this register will be left unchanged. This register should only be written when the SCENIC is in software reset mode. This register should only be changed when the SCENIC is in software reset mode.

Transmit Network Status Register (TXSR) (A<7:0>=14h, read only)

This register, shown in FIG. 40, contains transmit status generated at the end of a transmission. As defined by the Transmit Packet Transfer Protocol, the contents of this register will be sent back to the supporting BI chip's transmit status register following each transmission. This register would not normally be read directly by the BI chip. If this register is read, the state of the bits are meaningless because they may change at any time. This register description is provided mainly for information purposes. For more information about transmit errors and this register, see Section 4.4.1.3, Transmit Error Indications.

After a hardware reset, this register will be loaded with 0000h. After a software reset, this register will be left unchanged.

Transmit Configuration Register (TXCR)
(A<7:0>=16h)

This register, shown in FIG. 41, is comprised of two parts. Bits 5 to 0 are configurable modes which apply to all outgoing packets. These bits would normally be set once at chip configuration and must be set when the SCENIC is in software reset mode. Bits 15 to 10, however, may change on a per frame basis. These bits are loaded on a per frame basis from the attribute field of the Transmit PTP SOF command. Bits 15 to 10 are also read only. Writing to this register will not affect these bits.

After a hardware reset, this register will be loaded with 0000h. After a software reset, this register will be left unchanged. This register should only be written when the SCENIC is in software reset mode.

Receive Network Status Register (RXSR)
(A<7:0>=24h, read only)

This register, shown in FIG. 42, contains the status gathered due to a packet reception. As soon as the status is available, it will be placed in the receive FIFO right behind the corresponding Receive EOF command so that it can be written to the BI chip's receive status register. This register would not normally be read or written to by the BI chip. If RXSR is read, the result is meaningless because the bits may change at any time. This register description is provided mainly for information purposes.

After a hardware reset, this reset will be loaded with 0000h. After a software reset, this register will be left unchanged.

Receive Configuration Receive (RXCR)
(A<7:0>=26h)

The receive configuration register, shown in FIG. 43, controls what kind of packets are accepted and passed to the BI chip. This includes error conditions and address match information.

After a hardware reset, this register will be loaded with 0011 1010 0000 0000 (3A00h). After a software reset, this register will be left unchanged. RXCR should not be written to unless the SCENIC is in software reset mode.

Bus Master priority Configuration Register (BMPC)
(A<7:0>=36h)

This is a programmable register, shown in FIG. 44, which contains the priority settings of all bus masters directly connected to the NCDI Bus Arbiter. This register is needed so that the Bus Arbiter can make fair decisions on who owns the bus at a given time. It is only necessary to program this register on the bus arbiter. This register can be ignored on any SCENIC device where the bus arbiter is disabled.

Each priority setting uses three bits and may be set somewhere between 0 (highest priority) and 4 (lowest priority). If this register is set so that two or more devices have the same priority, then a second order of precedence will take over. It is not possible to set two devices with the same priority and have them be equal in importance because the inherent order of precedence creates a difference in importance. The inherent order of precedence is the Bus Arbiter, the device attached to $\overline{BREQ0}$, then $\overline{BREQ1}$, $\overline{BREQ2}$ and $\overline{BREQ3}$ where the Bus Arbiter takes the highest priority.

When Fairness is enabled, priority still affects which device will be granted the bus in the event of multiple devices requesting the bus at the same time it becomes available. The difference is that once that device gets to use the bus, it must wait for all other bus requests to be serviced before the bus arbiter will grant it the bus again. This is a function of the bus arbiter, not the requesting device. The requesting device can request the bus, but the arbiter will not immediately grant the bus to it. If it is desired to use fairness, then it is suggested that the default priority specified below be used.

After a hardware reset, this register will be loaded with 1100 0110 1000 1000 (C688h). After a software reset, this register will be left unchanged. BMPC should only be changed when the SCENIC is in software reset mode.

Boot EEPROM Command Register (BECR)
(A<7:0>=40h)

The Boot EEPROM Command Register (BECR), shown in FIG. 45, is used in combination with the Boot EEPROM Data Register (BEDR) to directly access the configuration boot EEPROM. The BECR is used to load a command to be serialized and given to the EEPROM. If the command involves writing data to the EEPROM, then the data found in the BEDR will be serialized and sent to the EEPROM following the EEPROM command. If the command involves reading data from the EEPROM, then after the command has been sent to the EEPROM, the data that the EEPROM gives back will be deserialized and placed in the BEDR.

When the command being sent to the EEPROM is a read command it is only necessary to write the command into this register and set the ERD bit. When the command is a write command, the 16 bit data field that is to be written to the EEPROM should be written to the BEDR first before writing the command into this register. A write command is designated by setting the EWR bit.

After a hardware reset, this register will be loaded with 0000h. After a software reset, this register will be left unchanged.

Note that there are certain dangers involved in writing to the configuration EEPROM. It is possible to overwrite the contents of the configuration information required by the SCENIC. Doing so may render a network interface inoperable and may make it impossible to reprogram the EEPROM unless the EEPROM is removed from the board.

Test Control Register (TCR) (A<7:0>=50h)

The Test Control Register, shown in FIG. 46, is used to provide diagnostic testability of the SCENIC.

After a hardware reset, this register will be loaded with 0000h. After a software reset, this register will be left unchanged.

Silicon Revision (A<7:0>=0Eh, read only)

This read only register contains information on the current revision of the SCENIC. The upper 8 bits (bits 15-8) will be used to represent different functional versions of SCENIC (if they are created in the future). The lower 8 bits (bits 7-0) represent different silicon revisions of a particular functional version of SCENIC. The initial silicon begins at 0000h. If a new functional version of the SCENIC is created, the upper 8 bits will be incremented and the lower 8 will be set to 0.

SCENIC Transmit Network Port (TXNP)
(A<7:0>=10h)

This register was formerly called the Transmit Network NCDI Port or TXNNP.

This register is the port through which all data passes to the SCENIC. The BI initiates a packet transmission by writing an SOF command to this port. this will cause the SCENIC to request the bus and start pulling out of the BI's Transmit Network Port. In effect, all transmit data passes from the BI's Transmit Network Port to the SCENIC's Transmit Network Port. Along with the Transmit SOF command, all other Transmit PTP commands originating from the BI chip will be sent to the SCENIC Transmit Network Port.

Reading the TXNP register will return 0000h. This register is a write only register, hence, reading the register provides no useful information.

Bus Interface Transmit Network Port Offset
(TXNPO) (A<7:0>=12h)

This register was formerly called the Transmit Network Bus Interface Port Offset or TXNBIP.

The Bus Interface Transport Network Port Offset register contains the low order 8 bit address of the supporting Bus Interface's Transmit Network Port. All data bound for the network will effectively originate from the BI's TXNP register pointed to by this register. In addition, any Transmit PTP commands destined for the BI are to be written to the BI's TXNP register.

After a hardware reset, this register will be loaded with 0000h (0008h when IBM mode is set in the EEPROM Configuration Register). After a software reset, this register will be left unchanged. This register should only be changed when the SCENIC is in software reset mode.

SCENIC Receive Network Port (RXNP)
(A<7:0>=20h)

This register was formerly called the Receive Network NCDI Port or RXNNP.

All data received by the SCENIC is effectively passed through the SCENIC Receive Network Port on its way to the BI Receive Network Port. In addition, any receive PTP commands destined for the SCENIC would be written to the SCENIC Receive Network Port.

Since the SCENIC writes all received data directly to the BI, there is no need for the BI to read the RXNP register. If the RXNP register is read, the result will be 0000h.

BUS Interface Receive Network Port Offset
(RXNPO) (A<7:0>=22h)

This register was formerly called the Receive Network Bus Interface Port Offset or RXNBIP.

This register contains the low order 8 bit address for the BI Receive Network Port. The BI Receive Network Port is the port through which all received data passes to the BI. The SCENIC initiates a packet reception by writing an SOF command to the BI Receive Network Port followed by the received network data and an EOF command. All other Receive PTP commands originating from the SCENIC will be sent to the BI Receive Network Port also, which is pointed to by the RXNPO register.

After a hardware reset, this register will be loaded with 0004h (0004h is also the default value loaded with IBM mode is set in the EEPROm Configuration Register). After a software reset, this register will be left unchanged. This register should only be changed when the SCENIC is in software reset mode.

Bus Preempt Counter (BPC) (A<7:0>=32h)

BPC is used by the SCENIC's bus arbiter to determine how long a bus master may hold on to the bus. When there are multiple devices requesting to use the bus. The arbiter will start the bus preempt counter. That counter will count the number specified in the BPC. When the counter reaches 0, the current bus master will be preempted off the bus so that the next request can be serviced. If no other devices are requesting the bus, then the preempt counter will not be started, and the current bus master will be allowed to use the bus as long as it needs it.

After a hardware reset, this register will be loaded with 28h. This will allow a maximum of 40 cycles, or 80 bytes transfer, per bus ownership. After a software reset, this register will be left unchanged. Although this register can be changed at any time, doing so may allow a device to use the bus an excessive amount of time, causing FIFO overruns and underruns. It is suggested that BPC be programmed in the bus arbiter before any devices on the NCDI bus are allowed to function beyond a reset mode. BPC only needs to be programmed on the bus arbiter device. When the bus arbiter in the SCENIC is disabled, this register has no meaning.

Boot EEPROM Data Register (BEDR)
(A<7:0>=42h)

BEDR is the data register used for accesses to the boot EEPROM. When performing an EEPRM read, the data read from the EEPROM will be written in this register. When performing an EEPROM write, the data to be written to the EEPROM must be placed in this register before executing the write command.

After a hardware reset, this register will be loaded with 0000h. After a software reset, this register will be left unchanged.

Bus Interface Interrupt Register Offset (BIRO)
(A<7:0>=4A)

This register contains the low order 8 bit address of the BI's interrupt status register. When the SCENIC needs to write interrupt status to the BI, it will drive the lower 8 bits of this register A<7:0> in order to access the interrupt status register on the BI.

After a hardware reset, this register will be loaded with 00008h (0018h when IBM mode is set in the EEPROM Configuration Register). After a software reset, this register will be left unchanged. This register should only be changed when the SCENIC is in software reset mode.

CAM Address Ports 2, 1 and 0 (CAP2, CAP1, CAP0 (A<7:0>=44h, 46h and 48 h for CAP0, CAP1 and CAP2, respectively)

Each CAP register is a 16-bit register used to read or write the CAM cells. Each CAM cells is 16-bits wide and contains one third of the 48-bit CAM entry which is used by the SCE-NIC for address filtering. There is only one CAM location in the SCENIC. CAP <2:0> always point to this one location. The CAP2 register is used to access the upper bits (47:32), CAP1 the middle bits (31:16), and CAP0 the low bits (15:0) of the CAM entry (see FIG. 47).

The CAP registers are loaded as follows. Given the physical address 10:20:30:40:50:60, which is made up of 8 octets or bytes, where 10h is the least significant byte and 60h is the most significant byte (10h would be the first byte received from the network and 60h would be last), CAP0 would be loaded with 2010h, CAP1 with 4030h and CAP2 with 6050h.

After a hardware reset, and before the boot EEPROM loads the CAM, these registers will be in an unknown state. After a software reset, these registers will be left unchanged.

C. Receive Statistics Counter Registers

This section contains the descriptions of the SCENIC Statistics Counter Registers for receive packets. Unless otherwise specified, these counters tally events that occur to packets that have not been rejected by the CAM logic. If statistics need to be gathered on packets that would otherwise be rejected by the CAM, then the CAM must be configured to accept all physical, multicast and broadcast packets or the $\overline{PREJ}$ signal should not be used.

Receive Missed Packets (RXMissedPkts) (A<7:0>=80h for low order word, 82h for high order word)

A count of all packets lost due to an internal error by the SCENIC. This includes a Receive FIFO overflow and any time a packet is aborted by the BI chip by the Receive PTP command ABORT. Note that there may be other conditions in the BI chip that may cause a packet not to be received. These occurrences must be counted separately and added to the quantity counted by this counter. Note that if this counter is incremented, no other receive counters should be incremented. This is because if the SCENIC looses a packet by its own causes, all other statistics become invalid. Note also that if a packet is determined to be errored by another reason (e.g., CRCE or FAE, etc.) before the SCENIC looses the packet by other means such as FIFO problem, then this counter is not to be incremented. Instead, the error that occurred should be counted in the counter that would tally that error.

The size of this counter is 25 bits.

Received Run Packets Without Errors (RXRun1OK) (A<7:0>=84h for low order word, 86h for high order word)

Counts all packets received that are runt packets and that do not have CRC or Frame Alignment errors. This means any packet received that is less than 64 bytes, not including preamble, that did not have a CRCE or FAE occur.

The size of this counter is 25 bits.

Received Runt Packets With Errors (RXRunErrored) (A<7:0>=88h for low order word, 8Ah for high order word)

Counts all packets received that are runt packets and that have CRC or Frame Alignment errors. This means any packet received that is less than 64 bytes, not including preamble, that had a CRCE or FAE occur.

The size of this counter is 25 bits.

Received Jabber Packets Without Errors (RXJabberOK) (A<7:0>=8Ch for low order word, 8Eh for high order word)

Counts all packets received that are longer than 1518 bytes and that do not have CRC or Frame Alignment errors. This means any packet received that is greater than 1518 bytes that did not have a CRCE or FAE occur.

The size of this counter is 18 bits.

Received Jabber Packets With Errors (RXJabberErrored) (A<7:0>=90h for low order word, 92h for high order word)

Counts all packets received that are longer than 1518 bytes and that have CRC or Frame Alignment errors. This means any packet received that is greater than 1518 bytes that had a CRCE or FAE occur.

The size of this counter is 18 bits.

Received Frame Alignment Error (RXFAError) (A<7:0>=94h for low order word, 96h for high order word)

Counts all packets received that are not run or jabber and that have a Frame Alignment error. This means any packet received that is between 64 and 1518 bytes inclusive that had an FAE occur. This counter is not incremented if RXJabberOK or RXJabberErrored are incremented. This is because IEEE LME specifies that if a jabber packet is received, it is counted as a jabber packet, regardless of whether it was errored or not.

The size of this counter is 23 bits. Received Frame Check Sequence Error (RXFCSError) (A<7:0>=98h for low order word, 9Ah for high order word)

Counts all packets received that are not runt or jabber and that have a CRC error which is not also a Frame Alignment error. This means any packet received that is between 64 and 1518 bytes inclusive that had a CRCE, but not a FAE occur. This counter is not incremented if EXJabberOK, RXJabberErrored or RXFAError are incremented. This is because these errors take higher precedence over the more generic case of a CRC Error. This is also because IEEE LME specifications say that if a jabber packet is received, it is counted as a jabber packet, regardless of whether it was errored or not.

The size of this counter is 23 bits.

Received Errored Bytes (RXBytesErrored) (A<7:0>=9Ch for low order word, 9Eh for high order word)

Counts total number of bytes received that were from packets that had errors. This includes all runt or jabber packets (errored or not) and legal sized (non-runt and non-jabber) packets with CRC or Frame Alignment errors.

The size of this counter is 29 bits.

Received Packets with Collisions (RXCollisions) (A<7:0>=A0h for low order word, A2h for high order word)

A count of all collisions that occur during reception. This counter tallies both in window and out of window collisions. It will also tally collisions that occur before the SFD (during preamble). Transmit collisions are not counted by this counter. Receive collisions cannot be detected by a twisted pair transceiver. Hence, RXCollisions will not be incremented when using the TPI transceiver. TPI transceivers can only detect collisions when they are transmitting at the same time. These collisions are counted as transmit collisions, not receive collisions. Coaxial transceivers can, however, detect collisions when not transmitting.

The size of this counter is 25 bits.

Received Packets with Length 64 Bytes (RXPkts64Bytes) (A<7:0>=A4h for low order word, A6h for high order word)

Counts all packets received with a length of 64 bytes. This includes all packets with or without CRC or Frame Alignment errors.

The size of this counter is 23 bits.

Received Packets with Length 65 to 127 Bytes (RXPkts65to127Bytes) (A<7:0>=A8h for low order word, AAh for high order word)

Counts all packets received with a length between 65 and 127 bytes. This includes all packets with or without CRC or Frame Alignment errors.

The size of this counter is 23 bits.

Received Packets with Length 128 to 255 Bytes (RXPkts128to255Bytes) (A<7:0>=ACh for low order word, AEh for high order word)

Counts all packets received with a length between 128 and 255 bytes. This includes all packets with or without CRC or Frame Alignment errors.

The size of this counter is 22 bits.

Received Packets with Length 256 to 511 Bytes (RXPkts256to511Bytes) (A<7:0>=B0h for low order word, B6h for high order word)

Counts all packets received with a length between 256 and 511 bytes. This includes all packets with or without CRC or Frame Alignment errors.

The size of this counter is 21 bits.

Received Packets with Length 512 to 1023 Bytes (RXPkts512to1023Bytes) (A<7:0>=B4h for low order word, B6h for high order word)

Counts all packets received with a length between 512 and 1023 bytes. This includes all packets with or without CRC or Frame Alignment errors.

The size of this counter is 20 bits.

Received Packets with Length 1024 to 1518 Bytes (RXPkts1024to1518Bytes) (A<7:0>=B8h for low order word, B6h for high order word)

Counts all packets received with a length between 1024 and 1518 bytes. This includes all packets with or without CRC or Frame Alignment errors.

The size of this counter is 19 bits.

D. Transmit Statistics Counter Registers

This section contains the descriptions of the SCENIC Statistics Counter Registers for transmit packets. These counters gather statistics on any errored packet that is transmitted. Packets that are transmitted with errors are caused by either a network error, such as a collision, or by the system software specifically attempting to transmit an errored packet, such as transmitting a packet without correct CRC value. The latter is not counted by these counters since it is assumed that the system software can count such events. However, since network induced transmit errors cannot be counted by the system software, these counters will gather that information. Anytime the SCENIC is not able to complete the transmission of the entire packet that it was given to transmit, the SCENIC will record the following information.

Transmitted Packets with Length 64 Bytes (TXPkts64Bytes) (A<7:0>=C0h for low order word, C2h for high order word)

Counts all packets transmitted with a length equal to 64 bytes. This means that anytime a packet of size 64 bytes leaves the SCENIC, no matter whether it was a good transmitted packet or an incorrectly or incompletely transmitted packet, this counter is incremented. This counter is also incremented even if the SCENIC is responsible for aborting the packet incorrectly since data will have still been transmitted from the chip.

The size of this counter is 23 bits.

Transmitted Packets with Length 65 to 127 Bytes (TXPkts65to127Bytes) (A<7:0>=C4h for low order word, C6h for high order word)

Counts all packets transmitted with a length between 65 and 127 bytes. This includes all packet transmissions wit or without errors. This counter works the same as TXPkts64Bytes.

The size of this counter is 23 bits.

Transmitted Packets with Length 128 to 255 Bytes (TXPkts128to255Bytes) (A<7:0>=C8h for low order word, CAh for high order word)

Counts all packets transmitted with a length between 128 and 255 bytes. This includes all packet transmissions wit or without errors. This counter works the same as TXPkts64Bytes.

The size of this counter is 22 bits.

Transmitted Packets with Length 256 to 511 Bytes (TXPkts256to511Bytes) (A<7:0>=CCh for low order word, CEh for high order word)

Counts all packets transmitted with a length between 256 and 511 bytes. This includes all packet transmissions wit or without errors. This counter works the same as TXPkts64Bytes.

The size of this counter is 21 bits.

Transmitted Packets with Length 512 to 1023
Bytes (TXPkts512to1023Bytes) (A<7:0>=D0h for low order word, D2h for high order word)

Counts all packets transmitted with a length between 65 and 127 bytes. This includes all packet transmissions wit or without errors. This counter works the same as TXPkts64Bytes.

The size of this counter is 20 bits.

Transmitted Packets with Length 1024 to 1518
Bytes (TXPkts1024to1518Bytes) (A<7:022 =D4h for low order word, D6h for high order word)

Counts all packets transmitted with a length between 1024 and 1518 bytes. This includes all packet transmissions wit or without errors. This counter works the same as TXPkts64Bytes.

The size of this counter is 19 bits.

Transmitted Out of Window Collisions (TXOWC)
(A<7:0>=D8h for low order word, DAb for high order word)

Counts all occurrences of an Out of Window Collision (OWC). This counter may be incremented multiple times for the same packet since it is possible for multiple OWCs to occur for a single packet. Extended OWCs (EOWC) which are also called Un-Retransmittable Collisions (URC) are also counted.

The size of the counter is 23 bits.

Transmitted Runt Packets (TXRuntErrored)
(A<7:0>=DCh for low order word, DEh for high order word)

Counts all run packets that are transmitted by the SCENIC with errors. This means that anytime an error causes the SCENIC to put less than 64 bytes, but more than 0 bytes, not including preamble, onto the network, this counter will be incremented. This kind of packet may be caused by collisions, transmit aborts and FIFO overruns for example.

The size of this counter is 25 bits.

Transmitted Packets with Errors (TXPktsErrored)
(A<7:0>=E0h for low order word, E2h for high order word)

Counts all normal sized Ethernet packets transmitted by the SCENIC with errors. This means anytime an error occurs and causes the SCENIC to put out between 64 and 1518 bytes inclusive onto the network, with an error (not including preamble). Conditions that may cause this error are collisions, transmit aborts and FIFO underruns for example.

The size of this counter is 23 bits.

Transmitted Bytes with Error (TXBytesErrored)
(A<7:0>=BCh for low order word, BEh for high order word)

Counts any byte that is transmitted from the SCENIC in a packet that is transmitted with errors. This does not include preamble bytes.

The size of this counter is 29 bits.

AC SPECIFICATIONS

FIGS. 48–57 show the ACE timing specifications for the SCENIC.

Unless otherwise indicated, all input timing shown in the following diagrams is synchronous and cannot be violated without risking possible metastability. Asynchronous-input signals are shown with setup and hold timing, but it is not necessary to meet the timing since these signals are double synchronized to avoid metastability problems. If, however, the asynchronous timing is met, then it is guaranteed that the signal will be properly sampled at the specified edge instead of at the next sampling edge.

Figure 58:
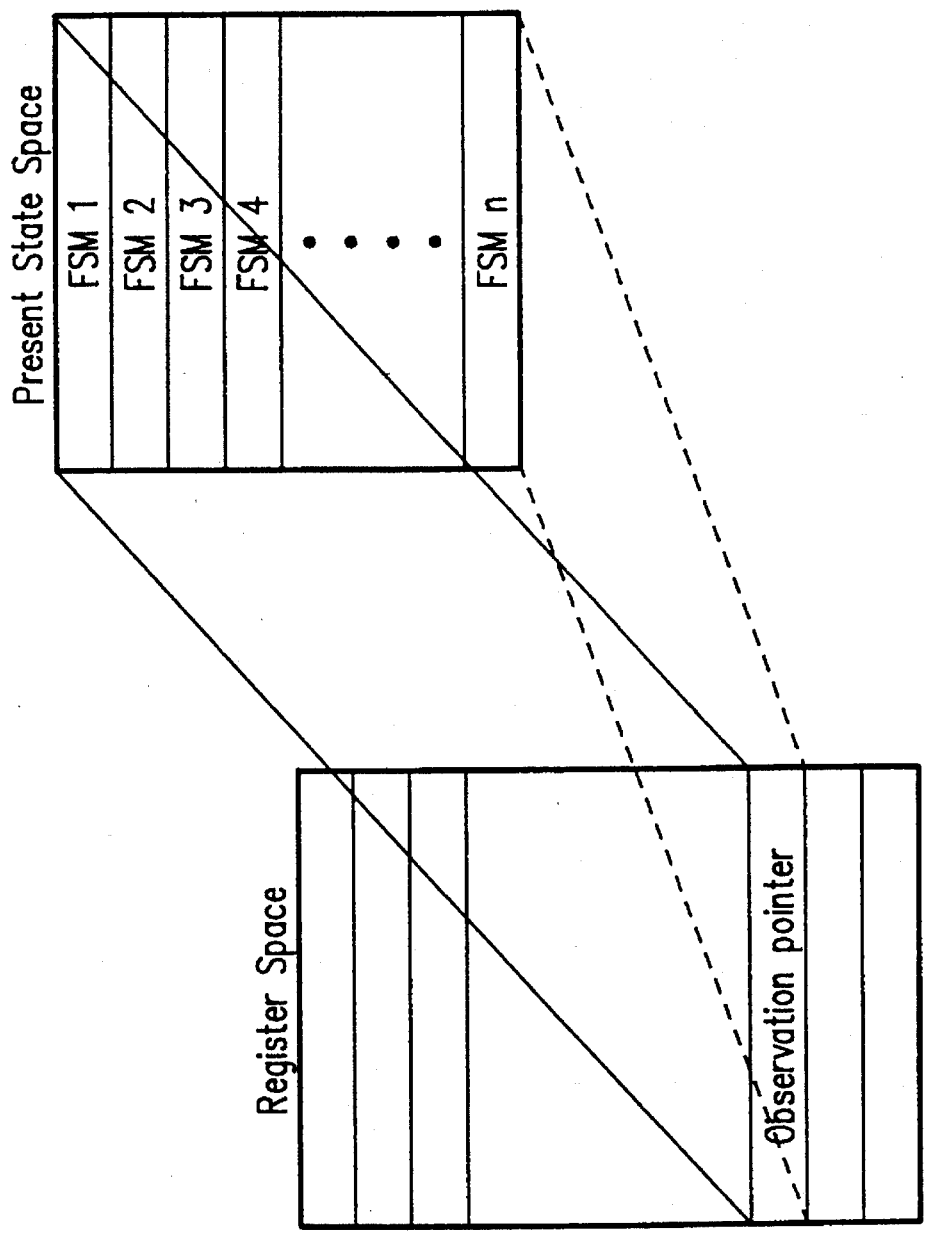
FIG. 58 Is a block diagram illustrating a register that serves as pointer to a selected state machine in the service.

The SCENIC provides a means for observing the present states of any state machine within the device. A single register is placed into the user-accessible register space. As shown in FIG. 58, this register will serve as a pointer to a present state memory map. The designer will have mapped the states of all FSM's into this address space.

In order to use this feature, the user would first perform a write cycle to the observation pointer. The data written into this register would correspond to the chosen state machine's "address" within its memory map. Following this transfer, a write cycle to a test register would set a bit enabling certain primary I/I's to become observation points. Once in this mode, these observation points allow the present states to flow out of the chip, real time.

The primary advantage to this feature is seen during the initial debut of first silicon. If the chip locks up while using this feature, the tester is able to give not only the lock-up conditions but the actual state when the lock-up occurred. This will speed up the diagnosis of problems.

It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of operating first and second physically separated first-in, first-out (FIFO) memory devices as a single FIFO, the method comprising:

connecting the first and second FIFO memory devices for transfer of data characters therebetween;

initiating write operation for transfer of data characters from the first FIFO memory device to the second FIFO memory device; and in the event that the second FIFO memory device is full, providing a write retry signal from the second FIFO memory device to the first FIFO memory device that causes the write operation to be aborted, the first FIFO memory device responding to the write retry signal by periodically re-initiating the write operation until transfer of the data characters from the first FIFO memory device to the second FIFO memory device is accomplished.

2. A method as in claim 1 and further comprising:

initiating a read operation for transfer of data characters from the second FIFO memory device to the first FIFO memory device; and in the event that the second FIFO memory device is empty, providing a read retry signal from the second FIFO memory device to the first FIFO memory device, thereby causing the read operation to be aborted, the first FIFO memory device responding to the read retry signal by periodically re-initiating the read operation until transfer of the data characters from the second FIFO memory device to the first FIFO memory device is accomplished.

3. A method as in claim 1 and wherein the first and second physically separated FIFO memory devices are located on a single semiconductor integrated circuit die.

* * * * *